US012594804B2

(12) United States Patent
Wang et al.

(10) Patent No.: US 12,594,804 B2
(45) Date of Patent: Apr. 7, 2026

(54) MOBILE ROBOT MOTION CONTROL METHOD AND MOBILE ROBOT

(71) Applicant: Tencent Technology (Shenzhen) Company Limited, Shenzhen (CN)

(72) Inventors: Shuai Wang, Shenzhen (CN); Jingfan Zhang, Shenzhen (CN); Zhaoxiang Li, Shenzhen (CN); Jiahao Wang, Shenzhen (CN); Yu Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 79 days.

(21) Appl. No.: 18/603,062

(22) Filed: Mar. 12, 2024

(65) Prior Publication Data

US 2024/0217296 A1    Jul. 4, 2024

Related U.S. Application Data

(63) Continuation of application No. PCT/CN2023/101084, filed on Jun. 19, 2023.

(30) Foreign Application Priority Data

Aug. 20, 2022    (CN) .......................... 202211002012.9

(51) Int. Cl.
*B60G 17/016* (2006.01)
*B60G 3/20* (2006.01)
(Continued)

(52) U.S. Cl.
CPC ........... *B60G 17/016* (2013.01); *B60G 3/207* (2013.01); *B60K 1/02* (2013.01); *B60L 15/20* (2013.01);
(Continued)

(58) Field of Classification Search
CPC ............ B60G 17/016; B60G 17/01908; B60G 3/207; B60G 2400/0511; B60G 2400/10;
(Continued)

(56) References Cited

U.S. PATENT DOCUMENTS

| | | | | |
|---|---|---|---|---|
| 9,352,470 | B1 * | 5/2016 | da Silva | ................. B25J 13/088 |
| 2005/0066397 | A1 * | 3/2005 | Hidai | .................... B62D 57/032 |
| | | | | 901/1 |

(Continued)

FOREIGN PATENT DOCUMENTS

| | | |
|---|---|---|
| CN | 107053215 A | 8/2017 |
| CN | 111267989 A | 6/2020 |

(Continued)

OTHER PUBLICATIONS

Tencent Technology, ISR, PCT/CN2023/101084, Sep. 22, 2023, 2 pgs.

(Continued)

*Primary Examiner* — Aaron L Troost
(74) *Attorney, Agent, or Firm* — Morgan, Lewis & Bockius LLP

(57)    ABSTRACT

This application discloses a mobile robot and a method for controlling motion of the mobile robot. The mobile robot includes a first wheel part having a telescopic leg portion, a second wheel part having a telescopic leg portion, and a base part connected to the first wheel part and the second wheel part. The method includes: controlling the first wheel part and the second wheel part to be in a standing balance state, wherein the base part is parallel to a horizontal reference plane in the standing balance state; and controlling the mobile robot to perform bipedal-like motion based on the standing balance state, wherein, during the bipedal-like motion, the first wheel part and the second wheel part alternately touch the ground while the base part obliquely swinging.

18 Claims, 30 Drawing Sheets

Control a first wheel part and a second wheel part to be in a standing balance state, where a base part is parallel to a horizontal reference plane in a standing balance state    102

Control a mobile robot to perform bipedal-like motion based on the standing balance state, where during the bipedal-like motion, the first wheel part and the second wheel part alternately touch ground, and the base part obliquely swings    104

(51) Int. Cl.
  *B60K 1/02* (2006.01)
  *B60L 15/20* (2006.01)

(52) U.S. Cl.
  CPC ............... *B60G 2400/0511* (2013.01); *B60G 2400/0512* (2013.01); *B60G 2400/0513* (2013.01); *B60G 2500/32* (2013.01); *B60L 2240/423* (2013.01)

(58) Field of Classification Search
  CPC ........ B60G 2400/204; B60G 2400/208; B60G 2400/512; B60G 2400/513; B60G 2400/522; B60G 2400/523; B60G 2500/30; B60G 2500/32; B60G 2200/13; B60G 2202/442; B60G 2401/142; B60G 2401/28; B60G 2800/01; B60K 1/02; B60L 15/20; B60L 2240/423; B60L 2220/46; B60L 2240/22; B60L 2240/80; B60L 2260/34; B62D 57/028; B62D 61/12; B25J 5/007; B25J 9/1664; B25J 9/1679

See application file for complete search history.

(56) References Cited

U.S. PATENT DOCUMENTS

| | | | | |
|---|---|---|---|---|
| 2011/0264264 | A1* | 10/2011 | Shirokura | B25J 19/0008 |
| | | | | 901/1 |
| 2012/0310412 | A1* | 12/2012 | Seo | B25J 9/0006 |
| | | | | 700/254 |
| 2017/0106738 | A1* | 4/2017 | Gillett | B62K 11/007 |

FOREIGN PATENT DOCUMENTS

| | | | | |
|---|---|---|---|---|
| CN | 111267990 | A | | 6/2020 |
| CN | 211001610 | U | * | 7/2020 |
| CN | 113147951 | A | | 7/2021 |
| CN | 113200099 | A | | 8/2021 |
| CN | 113485398 | A | | 10/2021 |
| CN | 113552880 | A | | 10/2021 |
| CN | 114764241 | A | | 7/2022 |
| CN | 114791729 | A | | 7/2022 |
| JP | S 61113573 | A | | 5/1986 |

OTHER PUBLICATIONS

Tencent Technology, Extended European Search Report, EP Patent Application No. 23856224.3, Mar. 28, 2025, 10 pgs.

Shuai Wang et al., "Balance Control of a Novel Wheel-Legged Robot: Design and Experiments", 2021 IEEE International Conference on Robotics and Automation (ICRA), May 2021, 7 pgs.

Songyan Xin et al., "Online Dynamic Motion Planning and Control for Wheeled Biped Robots", 2020 IEEE/RSJ International Conference on Intelligent Robots and Systems (IROS), Oct. 2020, 8 pgs.

Youtube.com—BotJunkie, "Tencent Ollie", Jun. 2021, Retrieved from the Internet: https://www.youtube.com/watch?v=ZtIRVO8fpE0.

Tencent Technology, WO, PCT/CN2023/101084, Sep. 22, 2023, 6 pgs.

Tencent Technology, IPRP, PCT/CN2023/101084, Feb. 25, 2025, 7 pgs.

Tencent Technology, Japanese Office Action, JP Patent Application No. 2024-557506, Oct. 14, 2025, 21 pgs.

Tencent Technology, Korean Office Action, KR Patent Application No. 10-2024-7007161 Sep. 29, 2025, 12 pgs.

* cited by examiner

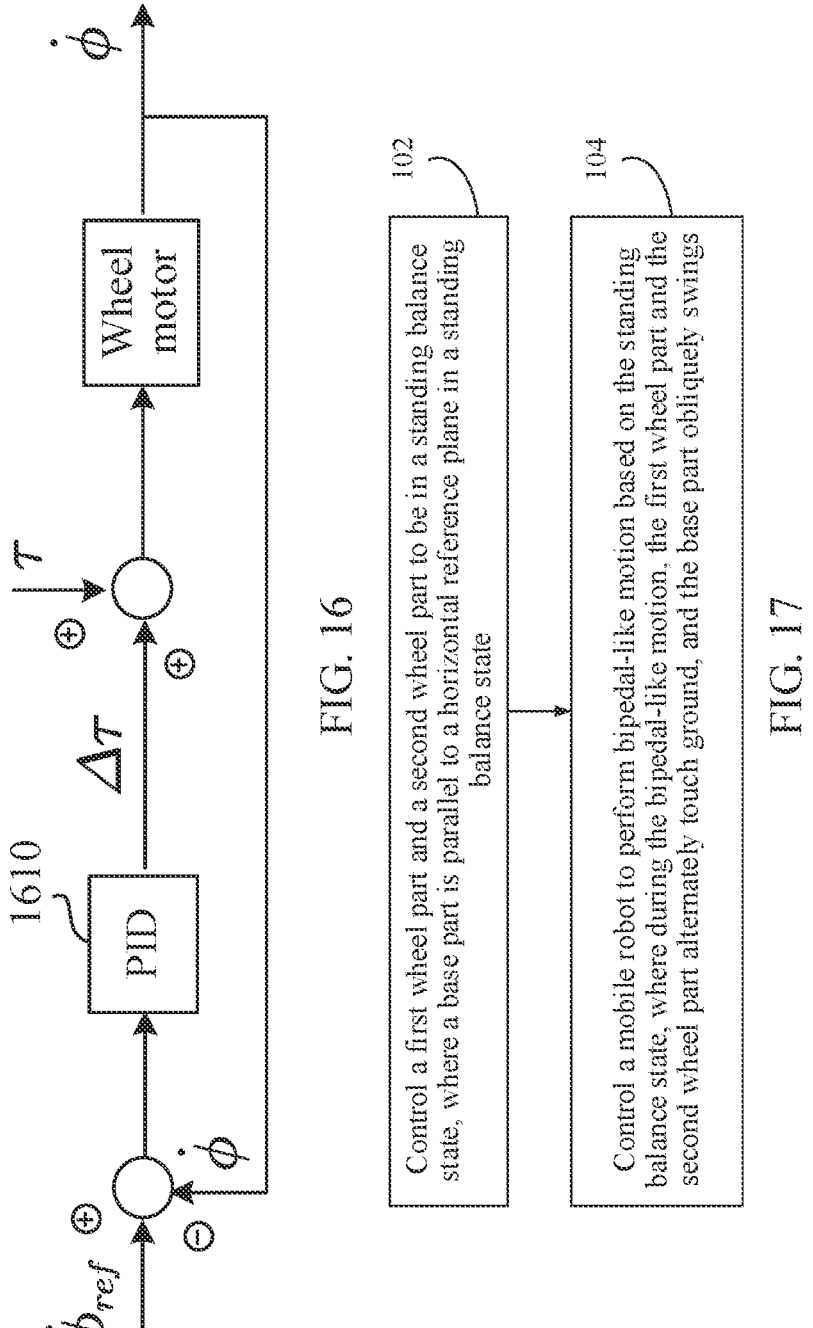

FIG. 16

Control a first wheel part and a second wheel part to be in a standing balance state, where a base part is parallel to a horizontal reference plane in a standing balance state

102

Control a mobile robot to perform bipedal-like motion based on the standing balance state, where during the bipedal-like motion, the first wheel part and the second wheel part alternately touch ground, and the base part obliquely swings

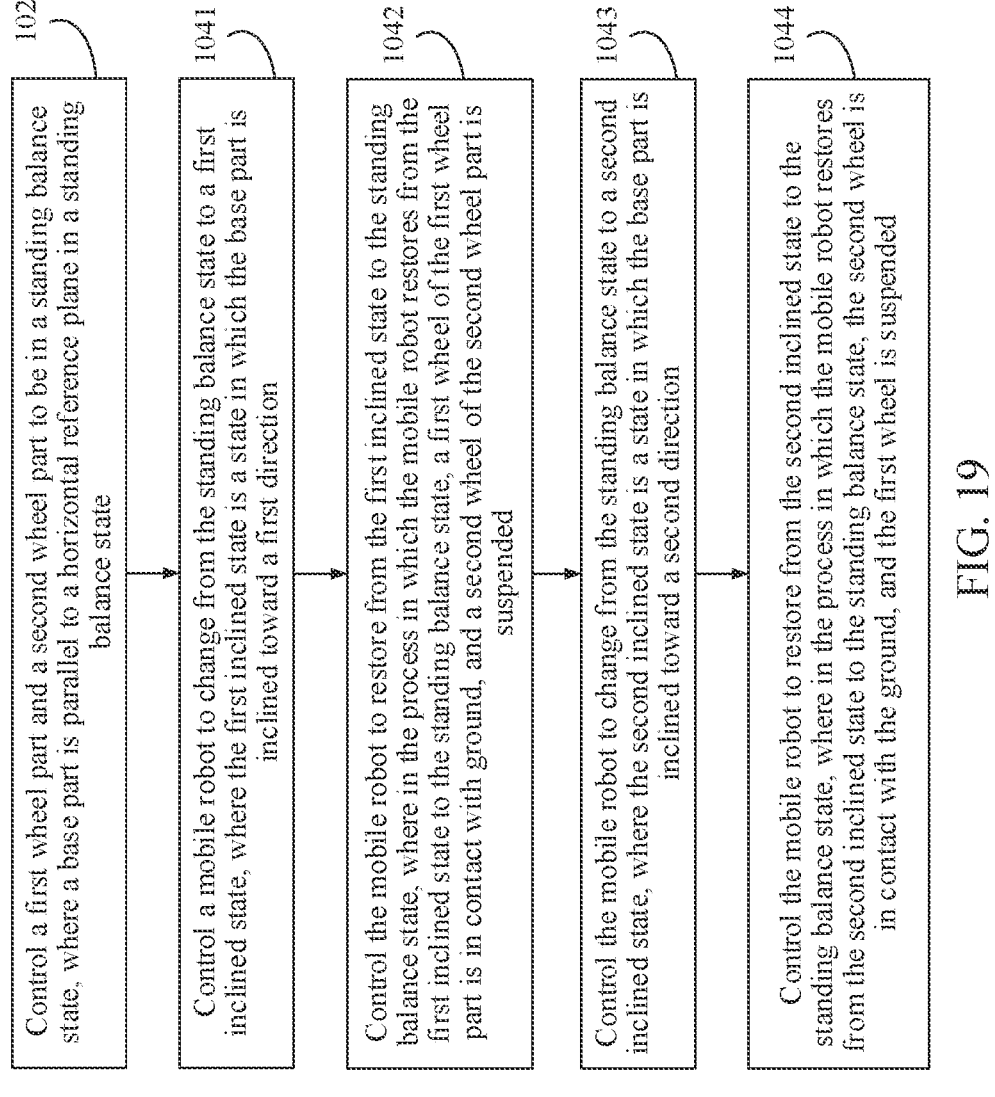

102

Control a first wheel part and a second wheel part to be in a standing balance state, where a base part is parallel to a horizontal reference plane in a standing balance state

1041

Control a mobile robot to change from the standing balance state to a first inclined state, where the first inclined state is a state in which the base part is inclined toward a first direction

1042

Control the mobile robot to restore from the first inclined state to the standing balance state, where in the process in which the mobile robot restores from the first inclined state to the standing balance state, a first wheel of the first wheel part is in contact with ground, and a second wheel of the second wheel part is suspended

1043

Control the mobile robot to change from the standing balance state to a second inclined state, where the second inclined state is a state in which the base part is inclined toward a second direction

1044

Control the mobile robot to restore from the second inclined state to the standing balance state, where in the process in which the mobile robot restores from the second inclined state to the standing balance state, the second wheel is in contact with the ground, and the first wheel is suspended

Control module        3220

3300

3303

3304
Radio frequency circuit

3305
Display screen

3306
Camera assembly

3307
Audio circuit

3308
Positioning component

3309
Power supply

3301
Processor

3302
Memory

Peripheral device interface

Accelerometer sensor 3311     Gyroscope sensor 3312     Pressure sensor 3313

Optical sensor 3314     Proximity sensor 3315

Sensor 3310

MOBILE ROBOT MOTION CONTROL METHOD AND MOBILE ROBOT

CROSS-REFERENCE TO RELATED APPLICATIONS

This application is a continuation application of PCT Patent Application No. PCT/CN2023/101084, entitled "MOBILE ROBOT MOTION CONTROL METHOD AND MOBILE ROBOT" filed on Jun. 19, 2023, which claims priority to Chinese Patent Application No. 202211002012.9, entitled "MOBILE ROBOT MOTION CONTROL METHOD AND MOBILE ROBOT" and filed on Aug. 20, 2022, all of which is incorporated herein by reference in its entirety.

FIELD OF THE TECHNOLOGY

This application relates to the field of robots, and in particular, to a mobile robot motion control method and a mobile robot.

BACKGROUND OF THE DISCLOSURE

For example, a mobile robot is an under-actuated system robot. The under-actuated system robot is a robot whose number of drives is less than a number of joint degrees of freedom. A typical manifestation of this type of robot is that the robot has a balance problem.

In the related art, for example, the under-actuated system robot is a wheel-legged robot. For the wheel-legged robot that achieves two-wheeled balance, a motion plane of a leg portion of the wheel-legged robot has no degree of freedom in a roll direction. For example, the wheel-legged robot includes a first wheel part, a second wheel part, and a base part connected to the first wheel part and the second wheel part. Motion planes of leg portions of the first wheel part and the second wheel part are kept perpendicular to the base part. Therefore, during actual use, movement of the robot is usually achieved by controlling wheels of the wheel-legged robot to roll.

However, in the related art, the wheel-legged robot can only move in a rolling manner, and a movement manner is relatively single.

SUMMARY

Embodiments of this application provide a mobile robot motion control method and a mobile robot. The technical solutions include at least the following:

According to an aspect of this application, a mobile robot motion control method is provided, performed by a chip, a mobile robot including a first wheel part having a telescopic leg portion, a second wheel part having a telescopic leg portion, and a base part connected to the first wheel part and the second wheel part, and the method including:

controlling the first wheel part and the second wheel part to be in a standing balance state, wherein the base part is parallel to a horizontal reference plane in the standing balance state; and controlling the mobile robot to perform bipedal-like motion based on the standing balance state, wherein, during the bipedal-like motion, the first wheel part and the second wheel part alternately touch the ground while the base part obliquely swinging.

According to an aspect of this application, a mobile robot is provided, including a first wheel part having a telescopic leg portion, a second wheel part having a telescopic leg portion, and a base part connected to the first wheel part and the second wheel part; and a controller being disposed in the mobile robot, and the controller being configured to control the mobile robot to implement the mobile robot motion control method as described above.

According to an aspect of this application, a computer device is provided, including a memory and a processor, the memory storing a computer program, the computer program being loaded and executed by the processor to implement the mobile robot motion control method as described above.

According to an aspect of this application, a non-transitory computer-readable storage medium is provided, storing a computer program, the computer program being executed by a processor to implement the mobile robot motion control method as described above.

According to an aspect of this application, a chip is provided, including a programmable logic circuit and/or a computer program, an electronic device on which the chip is installed, when running, configured to implement the mobile robot motion control method as described above.

According to an aspect of this application, a computer program product is provided, including computer instructions, the computer instructions being stored in a computer-readable storage medium, and a processor reading the computer-readable storage medium and executing the computer instructions, to implement the mobile robot motion control method as described above.

The technical solutions provided in the embodiments of this application produce at least the following beneficial effects:

The first wheel part having the telescopic leg portion and the second wheel part having the telescopic leg portion are used to control the mobile robot to perform bipedal-like motion based on the standing balance state, thereby providing a new motion manner for a wheel-legged mobile robot, and enriching movement manners of the wheel-legged mobile robot.

BRIEF DESCRIPTION OF THE DRAWINGS

FIG. 16 is a schematic diagram of balance control in a yaw direction according to an exemplary embodiment of this application.

FIG. 17 is a flowchart of a mobile robot motion control method according to an exemplary embodiment of this application.

FIG. 19 is a flowchart of a mobile robot motion control method according to an exemplary embodiment of this application.

Figure 1:
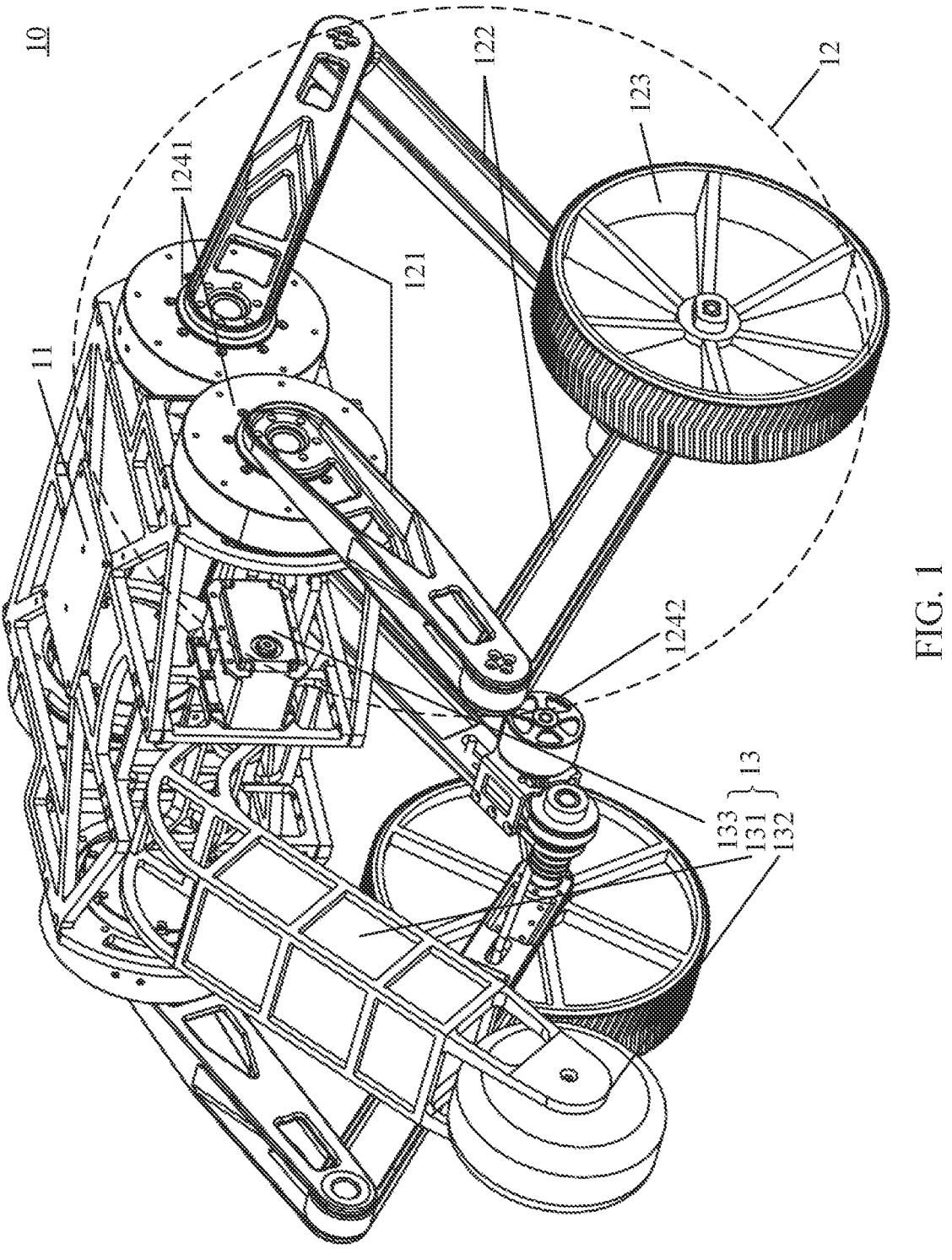
FIG. 1 is a schematic structural diagram of a wheel-legged robot according to an exemplary embodiment of this application.

Reference numerals in the accompanying drawings are described below:

10—wheel-legged robot;
    11—base part;
    12—wheel part:
        121—thigh unit;
        122—calf unit;
        123—driving wheel;
        124—drive unit: 1241—first motor; and 1242—second motor; and
    13—tail part:
        131—balancing weight leg;
        132—driven wheel; and
        133—third motor;
    01—torsion spring; 02—rotation shaft; 03—synchronous belt; and 04—synchronous belt wheel.

DESCRIPTION OF EMBODIMENTS

In embodiments of this application, terms "front" and "rear" are based on "front" and "rear" shown in the accompanying drawings. A "first end" and a "second end" are two opposite ends.

A mobile robot motion control method provided in the embodiments of this application may be applied to any type of a redundant actuation system robot, a full-actuated system robot, and an under-actuated system robot. The redundant actuation system robot is a robot whose number of drives is greater than a number of joint degrees of freedom. The full-actuated system robot is a robot whose number of drives is equal to the number of joint degrees of freedom. The under-actuated system robot is a robot whose number of drives is less than the number of joint degrees of freedom. The under-actuated system robot has a body balance problem.

It is to be understood that, the under-actuated system robot is unstable and has the body balance problem, and consequently, motion control on the under-actuated system robot is more difficult than the other two types of robots. A wheel-legged robot is used as an example. Balance control on the wheel-legged robot is challenging and requires linear and nonlinear control technologies for implementation.

In some embodiments, the motion control method provided in the embodiments of this application is applied to the under-actuated system robot. In one embodiment, the motion control method provided in the embodiments of this application is applied to the wheel-legged robot. Descriptions are given below by using the under-actuated system robot as an example. The redundant actuation system robot and the full-actuated system robot are similar to the under-actuated system robot and may be used as reference. Details are not described herein again.

FIG. 1 shows a wheel-legged robot 10 according to an exemplary embodiment of this application. The wheel-legged robot 10 is one type of the under-actuated system robot. The wheel-legged robot 10 combines advantages of a wheeled robot and a footed robot, has high wheel energy efficiency and strong adaptability, and can avoid obstacles on an uneven terrain by using legs. The wheel-legged robot 10 is an unstable under-actuated system with only two contact points between ground and wheels/feet, making balance control on the wheel-legged robot 10 challenging due to a difficulty in achieving body balance.

For example, the wheel-legged robot 10 includes a base part 11, a wheel part 12, and a tail part 13. The wheel part 12 and the tail part 13 are respectively in transmission connection with the base part 11. In one embodiment, the wheel part 12 may be divided into left and right sides, and the left and right sides may be completely symmetrical or not completely symmetrical.

For example, the wheel part 12 includes a leg portion and a wheel portion. The leg portion includes a thigh unit 121 and a calf unit 122. The wheel portion includes a driving wheel 123. For example, the thigh unit 121 includes two rods, and the calf unit 122 includes two rods. The two rods included in the thigh unit 121, the two rods included in the calf unit 122, and the base part 11 form a planar five-rod linkage.

In one embodiment, a first motor 1241 is fixed on the base part 11 and is configured to provide a driving force to the thigh unit 121.

For example, the first motor 1241 includes two motors. The two rods included in the thigh unit 121 are respectively fixedly connected to output shafts of two motors included in the first motor 1241. Connecting ends between the two rods included in the thigh unit 121 and the two rods included in the calf unit 122 are connected in a revolute pair form, to form the planar five-rod linkage.

In one embodiment, a second motor 1242 is fixed on one rod of the calf unit 122 and is configured to provide a driving force to the driving wheel 123.

Figure 2:
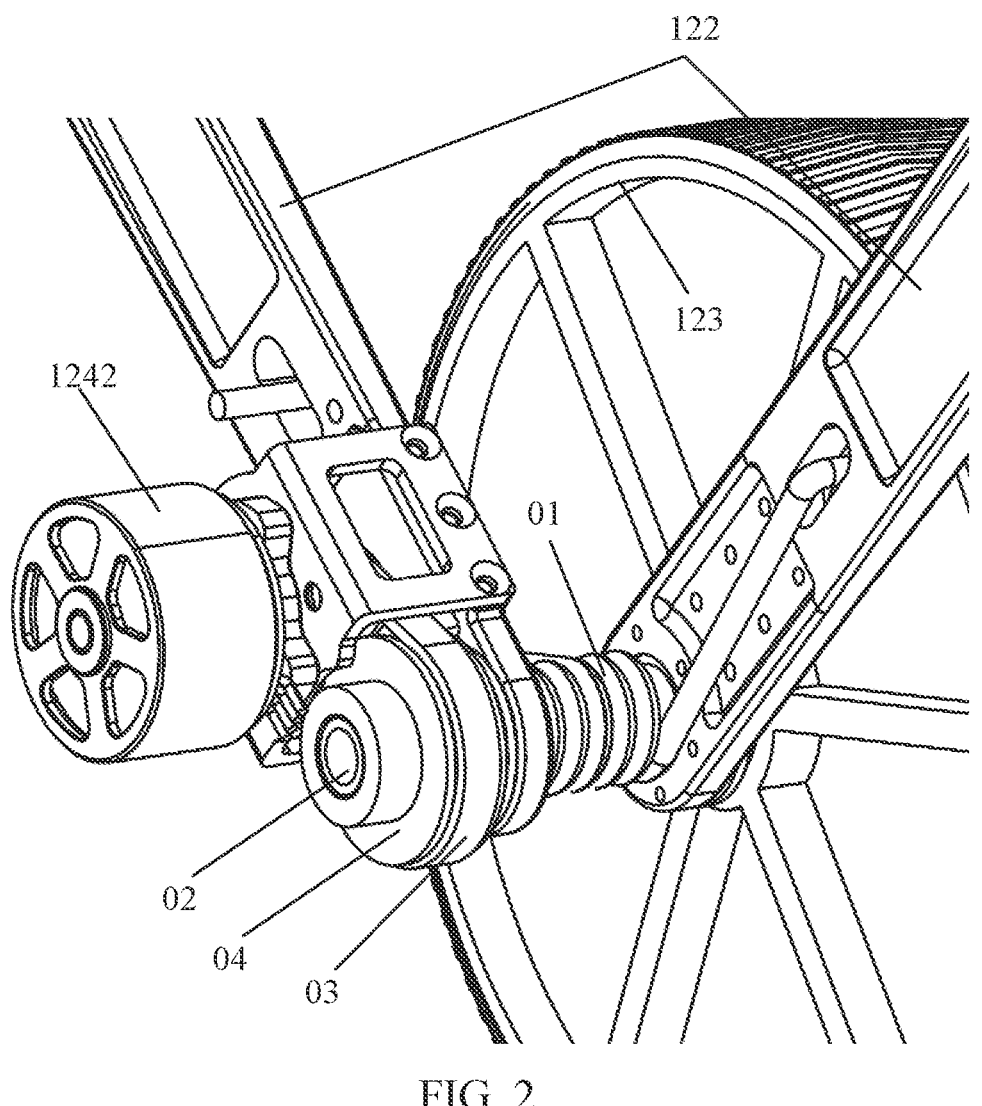
FIG. 2 is a partial schematic diagram of a wheel-legged robot according to an exemplary embodiment of this application.

Refer to a partial schematic diagram of the wheel-legged robot 10 shown in FIG. 2. Driving of the driving wheel 123 may be implemented as follows: The second motor 1242 drives a rotation shaft 02 of the driving wheel 123 through belt transmission. The rotation shaft 02 and a revolute pair between the two rods included in the calf unit 122 are axially coaxial. A torsion spring 01 is sleeved on the rotation shaft 02. Arms of the torsion spring 01 are respectively fixed on the two rods included in the calf unit 122.

In one embodiment, a synchronous belt wheel 04 is arranged on the output shaft of the second motor 1242, the synchronous belt wheel 04 is fixed on the rotation shaft 02, the driving wheel 123 is fixed on the other section of the rotation shaft 02, a synchronous belt 03 is sleeved on the synchronous belt wheel 04, and the second motor 1242 drives the synchronous belt 03 to drive the synchronous belt wheel 04 to rotate, thereby driving the driving wheel 123 to rotate.

In one embodiment, in the wheel-legged robot 10 provided in the embodiments of this application, the tail part 13 includes a balancing weight leg 131, a driven wheel 132, and a third motor 133. The balancing weight leg 131 achieves a balance function during motion of the wheel-legged robot 10, and the third motor 133 is configured to provide a driving force to the driven wheel 132.

Figure 3:
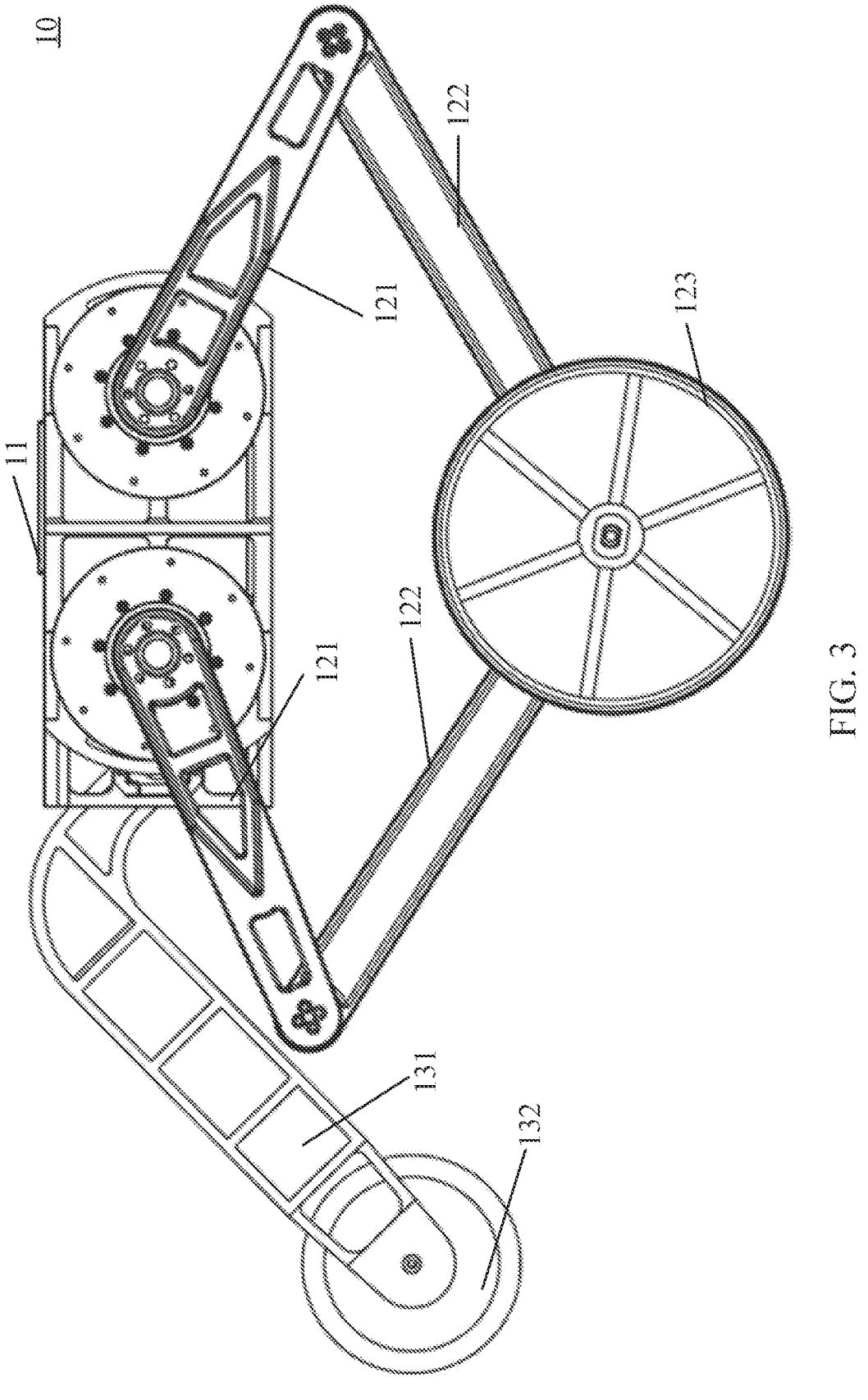
FIG. 3 is a front view of a wheel-legged robot in a two-wheel standing state according to an exemplary embodiment of this application.
Figure 4:
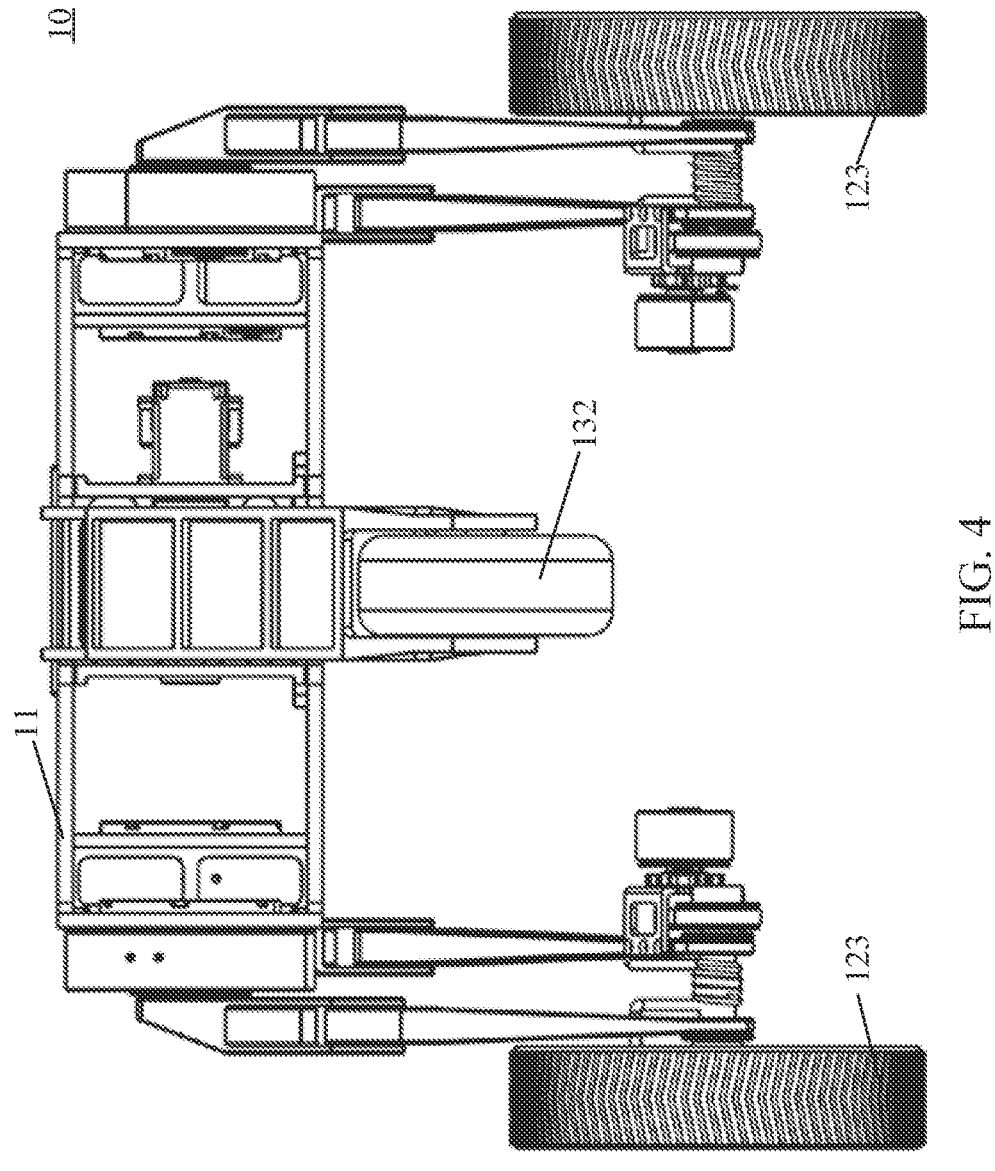
FIG. 4 is a side view of a wheel-legged robot in a two-wheel standing state according to an exemplary embodiment of this application.
Figure 5:
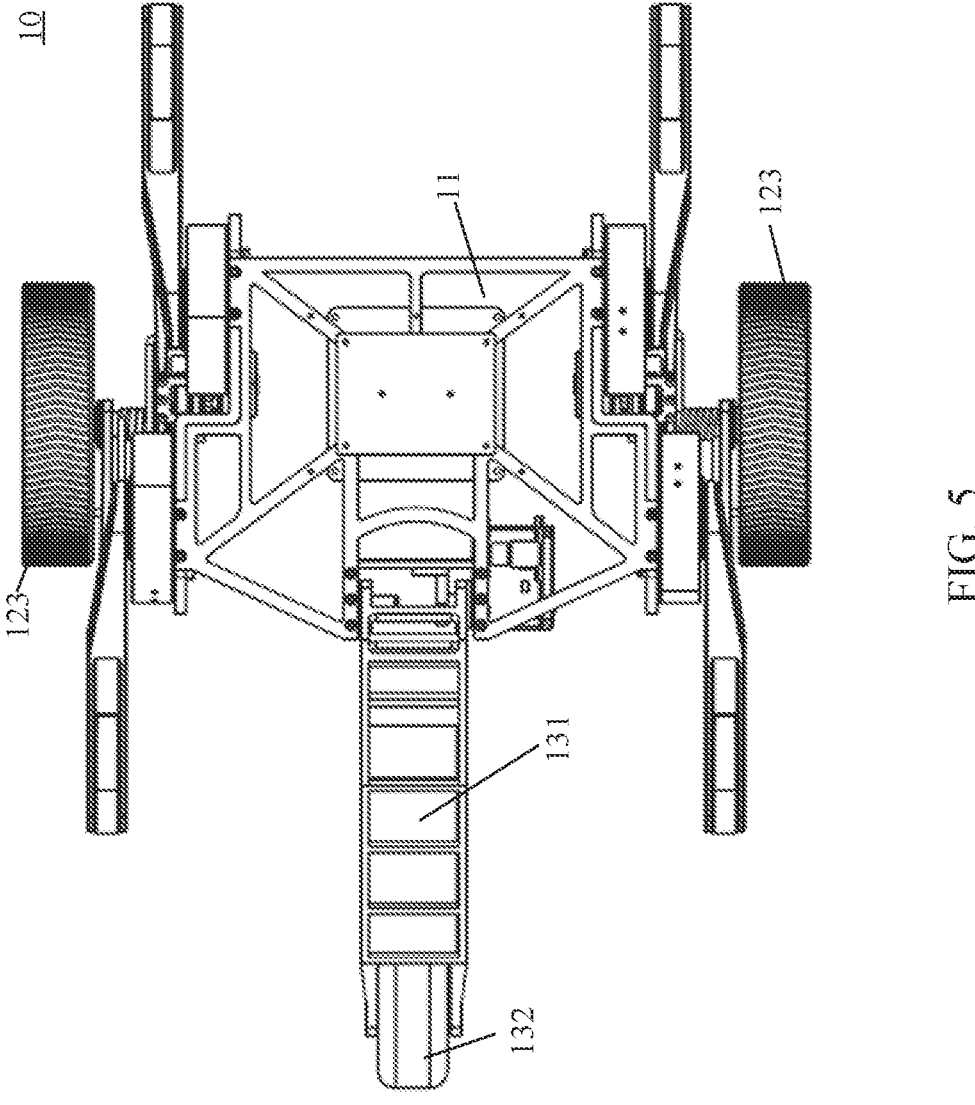
FIG. 5 is a top view of a wheel-legged robot in a two-wheel standing state according to an exemplary embodiment of this application.
Figure 6:
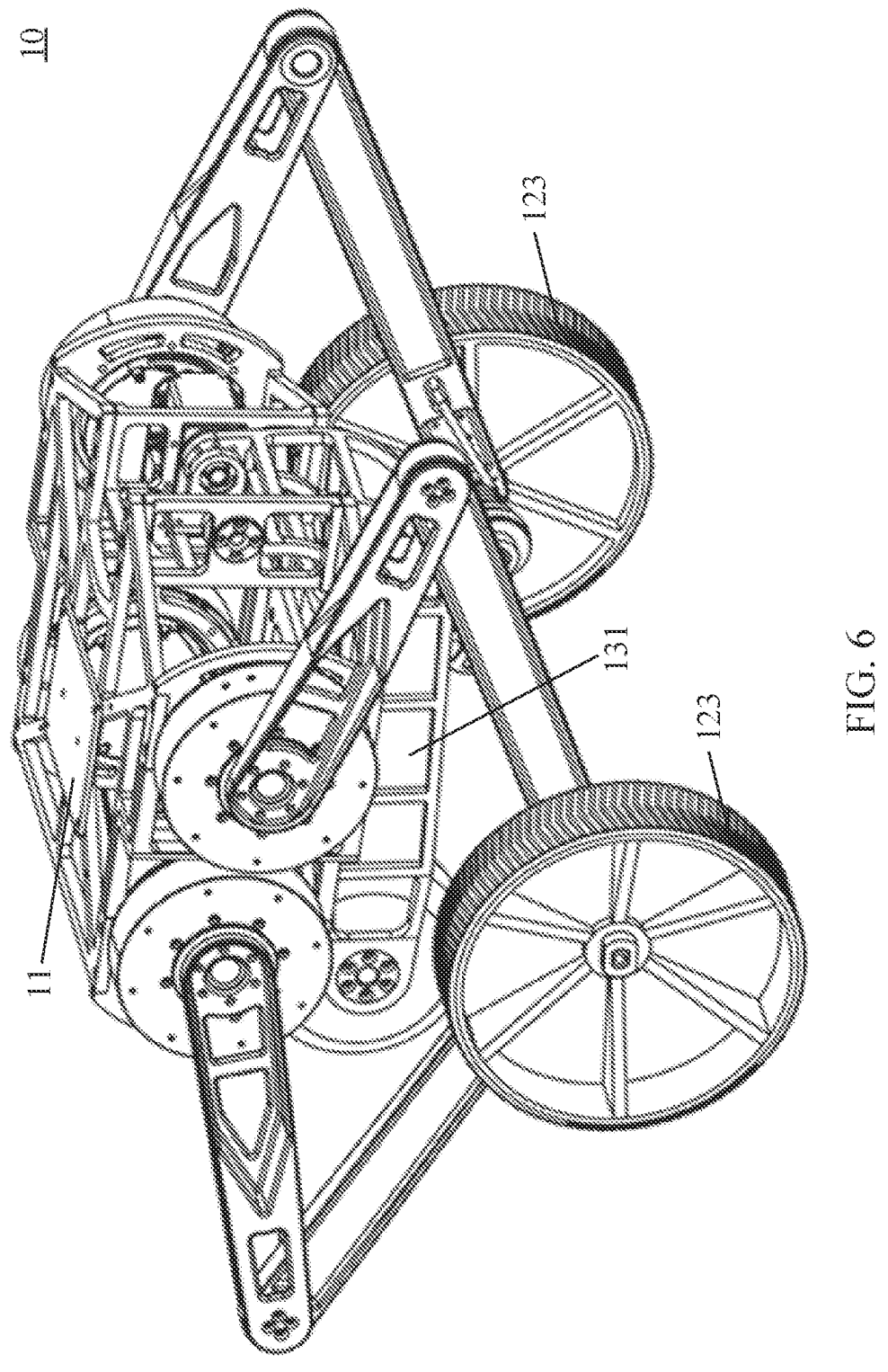
FIG. 6 is a schematic three-dimensional view of a wheel-legged robot whose balancing weight leg is in an inward-retracting state according to an exemplary embodiment of this application.

FIG. 3 to FIG. 5 respectively show a front view, a left view, and a top view of the wheel-legged robot 10 in a two-wheel standing state. FIG. 6 shows a schematic three-dimensional view of the wheel-legged robot 10 whose balancing weight leg 131 is in an inward-retracting state.

Figure 7:
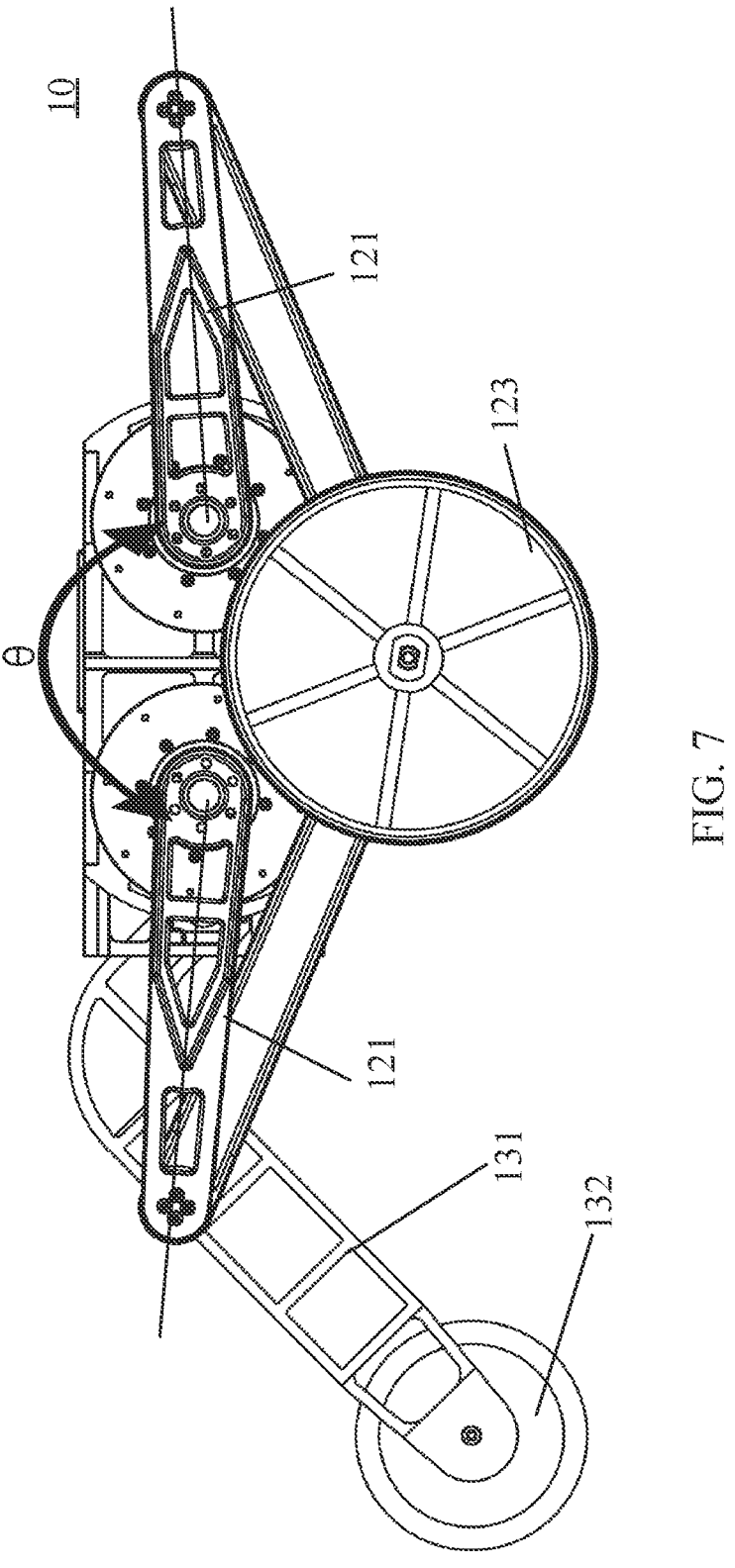
FIG. 7 is a front view of a wheel-legged robot in a three-wheel standing state according to an exemplary embodiment of this application.
Figure 8:
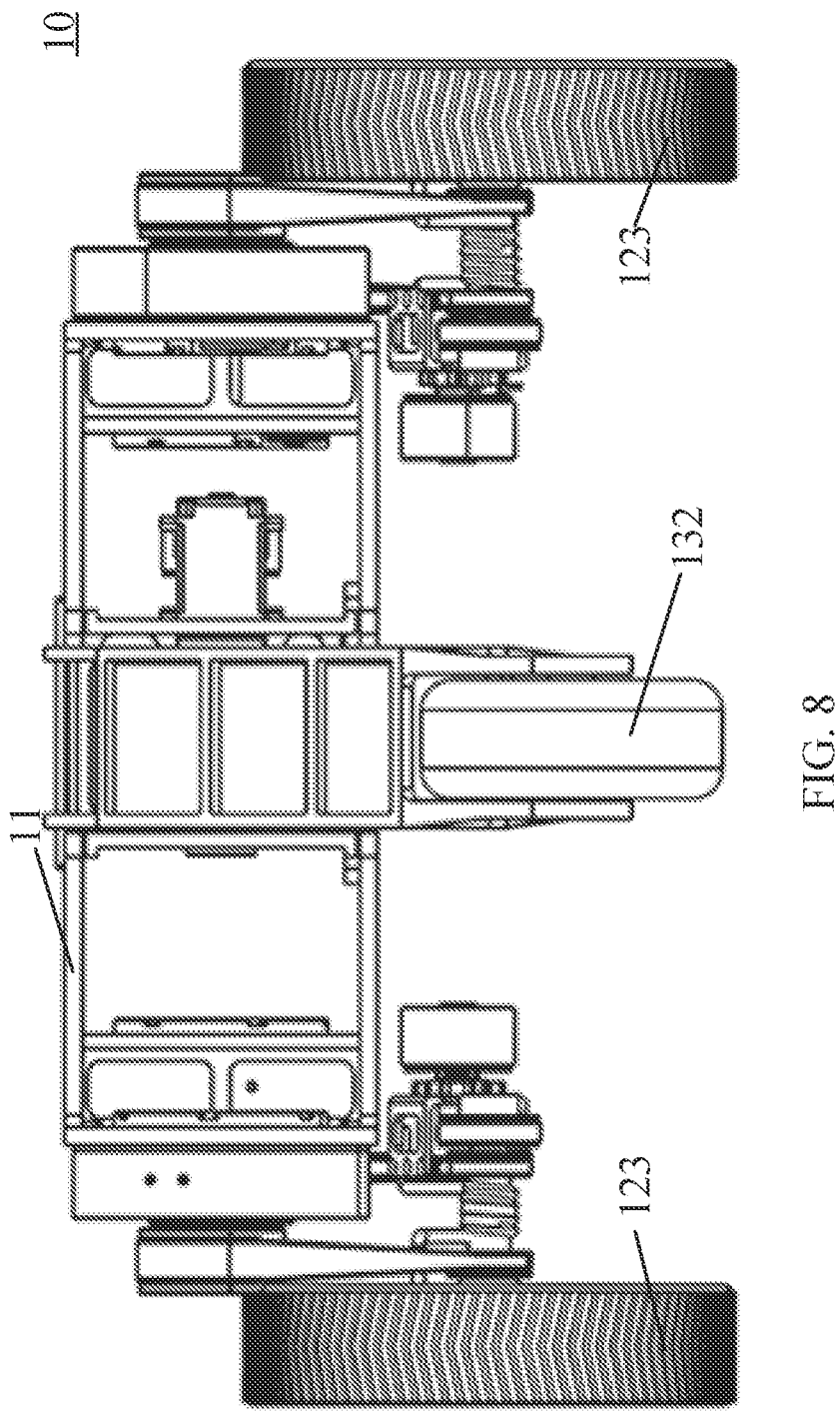
FIG. 8 is a side view of a wheel-legged robot in a three-wheel standing state according to an exemplary embodiment of this application.
Figure 9:
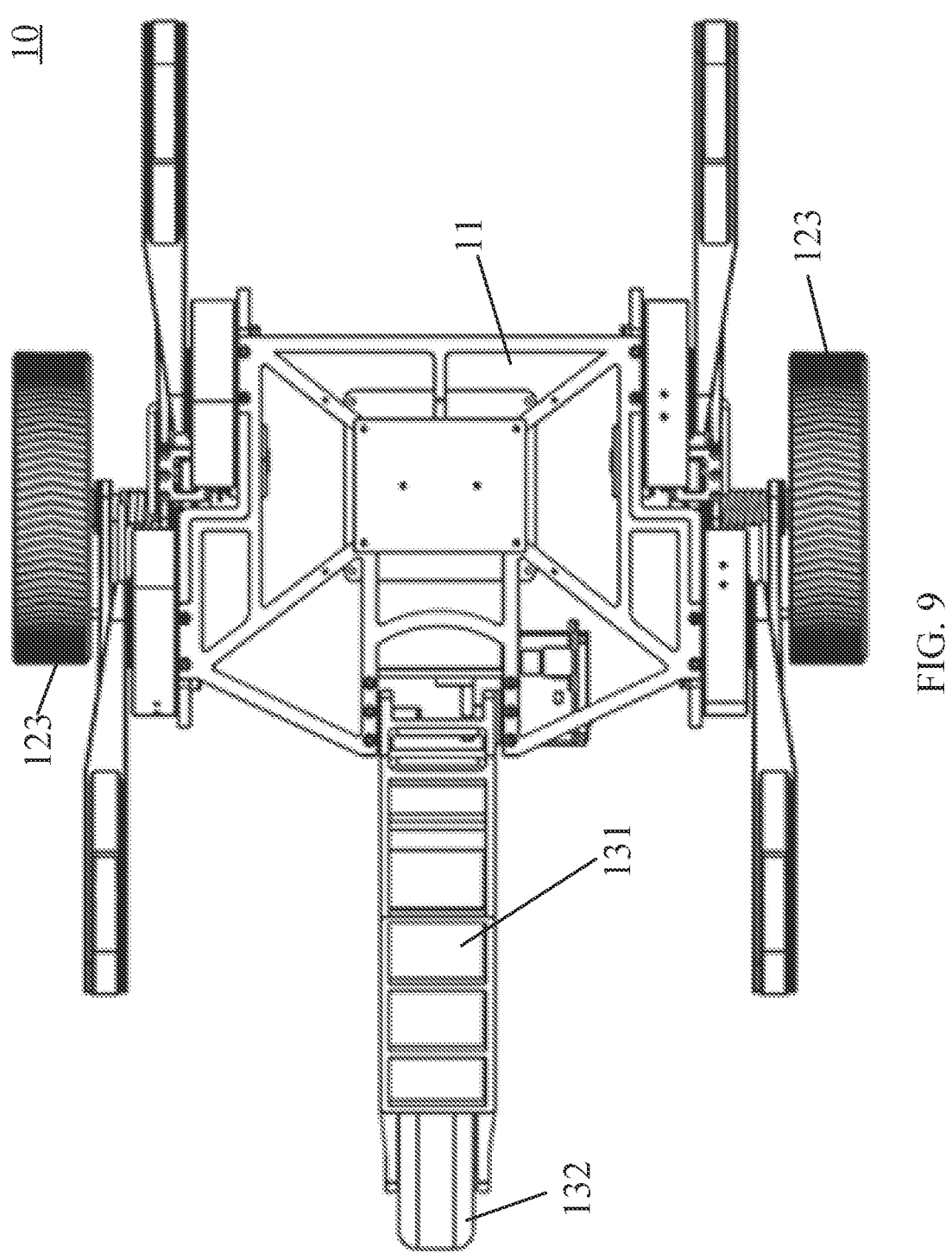
FIG. 9 is a top view of a wheel-legged robot in a three-wheel standing state according to an exemplary embodiment of this application.
Figure 10:
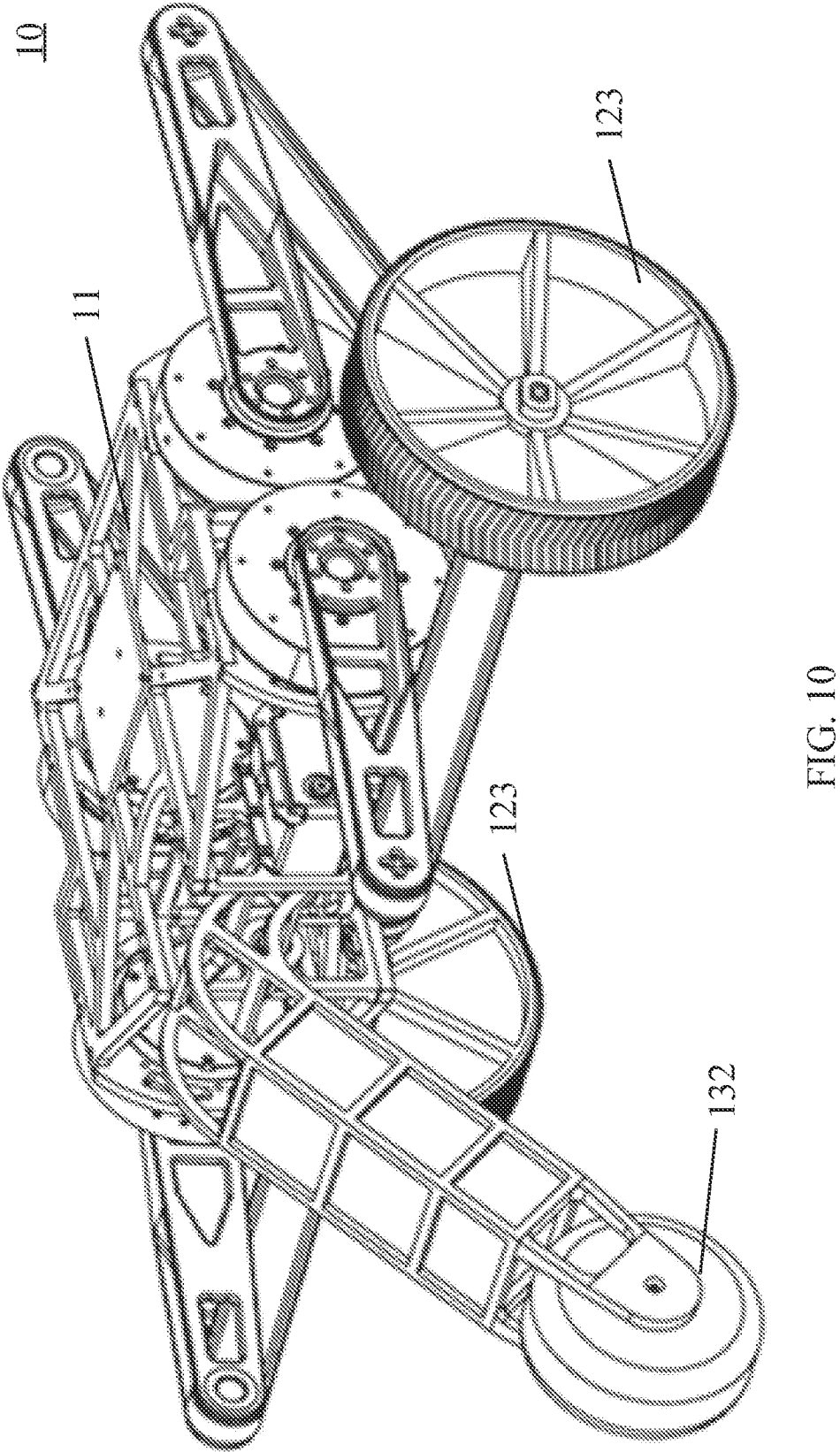
FIG. 10 is a schematic three-dimensional view of a wheel-legged robot in a three-wheel standing state according to an exemplary embodiment of this application.
Figure 11:
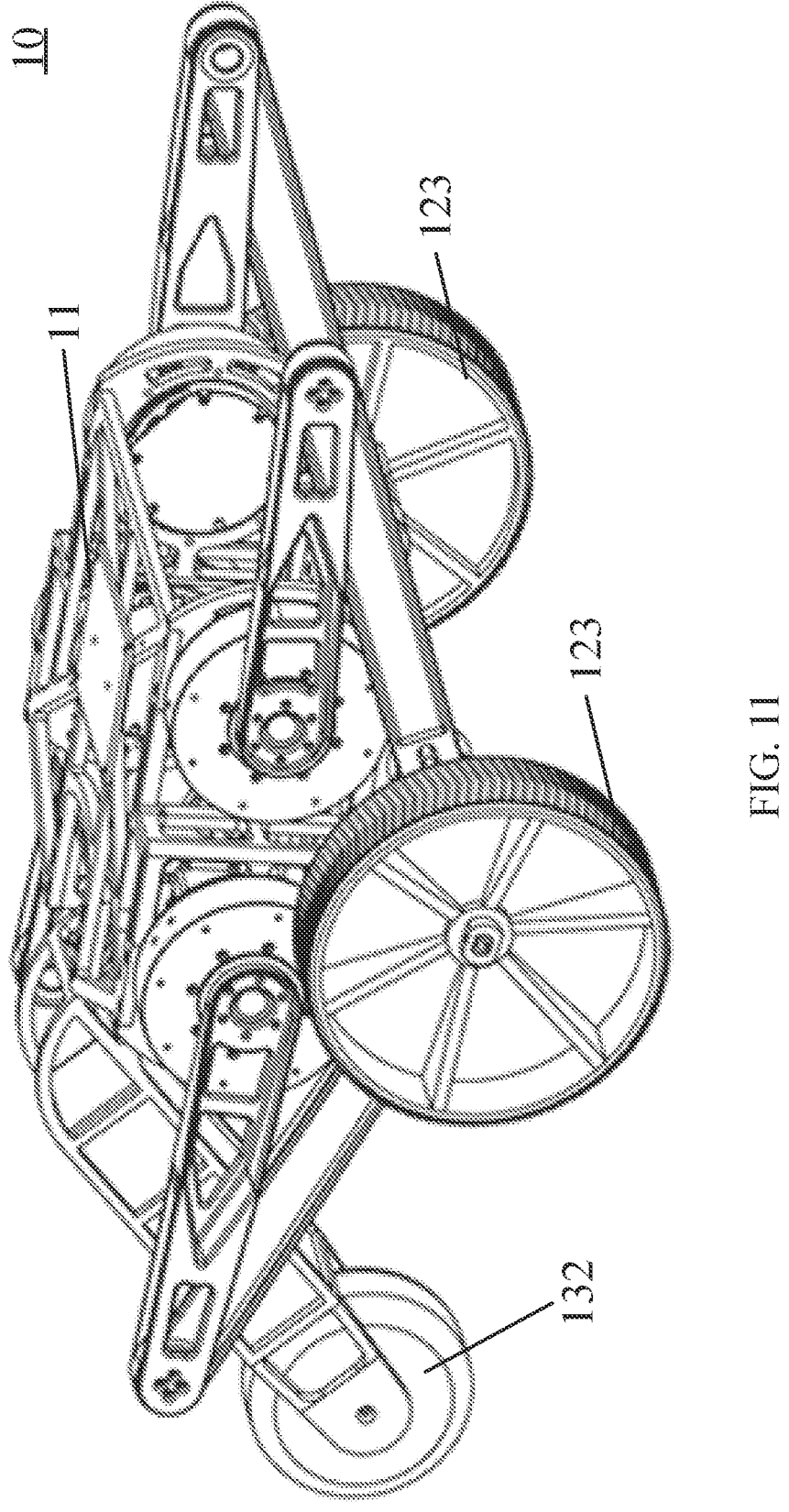
FIG. 11 is another schematic three-dimensional view of a wheel-legged robot in a three-wheel standing state according to an exemplary embodiment of this application.

In an implementation, the wheel-legged robot 10 may further be in a three-wheel standing state. In a case that the wheel-legged robot 10 is in the three-wheel standing state, FIG. 7 to FIG. 9 show a front view, a left view, and a top view of the wheel-legged robot 10 in the three-wheel standing state. FIG. 10 and FIG. 11 respectively show different three-dimensional views of the wheel-legged robot 10 in the three-wheel standing state.

Refer to FIG. 7. For example, a position angle formed by axis lines of the two rods included in the thigh unit 121 is θ. The position angle θ is <180°, and a mechanism may be in a self-stable state.

Figure 12:
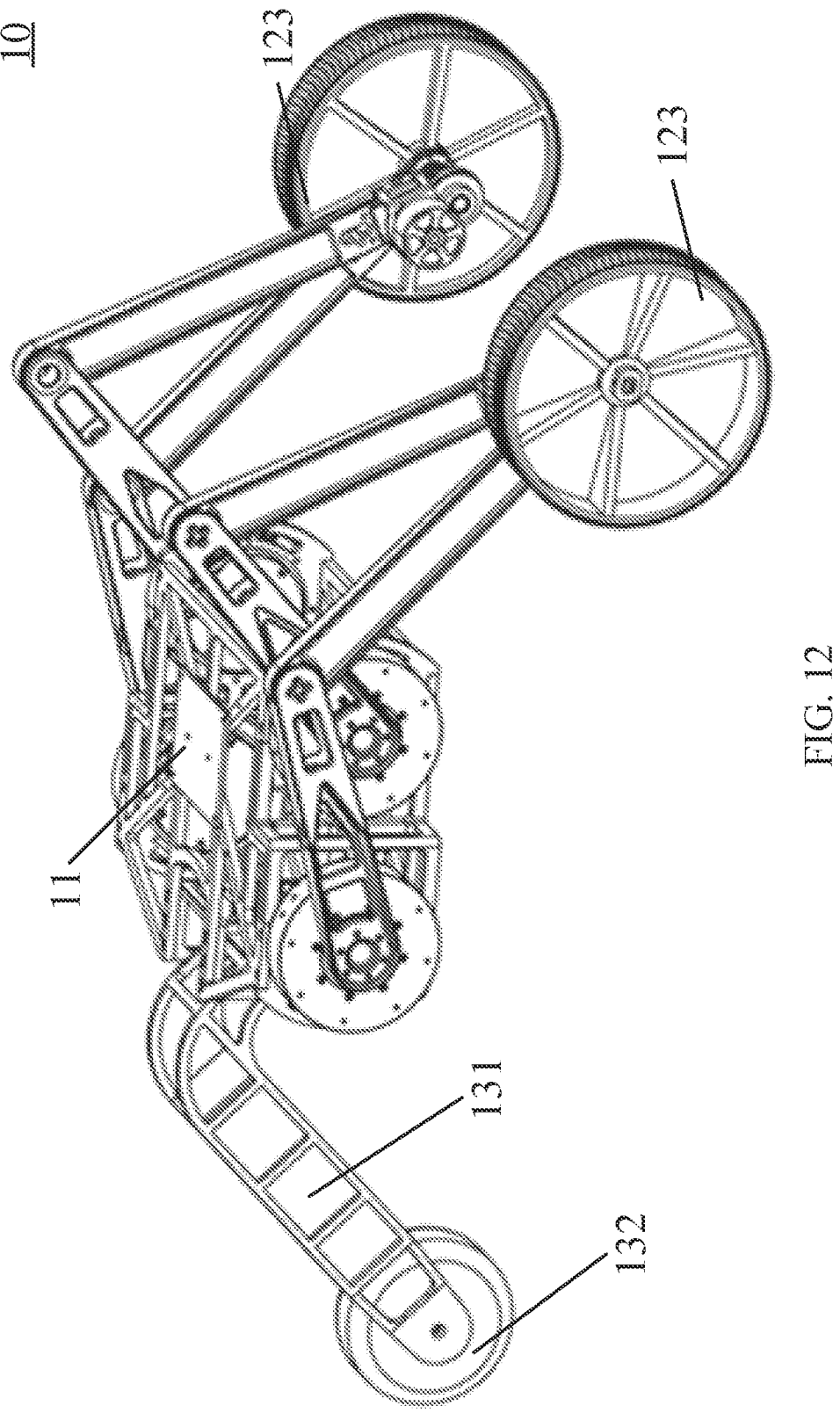
FIG. 12 is a schematic diagram of a form of a wheel-legged robot according to an exemplary embodiment of this application.

In an implementation, the wheel-legged robot 10 may be in another form, and FIG. 12 shows an example of a form.

It is to be understood that, the wheel-legged robot 10 is one type of the under-actuated system robot, and the following embodiments of this application only use the wheel-legged robot 10 as an example. A specific structure and shape of the wheel-legged robot 10 may be set according to an actual situation, and this application is not limited thereto.

Balance feedback control usually needs to be performed on the wheel-legged robot 10 to achieve balance of the wheel-legged robot 10. Balance feedback control mainly feeds back a self-balance measurement value to a control system, so that a final balance measurement value is up to a standard.

Figure 13:
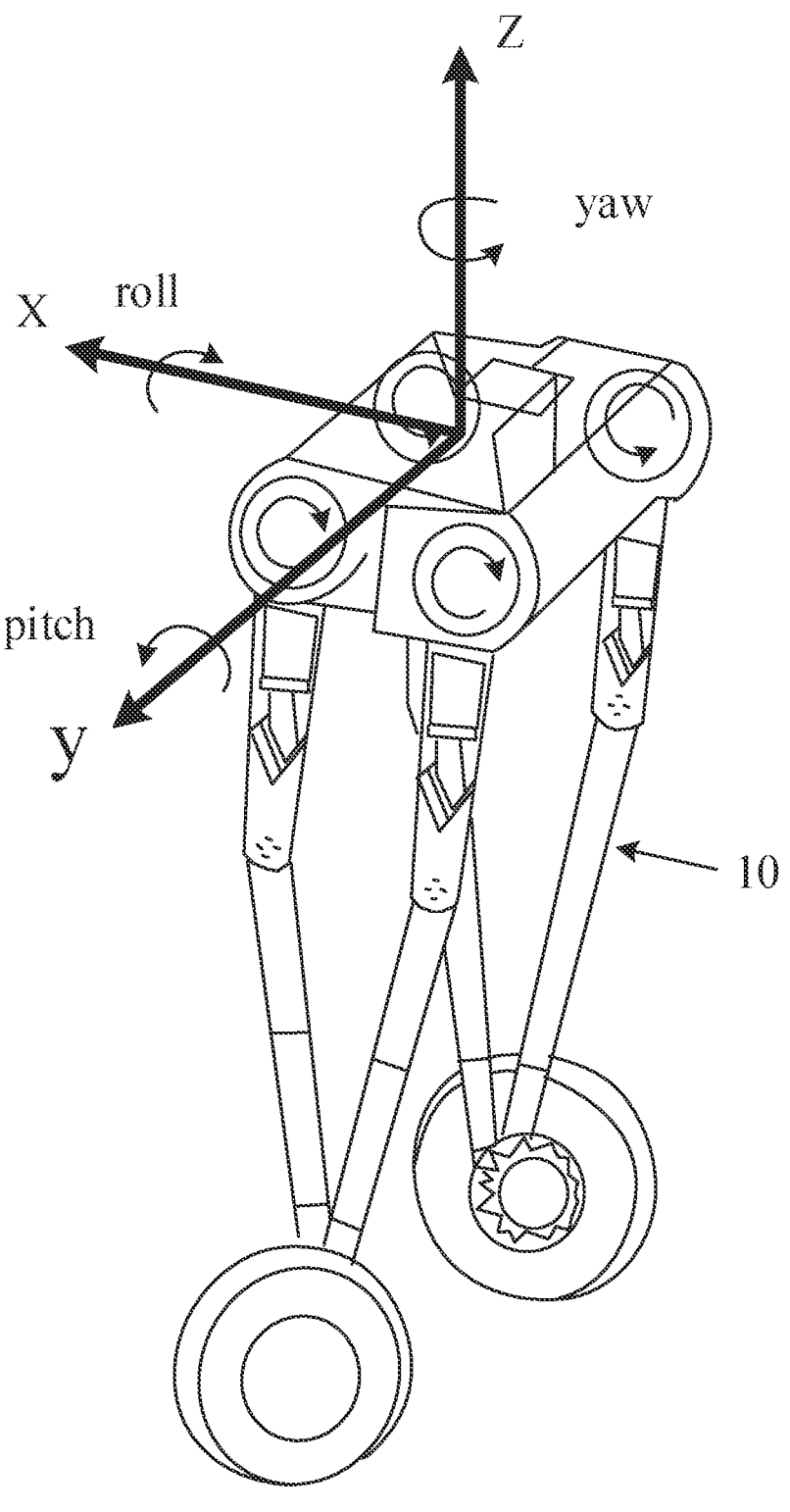
FIG. 13 is a schematic diagram of three spatial angles according to an exemplary embodiment of this application.

For example, FIG. 13 is a schematic diagram of three spatial angles according to an exemplary embodiment of this application. This embodiment of this application mainly performs balance from three spatial angles: a pitch angle, a yaw angle, and a roll angle.

Referring to FIG. 13, a three-dimensional right-hand Cartesian coordinate system is established for the wheel-legged robot 10. The roll angle is an angle of rotation around an x axis, the x axis is a coordinate axis in a forward direction of the wheel-legged robot 10 and corresponds to the roll angle, and the roll angle is subsequently represented by θ. The pitch angle is an angle of rotation around a y axis, the y axis is a coordinate axis in a two-wheel connecting direction of the wheel-legged robot 10 and corresponds to the pitch angle, and the pitch angle is subsequently represented by Q. The yaw angle is an angle of rotation around a z axis, the z axis is a coordinate axis in a vertical upward direction and corresponds to the yaw angle, and the yaw angle is subsequently represented by Q.

Balance control in directions of the three spatial angles are respectively described as follows:

Balance Control in a Pitch Direction:

An angle in the pitch direction represents a swing amplitude of the wheel-legged robot 10 in a forward direction. In other words, the angle in the pitch direction represents an angle at which the wheel-legged robot 10 swings back and forth in a control direction of wheel rotation, which is generated because there is only a single contact point between each wheel and a motion surface, and wheels of the wheel-legged robot 10 are horizontally arranged.

Control in the pitch direction includes a multi-closed-loop proportional-integral-derivative (PID) controller. The wheel-legged robot 10 is projected onto a two-dimensional plane to form a two-dimensional plane simplified model. X represents a distance that a wheel center horizontally moves in the two-dimensional plane simplified model. Assuming that the wheel does not slip or leave ground, X is equal to a product of an angle of rotation of the wheel and a radius of the wheel.

For example, $\dot{X}$ represents a movement speed of the wheel center, $\dot{X}_{ref}$ represents a reference speed of movement of the wheel center, and θ represents a pitch angle of the wheel-legged robot 10, that is, an angle of rotation in a direction perpendicular to a paper surface in the two-dimensional plane simplified model. Correspondingly, $\dot{\theta}$ represents a pitch angular velocity of the wheel-legged robot 10, $\dot{\theta}_{ref}$ represents a pitch angular velocity reference value of the wheel-legged robot 10, and t represents a torque inputted to a wheel motor of the wheel-legged robot 10. $\theta$, $\dot{\theta}$, and $\dot{X}$ are acquired through a sensor. $\theta$ and $\dot{\theta}$ are acquired through an inertial measurement unit (IMU), and $\dot{X}$ is acquired through an encoder sensor of the wheel.

Figures 14, 15:
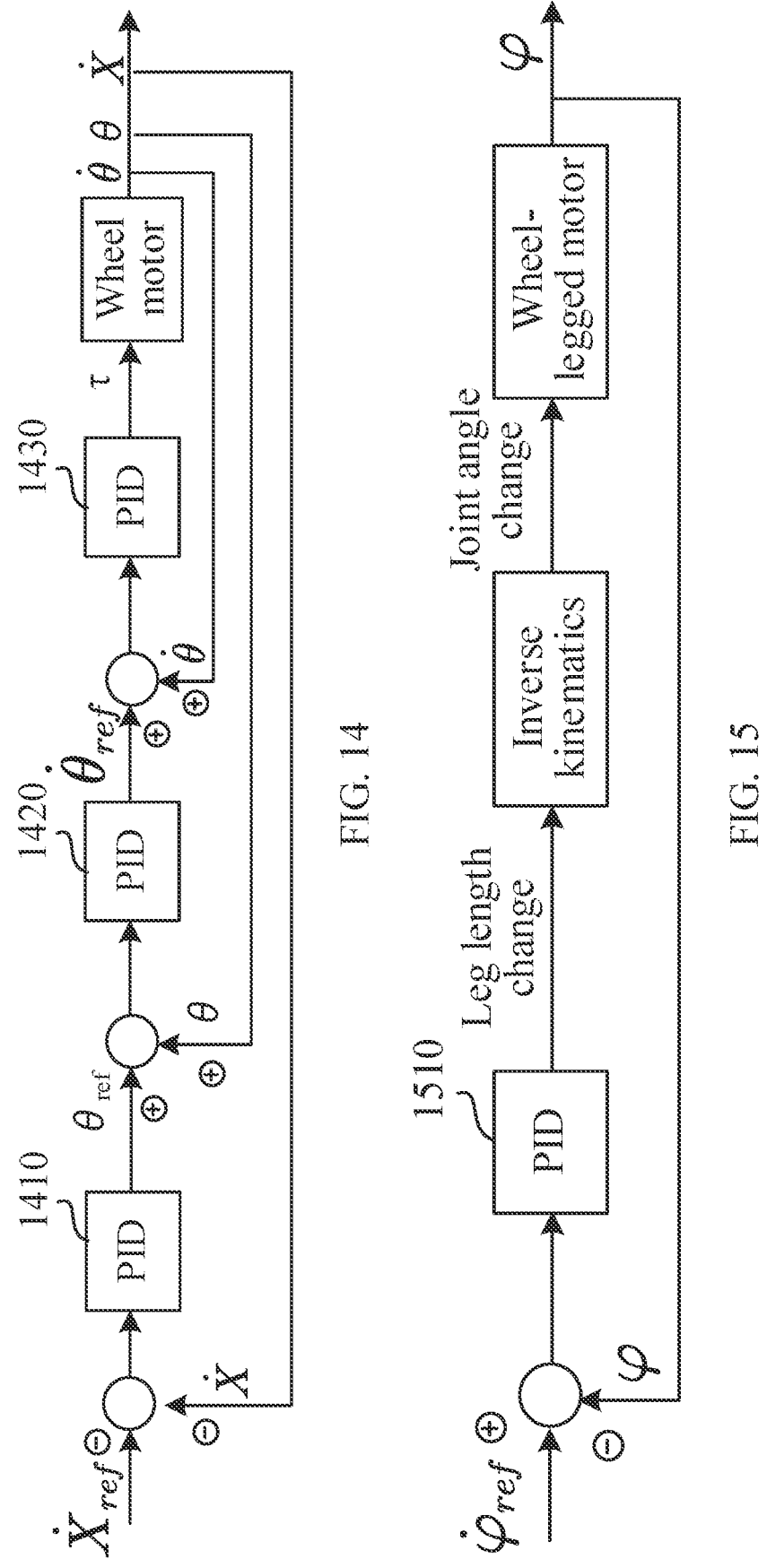
FIG. 14 is a block diagram of balance control in a pitch direction according to an exemplary embodiment of this application.
FIG. 15 is a schematic diagram of balance control in a roll direction according to an exemplary embodiment of this application.

FIG. 14 shows a block diagram of balance control in a pitch direction according to an exemplary embodiment of the embodiments of this application. An outermost control reference value is a speed reference value $\dot{X}_{ref}$ of movement of the wheel center.

First, the reference speed $\dot{X}_{ref}$ of movement of the wheel center is obtained, that is, a speed that the wheel expected to reach according to motion, and the movement speed $\dot{X}$ of the wheel center is acquired through the sensor. A result obtained by subtracting $\dot{X}_{ref}$ from the movement speed $\dot{X}$ of the wheel center is inputted to a PID controller 1410, and $\theta_{ref}$ is outputted through the PID controller 1410.

$\theta_{ref}$ is used as a control reference value of a next control loop. After Ores is subtracted from $\theta$, a pitch angle difference is obtained, that is, a difference between a current pitch angle and a reference pitch angle is obtained, and the pitch angle difference is inputted to a PID controller 1420 to obtain $\dot{\theta}$ref. Then, $\dot{\theta}_{ref}$ is used as a control reference value of a next control loop, a result obtained by subtracting $\dot{\theta}_{ref}$ from $\dot{\theta}$ is inputted to a PID controller 1430, and $\tau$ is outputted through the PID controller 1430. Balance control on the robot can be realized by sending $\tau$ to a wheel motor of the wheel-legged robot 10.

In addition, after a status of the wheel-legged robot 10 accordingly changes, values of $\theta$, $\dot{\theta}$, and $\dot{X}$ correspondingly change. The values are obtained and used in a new round of control on the wheel-legged robot 10, thereby forming a closed control loop.

$\tau$ obtained through the balance control may be used as a wheel rotation reference signal of a whole-body type controller of the wheel-legged robot 10. There are a plurality of implementations for a calculation and generation method of the reference signal. This application is only exemplary, and another calculation and generation method for obtaining t does not limit this application.

Balance Control in a Roll Direction:

In one embodiment, an angle in the roll direction represents a horizontal swing amplitude of the wheel-legged robot when lengths of two legs are different or heights of two legs are different, an ideal angle is inputted to a PID controller, and a leg length of the wheel-legged robot is controlled according to a difference between a current roll angle and the ideal angle, so that heights of a main body portion of the wheel-legged robot supported by the two legs of the wheel-legged robot are kept consistent. Generally, the ideal angle is 0, a leg length that needs to be changed at the current roll angle is calculated through the PID controller, and a joint angle variation is calculated according to leg length that needs to be changed, thereby controlling a joint angle of a leg configuration.

For example, referring to FIG. 15, a difference between an ideal angle $\varphi_{ref}$ and a roll angle $\varphi$ is inputted to a PID controller 1510, and a leg length change is outputted, thereby determining a joint angle variation based on the leg length change, and inputting the joint angle variation to a motor that controls the leg configuration, to control the joint angle.

Balance Control in a Yaw Direction:

An angle in the yaw direction represents an angle generated during rotation of the wheel-legged robot. In this embodiment, $\phi$ represents a yaw angle of the wheel-legged robot, $\dot{\phi}$ represents a yaw angular velocity of the wheel-legged robot, $\phi_{ref}$ represents a yaw angle reference value of the wheel-legged robot, and $\dot{\phi}_{ref}$ represents a yaw angular velocity reference value of the wheel-legged robot. For example, referring to FIG. 16, a difference between $\dot{\theta}_{ref}$ and $\dot{\phi}$ is inputted to a PID controller 1610, a torque increment $\Delta\tau$ is outputted, and the torque increment is applied to the wheel motor, thereby changing the angle in the yaw direction of the wheel-legged robot.

Based on the above, this application provides a mobile robot motion control method, which enables the mobile robot to implement bipedal-like motion. It is to be understood that, the bipedal-like motion is gait motion that imitates humans to perform alternate motion of left and right legs. The gait motion may be specifically implemented in a plurality of manners such as alternate walking, in-situ stepping, and the like. For example, when the mobile robot performs in-situ stepping motion, ground-touching positions of a first wheel part and a second wheel part of the mobile robot are kept unchanged. In another example, the mobile robot performs linear motion, curved motion, obstacle-crossing motion, and the like in an alternating walking gait, and the first wheel part and the second wheel part of the mobile robot moves according to different types of motion.

In some embodiments, the mobile robot is an under-actuated system robot. The under-actuated system robot is a robot whose number of drives is less than a number of joint degrees of freedom. In the pitch direction, the wheel motor of the under-actuated system robot is responsible for controlling a rotation position of the wheel, and is responsible for attitude balance control and the pitch attitude adjustment of the base part. On the basis that an attitude of the base part and a rotation distance of the wheel are dynamically coupled, and control can be achieved according to a dynamic relationship between the two.

For example, a wheel-legged robot that achieves two-wheeled balance is one type of the under-actuated system robot. Compared with a conventional bipedal robot, this type of robot has a common characteristic, that is, a plane on which a leg portion can move is perpendicular to the base part. In other words, the plane of the leg portion does not have a degree of freedom in the roll direction.

It may be understood that, in this embodiment of this application, the under-actuated system robot is a robot that lacks one degree of freedom in space. In one embodiment, the under-actuated system robot provided in this embodiment of this application is a wheel-legged robot that achieves two-wheel balance, and lacks a degree of freedom in the roll direction between a motion plane of the leg portion and the base part. For example, the wheel-legged robot includes a first wheel part, a second wheel part, and a base part connected to the first wheel part and the second wheel part. Motion planes of leg portions of the first wheel part and the second wheel part are kept perpendicular to the base part.

For a bipedal robot, since the bipedal robot has feet, the bipedal robot itself is balanced in the pitch direction. For the under-actuated system robot, a motion plane of a single leg is in a fixed (such as vertical) relationship with the base part, and as a result, motion of the leg portion only has a degree of freedom in the roll direction and the yaw direction but lacks a degree of freedom in the pitch direction, and motion of the leg portion lacks a rotational degree of freedom in the roll direction.

Based on this, a bipedal robot motion control method cannot implement steady-state adjustment on a center of mass of the robot in a specified direction, and cannot be used to implement stepping action generation and motion control on the robot that lacks the degree of freedom between the motion plane of the leg portion and the base part in the roll direction.

For example, the bipedal-like motion is in-situ stepping motion. The bipedal robot may generate motion trajectories by using a zero moment point (ZMP). A manner of generating the motion trajectories does not need to consider balance control in the pitch direction. For the under-actuated system robot, balance control in the pitch direction and the roll direction needs to be considered. For example, in an under-actuated system robot motion control method provided in this embodiment of this application, a center of mass and an attitude may be changed by using relevant information such as a length change and a contact force between a wheel and ground, thereby achieving balance control on the under-actuated system robot, and making it possible to use a gait of the bipedal-like motion in the under-actuated system robot.

It is to be understood that, the mobile robot in this embodiment of this application may be an under-actuated system robot. Furthermore, the mobile robot in this embodiment of this application is an under-actuated system robot that can achieve two-wheel balance, for example, a wheel-legged robot that achieves two-wheel balance. This type of robot lacks a degree of freedom in the roll direction between the motion plane of the leg portion and the base part. For example, the wheel-legged robot includes a first wheel part, a second wheel part, and a base part connected to the first wheel part and the second wheel part. Motion planes of leg portions of the first wheel part and the second wheel part are kept perpendicular to the base part.

FIG. 17 shows a flowchart of a mobile robot motion control method according to an exemplary embodiment of this application.

In some embodiments, the mobile robot is an under-actuated system robot.

The mobile robot includes a first wheel part having a telescopic leg portion, a second wheel part having a telescopic leg portion, and a base part connected to the first wheel part and the second wheel part. Referring to FIG. 1, for example, the under-actuated system robot is a wheel-legged robot 10. The wheel-legged robot 10 includes two wheel parts 12, and the two wheel parts 12 may be understood as the first wheel part and the second wheel part.

A tail part 13 of the wheel-legged robot 10 shown in FIG. 1 is in an extending state, and a tail part 13 of the wheel-legged robot 10 shown in FIG. 6 is in a retracting state. In some embodiments, a geometric center point of the driven wheel 132 of the tail part 13 overlaps an axial direction of the balancing weight leg 131. In some embodiments, the axial direction of the balancing weight leg 131 of the tail part 13 in the retracting state is parallel to the base part 11. For example, the tail part 13 is in the retracting state. A forward direction of the wheel-legged robot 10 is a direction in which the balancing weight leg 131 points to the driven wheel 132.

The following embodiments are described by using an example in which the first wheel part is a wheel part 12 on a left side of the forward direction of the wheel-legged robot 10, and the second wheel part is a wheel part 12 on a right side of the forward direction of the wheel-legged robot 10.

The first wheel part includes a first leg portion and a first wheel, and the second wheel part includes a second leg portion and a second wheel. The first leg portion and the second leg portion each include a thigh unit 121 and a calf unit 122. It is to be understood that the first leg portion and the second leg portion have a telescopic function, the first wheel part corresponds to a first drive motor, the second wheel part corresponds to a second drive motor, and the first drive motor and the second drive motor are respectively configured to drive different wheel parts to perform motion. For a specific driving manner, refer to the foregoing descriptions. Details are not described herein again.

It is to be understood that, the mobile robot in this embodiment of this application may be an under-actuated system robot. Furthermore, the mobile robot in this embodiment of this application is an under-actuated system robot that can achieve two-wheel balance, for example, a wheel-legged robot that achieves two-wheel balance. This type of robot lacks a degree of freedom in the roll direction between the motion plane of the leg portion and the base part. For example, the wheel-legged robot includes a first wheel part, a second wheel part, and a base part connected to the first wheel part and the second wheel part. Motion planes of leg portions of the first wheel part and the second wheel part are kept perpendicular to the base part.

Detailed descriptions are given below by using an example in which the mobile robot is an under-actuated system robot.

For example, the motion control method provided in this embodiment of this application includes:

Step 102: Control the first wheel part and the second wheel part to be in a standing balance state.

For example, the base part is parallel to a horizontal reference plane in the standing balance state.

A reference plane is a set of parameters and control points configured for defining a shape of the three-dimensional earth. The horizontal reference plane is a type of the reference plane, and a line connecting any point on the horizontal reference plane to a center of the earth is perpendicular to a ground tangent at the point.

In an implementation, the mobile robot is located on flat ground, and the base part remains parallel to the ground in the standing balance state. In another implementation, the mobile robot is located on a slope, and the base part remains parallel to the horizontal reference plane in the standing balance state. It may also be understood that, in a control scenario of the mobile robot, the mobile robot may face a variety of road conditions. For example, the road conditions include a flat road condition and a slope road condition. No matter what road conditions the mobile robot moves on, if the mobile robot performs bipedal-like motion, the base part may remain parallel to the ground on the flat road condition in the standing balance state.

It may be understood that, the standing balance state is a state in which the mobile robot is in static balance or dynamic balance. In this state, the base part remains parallel to the horizontal reference plane, and the mobile robot maintains body balance. In some embodiments, a position of the mobile robot remains unchanged in the standing balance state, that is, there is no movement. In some other embodiments, the mobile robot performs motion in the standing balance state, that is, there is movement. The following embodiments are described by using an example in which the position of the mobile robot remains unchanged in the standing balance state.

Figure 18:
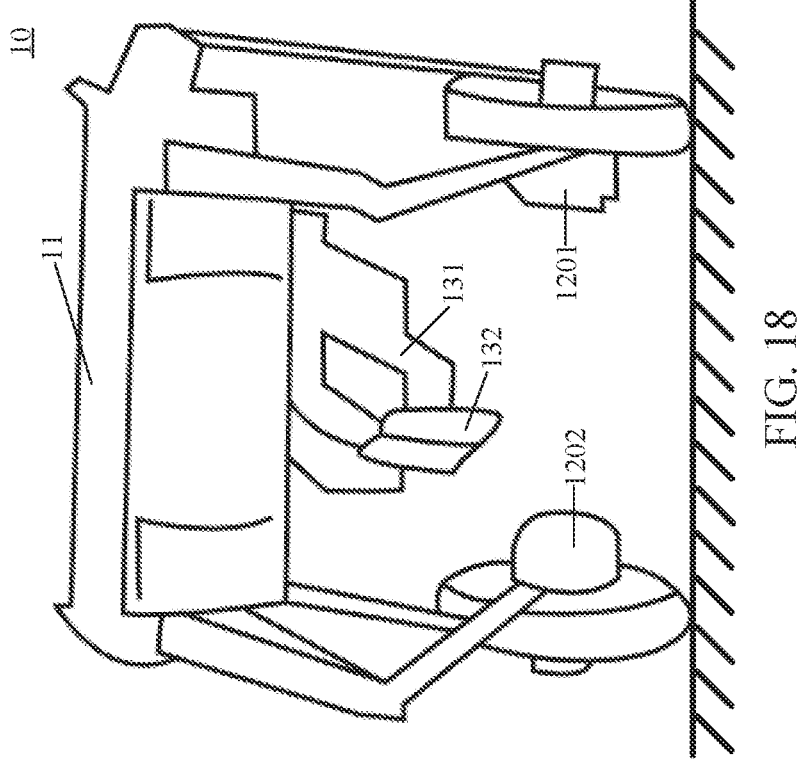
FIG. 18 is a schematic diagram of a standing balance state according to an exemplary embodiment of this application.

For example, the under-actuated system robot is a wheel-legged robot. FIG. 18 shows a schematic diagram of a standing balance state according to an exemplary embodiment of this application. The wheel-legged robot 10 includes a base part 11, a first wheel part 1201, and a second wheel part 1202.

With reference to the foregoing descriptions, a forward direction of the wheel-legged robot 10 is a direction in which the balancing weight leg 131 points to the driven wheel 132, which may also be understood as a direction in which the driven wheel 132 points to paper. For example, the first wheel part 1201 is a wheel part on a left side of the forward direction of the wheel-legged robot 10, and the second wheel part 1202 is a wheel part on a right side of the forward direction of the wheel-legged robot 10.

Refer to FIG. 18. The wheel-legged robot 10 is on the ground. In the standing balance state, both the first wheel part 1201 and the second wheel part 1202 are in contact with the ground, and the base part 11 remains parallel to the ground. In one embodiment, the first wheel part 1201 and the second wheel part 1202 have a same height, that is, the first wheel part 1201 and the second wheel part 1202 are in an equal-height state in the standing balance state. Therefore, when the under-actuated system robot is located on the flat ground, the standing balance state may also be understood as the equal-height state.

Step 104: Control the mobile robot to perform bipedal-like motion based on the standing balance state.

For example, during the bipedal-like motion, the first wheel part and the second wheel part alternately touch ground, and the base part obliquely swings.

The bipedal-like motion is gait motion that imitates humans to perform alternate motion of left and right legs. The gait motion may be specifically implemented in a plurality of manners such as alternate walking, in-situ stepping, and the like. For example, when the mobile robot performs in-situ stepping motion, ground-touching positions of a first wheel part and a second wheel part of the mobile robot are kept unchanged. In another example, the mobile robot performs linear motion, curved motion, obstacle-crossing motion, and the like in an alternating walking gait, and the first wheel part and the second wheel part of the mobile robot moves according to different statuses of motion.

For example, the bipedal-like motion is in-situ stepping motion. During the in-situ stepping motion, the first wheel part and the second wheel part imitate human feet and perform alternate lifting motion to achieve in-situ stepping.

As described above, the first wheel part and the second wheel part have telescopic leg portions. For example, the first wheel part includes a first leg portion, the second wheel part includes a second leg portion. Alternate ground-touching by the first wheel part and the second wheel part, and oblique swinging of the base part may be implemented through alternate extension and retraction of the first leg portion and the second leg portion.

For example, in the standing balance state, the first leg portion is controlled to retract, and the second leg portion is controlled to extend, so that the base part is inclined toward a first direction. In this case, the first wheel part and the second wheel part continue to maintain a ground-contacting state. Then, the first leg portion may be controlled to extend and the second leg portion may be controlled to retract, so that the second wheel part is lifted and in suspension off the ground. After the first leg portion keeps extending and the second leg portion keeps retracting for a period of time, the second wheel part may change from being in suspension off the ground to being contacting with the ground again. In this case, the base part may also restore to a state parallel to the horizontal reference plane, that is, the mobile robot returns to the standing balance state. Then, the first leg portion may be controlled to continue to extend and the second leg portion may be controlled to continue to retract, so that the base part is inclined toward a second direction. In this case, the first wheel part and the second wheel part continue to maintain the ground-contacting state, and the first direction is opposite to the second direction. Then, the first leg portion may be controlled to retract and the second leg portion may be controlled to extend, so that the first wheel part is lifted and in suspension off the ground. After the first leg portion keeps retracting and the second leg portion keeps extending for a period of time, the first wheel part may change from being in suspension off the ground to being contacting with the ground again. In this case, the base part may also restore to a state parallel to the horizontal reference plane, that is, the mobile robot returns to the standing balance state.

Based on the foregoing process, the mobile robot completes a cycle of in-situ stepping motion. Then, cyclical control may be performed based on the process in the foregoing description, to implement a plurality of cycles of in-situ stepping motion performed by the mobile robot.

In conclusion, in the mobile robot motion control method provided in this embodiment of this application, the first wheel part having the telescopic leg portion and the second wheel part having the telescopic leg portion are used to control the mobile robot to perform bipedal-like motion based on the standing balance state, thereby providing a new motion manner for the mobile robot. The bipedal-like motion has high terrain adaptability, strong application value, and strong robustness and stability.

Based on FIG. 17, FIG. 19 is a flowchart of a mobile robot motion control method according to an exemplary embodiment of this application. Step 104 may be implemented as step 1041, step 1042, step 1043, and step 1044. The bipedal-like motion performed by the mobile robot may be divided into a cyclic transition of the standing balance state, a first inclined state, the standing balance state, a second inclined state, and the standing balance state.

Figure 20:
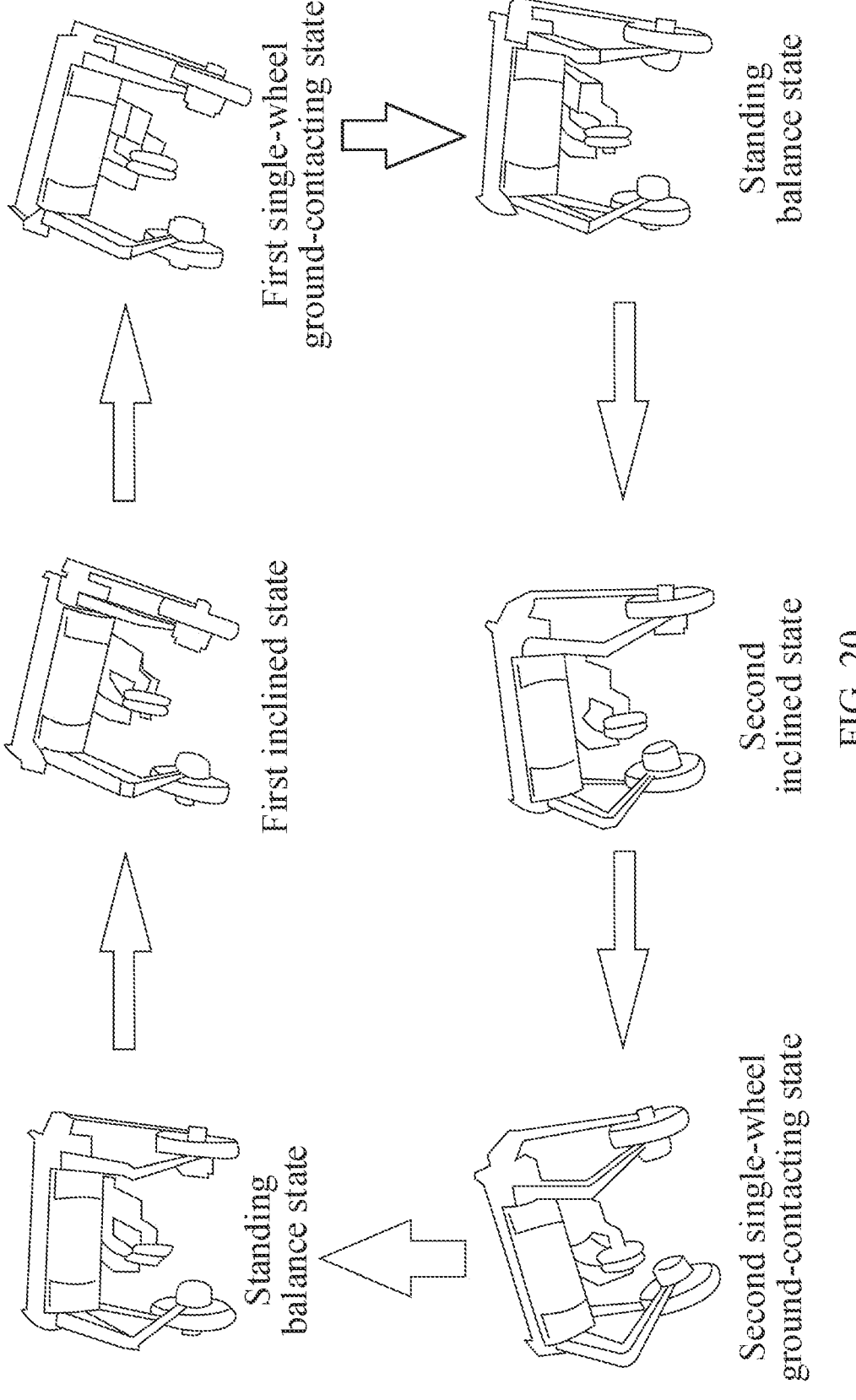
FIG. 20 is an exploded view of actions of bipedal-like motion according to an exemplary embodiment of this application.

For example, the first wheel part includes a first leg portion and a first wheel, and the second wheel part includes a second leg portion and a second wheel. FIG. 20 is an exploded view of actions of bipedal-like motion according to an exemplary embodiment of this application.

In some embodiments, the mobile robot is an under-actuated system robot.

For example, the under-actuated system robot performs motion on the flat ground. If the under-actuated system robot needs to perform bipedal-like motion, the first wheel part and the second wheel part are first controlled to be in a standing balance state. In the standing balance state, the first wheel and the second wheel are in contact with the ground, and the base part remains parallel to the ground.

In one embodiment, for example, the first wheel part is located in a first direction of the base part, and the second wheel part is located in a second direction of the base part, the bipedal-like motion performed by the under-actuated system robot may be implemented as follows:

1. The Under-Actuated System Robot is Controlled to Change from the Standing Balance State to the First Inclined State.

For example, in the standing balance state, the first leg portion of the first wheel part is controlled to retract, and the second leg portion of the second wheel part is controlled to extend, so that the under-actuated system machine changes to be in the first inclined state.

During extension and retraction of the first leg portion and the second leg portion, the base part is gradually inclined toward the first direction from a horizontal state parallel to the ground, and both the first wheel and the second wheel are in contact with the ground.

Refer to FIG. 20. The under-actuated system robot is on the flat condition. In the standing balance state, the under-actuated system robot maintains static balance, and the heights of the first wheel part and the second wheel part are the same, so that the base part remains parallel to the ground.

Then, the first wheel part and the second wheel part are driven through a motor to control the first leg portion to retract and the second leg portion to extend. In this case, on the basis that the first leg portion and the second leg portion are connected to the base part, the base part may be driven to be inclined, and the base part may be inclined toward the first direction from the horizontal state parallel to the ground. In addition, the first wheel and the second wheel are controlled to maintain the ground-contacting state.

2. The Under-Actuated System Robot is Controlled to Change from the First Inclined State to the First Single-Wheel Ground-Contacting State.

For example, in the first inclined state, the first leg portion of the first wheel part is controlled to extend, and the second leg portion of the second wheel part is controlled to retract, so that the under-actuated system robot changes to be in the first single-wheel ground-contacting state.

The first single-wheel ground-contacting state is a state in which the first wheel is in contact with the ground and the second wheel is in suspension.

Refer to FIG. 20. When the first leg portion retracts and the second leg portion extends, the first wheel and the second wheel always remains the ground-contacting state. In one embodiment, when a degree of inclination of a body of the under-actuated system robot meets a state switching condition, the first wheel part and the second wheel part are driven through the motor, to control the first leg portion to extend and the second leg portion to retract. It is to be understood that, an inclination angle of the base part in the first direction reaches the maximum at a moment when the state switching state is met. When the first inclined state is changed to the first single-wheel ground-contacting state, extension of the first leg portion and retraction of the second leg portion are simultaneously performed, and the base part is gradually inclined toward the second direction.

Then, based on a length change of the first leg portion and the second leg portion, the first wheel may still remain the ground-contacting state, but the second wheel is lifted and in suspension off the ground. In this case, the under-actuated system robot still maintains body balance, and the inclination angle of the base part in the first direction may gradually become smaller with extension and retraction of the first leg portion and the second leg portion.

3. The Under-Actuated System Robot is Controlled to Restore from the First Single-Wheel Ground-Contacting State to the Standing Balance State.

For example, in the first single-wheel ground-contacting state, the first leg portion is controlled to keep extending, and the second leg portion is controlled to keep retracting, to enable the under-actuated system machine to restore from the first single-wheel ground-contacting state to the standing balance state.

During extension and retraction of the first leg portion and the second leg portion, the base part is gradually inclined toward the second direction until restoring to the horizontal state parallel to the ground, and the second wheel restores from being in suspension to being in contact with the ground.

Refer to FIG. 20. As the first leg portion keeps extending and the second leg portion keeps retracting, based on the length change of the first leg portion and the second leg portion, inclination of the base part toward the second direction may cause a gradual decrease in the inclination angle of the base part in the first direction until the state parallel to the ground is restored. In this case, the second wheel may restore from being in suspension to being in contact with the ground, so that the under-actuated system robot restores to the standing balance state.

In this embodiment of this application, in the single-wheel ground-contacting state, the other in suspension single wheel may be lifted or move forward or backward, thereby achieving motion control on the robot.

4. The Under-Actuated System Robot is Controlled to Change from the Standing Balance State to the Second Inclined State.

For example, in the standing balance state, the first leg portion of the first wheel part is controlled to extend, and the second leg portion of the second wheel part is controlled to retract, so that the under-actuated system machine changes to be in the second inclined state.

During extension and retraction of the first leg portion and the second leg portion, the base part is gradually inclined toward the second direction from the horizontal state parallel to the ground, and both the first wheel and the second wheel are in contact with the ground.

Refer to FIG. 20. After the under-actuated system robot is restored to the standing balance state, the first wheel part and the second wheel part may be controlled to control the first leg portion to extend and the second leg portion to retract. In this case, on the basis that the first leg portion and the second leg portion are connected to the base part, the base part may be driven to be inclined, and the base part may be inclined toward the second direction from the horizontal state parallel to the ground. In addition, the first wheel and the second wheel are controlled to maintain the ground-contacting state.

5. The Under-Actuated System Robot is Controlled to Change from the Second Inclined State to the Second Single-Wheel Ground-Contacting State.

For example, in the second inclined state, the first leg portion of the first wheel part is controlled to retract, and the second leg portion of the second wheel part is controlled to extend, so that the under-actuated system robot changes to be in the second single-wheel ground-contacting state.

The second single-wheel ground-contacting state is a state in which the first wheel is in suspension and the second wheel is in contact with the ground.

Refer to FIG. 20. When the first leg portion extends and the second leg portion retracts, the first wheel and the second wheel always remains the ground-contacting state. In one embodiment, when the degree of inclination of a body of the under-actuated system robot meets a state switching condition, the first wheel part and the second wheel part are driven through the motor, to control the first leg portion to retract and the second leg portion to extend. It is to be understood that, an inclination angle of the base part in the second direction reaches the maximum at a moment when the state switching state is met. When the second inclined state is changed to the second single-wheel ground-contacting state, retraction of the first leg portion and extension of the second leg portion are simultaneously performed, and the base part is gradually inclined toward the first direction.

Then, based on a length change of the first leg portion and the second leg portion, the second wheel may still remain the ground-contacting state, but the first wheel is lifted and in suspension off the ground. In this case, the under-actuated system robot still maintains body balance, and the inclination angle of the base part in the second direction may gradually become smaller with extension and retraction of the first leg portion and the second leg portion.

6. The Under-Actuated System Robot is Controlled to Restore from the Second Single-Wheel Ground-Contacting State to the Standing Balance State.

For example, in the second single-wheel ground-contacting state, the first leg portion is controlled to keep retracting, and the second leg portion is controlled to keep extending, to enable the under-actuated system machine to restore from the second single-wheel ground-contacting state to the standing balance state.

During extension and retraction of the first leg portion and the second leg portion, the base part is gradually inclined toward the first direction until restoring to the horizontal state parallel to the ground, and the first wheel changes from being in contact with the ground to being in suspension and then restores to being in contact with the ground again.

Refer to FIG. 20. As the first leg portion keeps retracting and the second leg portion keeps extending, based on the length change of the first leg portion and the second leg portion, inclination of the base part toward the first direction may cause a gradual decrease in the inclination angle of the base part in the second direction until the state parallel to the ground is restored. In this case, the first wheel may restore from being in suspension to being in contact with the ground, so that the under-actuated system robot restores to the standing balance state.

The foregoing process gives a motion cycle of the under-actuated system robot in the bipedal-like motion. In a motion cycle, the base part sequentially undergoes a process of being parallel to the ground, being inclined toward the first direction, restoring to being parallel to the ground, being inclined toward the second direction, and restoring to being parallel to the ground, to form oblique swinging of the base part.

It is to be understood that, a plurality of motion cycles of the bipedal-like motion can be achieved by cyclically repeating six steps in the foregoing process. Details are not described herein again.

Refer to FIG. 19. For example, the first wheel part is located in the first direction of the base part, and the second wheel part is located in the second direction of the base part. Steps 1041, 1042, 1043 and 1044 are specifically as follows:

Step 1041: Control the mobile robot to change from the standing balance state to a first inclined state.

For example, the first inclined state is a state in which the base part is inclined toward the first direction.

In some embodiments, the mobile robot is an under-actuated system robot.

Figure 21:
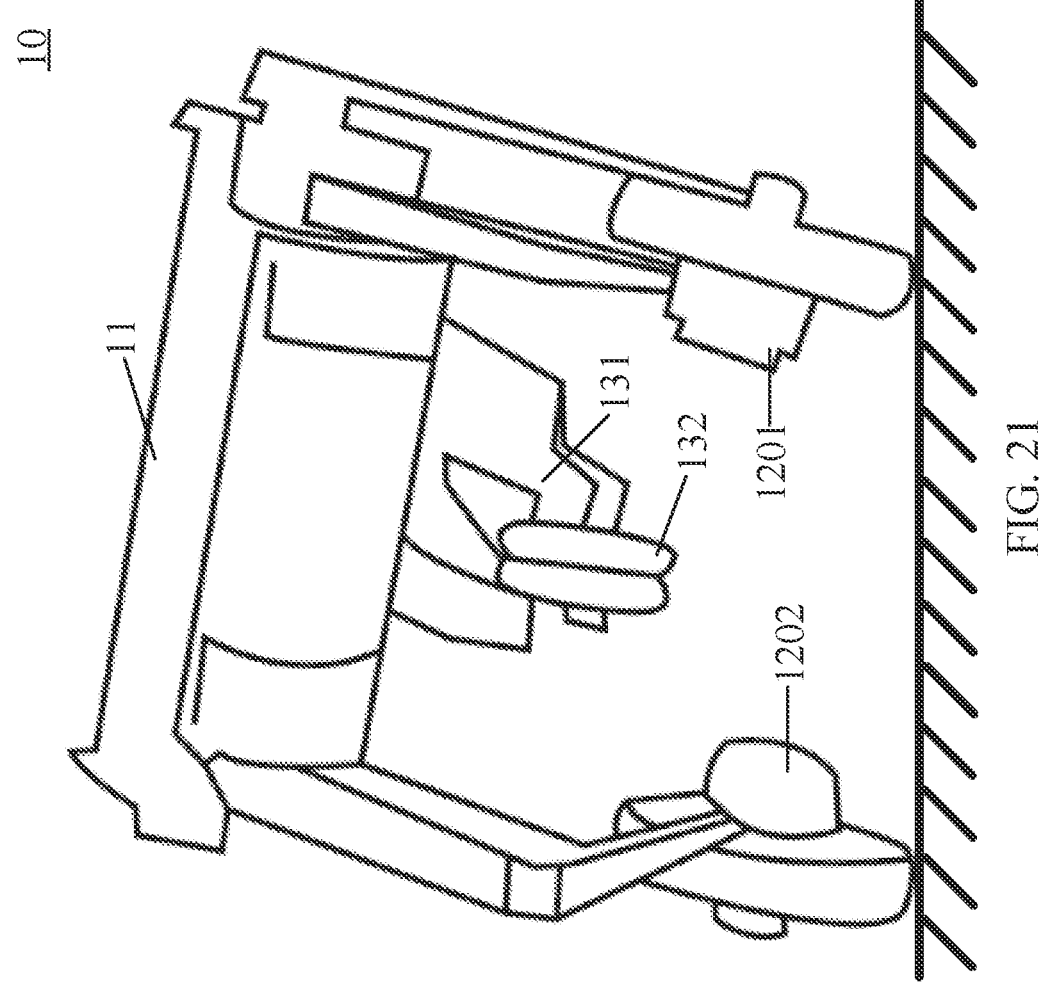
FIG. 21 is a schematic diagram of a first inclined state according to an exemplary embodiment of this application.

For example, the under-actuated system robot is a wheel-legged robot. FIG. 21 shows a schematic diagram of a first inclined state according to an exemplary embodiment of this application. The wheel-legged robot 10 includes a base part 11, a first wheel part 1201, and a second wheel part 1202.

With reference to the foregoing descriptions, a forward direction of the wheel-legged robot 10 is a direction in which the balancing weight leg 131 points to the driven wheel 132, which may also be understood as a direction in which the driven wheel 132 points to paper. For example, the first wheel part 1201 is a wheel part on a left side of the forward direction of the wheel-legged robot 10, and the second wheel part 1202 is a wheel part on a right side of the forward direction of the wheel-legged robot 10.

Refer to FIG. 21. The wheel-legged robot 10 is on the ground. In the first inclined state, both the first wheel part 1201 and the second wheel part 1202 are in contact with the ground, and the base part 11 is inclined toward the first direction. The inclination of the base part 11 toward the first direction may cause inclination of the body of the wheel-legged robot 10. In some embodiments, the inclination of the base part 11 toward the first direction may cause the body of the wheel-legged robot 10 to be also inclined toward the first direction. In one embodiment, an inclination angle of the wheel-legged robot 10 is configured for indicating an inclination angle of the body of the wheel-legged robot 10. Refer to FIG. 21. The inclination angle is configured for indicating an angle between the base part 11 and a horizontal plane of the ground.

In one embodiment, step 1041 may be implemented as follows:

A first leg portion of the first wheel part is controlled to retract and a second leg portion of the second wheel part is controlled to extend, to enable an under-actuated system machine to be in the first inclined state.

During extension and retraction of the first leg portion and the second leg portion, the base part is gradually inclined toward the first direction from a horizontal state parallel to the horizontal reference plane, and both the first wheel and the second wheel are in contact with the ground.

In this embodiment, during extension and retraction of the first leg portion and the second leg portion, both the first wheel and the second wheel are in contact with the ground, which ensures overall stability of the robot body during the extension and retraction, thereby ensuring stability of the robot during motion control.

In an implementation, the mobile robot is located on the ground, and heights of the first leg portion and the second leg portion are the same in the standing balance state. Then, the first leg portion is controlled to retract and the second leg portion is controlled to extend, so that the height of the first leg portion decreases and the height of the second leg portion increases.

In another implementation, the mobile robot is located on the slope, and heights of the first leg portion and the second leg portion are different in the standing balance state. For example, the first leg portion is higher than the second leg portion. In a process of controlling the first leg portion to retract and the second leg portion to extend, the height of the first leg portion is still higher than the height of the second leg portion within a first time period. If the first leg portion is continuously controlled to retract and the second leg portion is continuously controlled to extend, the heights of the first leg portion and the second leg portion may become equal at a moment after the first time period. Then, if the first leg portion is continuously controlled to retract and the second leg portion is continuously controlled to extend, the height of the first leg portion is lower than the height of the second leg portion within a second time period, where the second time period is a time period after the first time period.

Step 1042: Control the mobile robot to restore from the first inclined state to the standing balance state.

For example, in the process in which the mobile robot restores from the first inclined state to the standing balance state, a first wheel of the first wheel part is in contact with the ground, and a second wheel of the second wheel part is in suspension.

With reference to the foregoing descriptions, in the process in which the mobile robot stores from the first inclined state to the standing balance state, the first wheel remains the ground-contacting state, and the second wheel may sequentially undergo changes of being contact with the ground, being in suspension, and restoring to being contact with the ground. In a case that the first wheel is in contact with the ground and the second wheel is in suspension, a state of the mobile robot may be considered as the first single-wheel ground-contacting state.

In one embodiment, step 1042 may be implemented as follows:

The first leg portion of the first wheel part is controlled to extend and the second leg portion of the second wheel part is controlled to retract, to enable the mobile robot to be in a first single-wheel ground-contacting state, the first single-wheel ground-contacting state being a state in which the first wheel is in contact with the ground and the second wheel is in suspension; and the first leg portion is controlled to keep extending and the second leg portion is controlled to keep retracting, to enable the under-actuated system machine to restore from the first single-wheel ground-contacting state to the standing balance state.

During extension and retraction of the first leg portion and the second leg portion, the base part is gradually inclined toward the second direction until restoring to the horizontal state parallel to the horizontal reference plane, and the second wheel changes from being in contact with the ground to being in suspension and then restores to being in contact with the ground again.

In some embodiments, the mobile robot is an under-actuated system robot.

Figure 22:
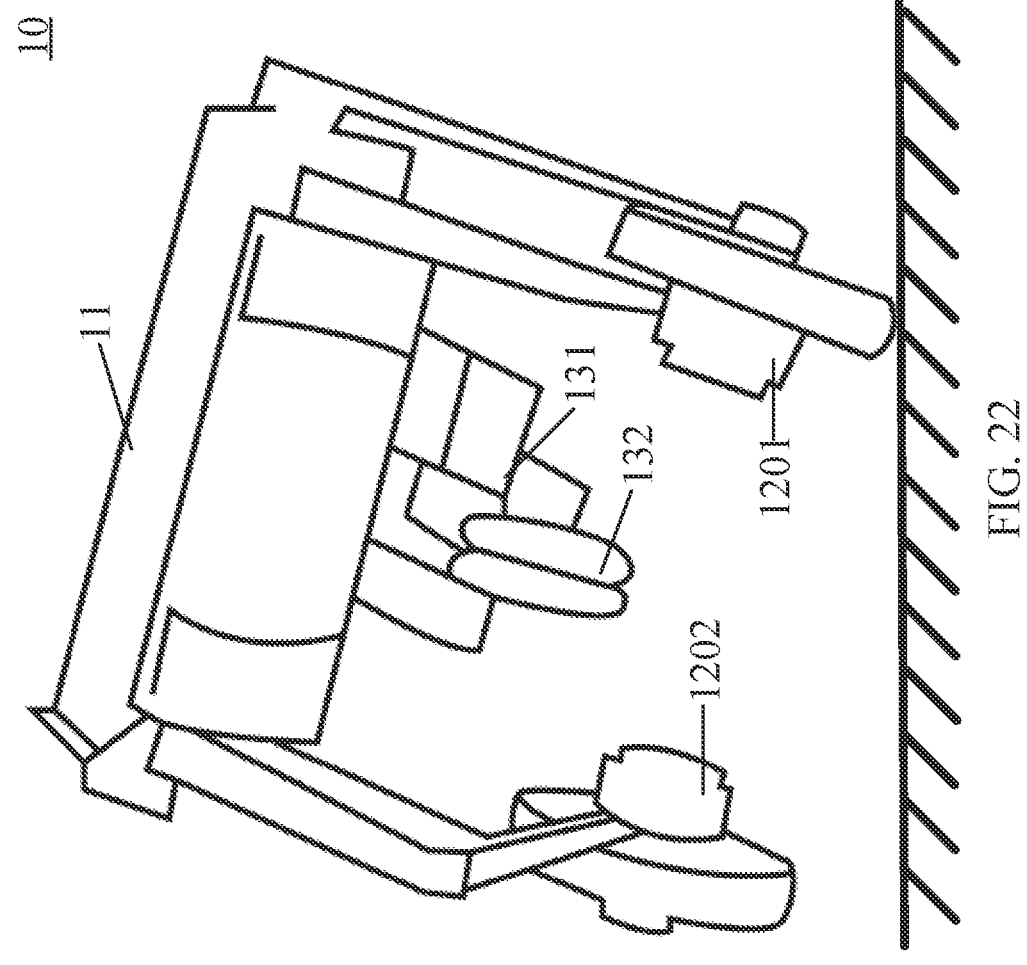
FIG. 22 is a schematic diagram of a first single-wheel ground-contacting state according to an exemplary embodiment of this application.

That the under-actuated system robot is a wheel-legged robot is still used as an example. FIG. 22 shows a schematic diagram of a first single-wheel ground-contacting state according to an exemplary embodiment of this application. The wheel-legged robot 10 includes a base part 11, a first wheel part 1201, and a second wheel part 1202. A forward direction of the wheel-legged robot 10 is a direction in which the balancing weight leg 131 points to the driven wheel 132.

Refer to FIG. 22. In the first single-wheel ground-contacting state, the first wheel part 1201 is in contact with the ground, the second wheel part 1202 is in suspension, and the base part 11 is inclined toward the first direction. The inclination of the base part 11 toward the first direction may cause inclination of the body of the wheel-legged robot 10. In some embodiments, the inclination of the base part 11 toward the first direction may cause the body of the wheel-legged robot 10 to be inclined toward the first direction.

In an implementation, the mobile robot is located on the ground, and the length of the first leg portion is the same as the height of the second leg portion in the standing balance state. In this case, in the process in which the mobile robot restores from the first inclined state to the standing balance state, the heights of the first leg portion and the second leg portion may change, and the change may be measured by using the lengths of the first leg portion and the second leg portion.

In one embodiment, when the lengths of the first leg portion and the second leg portion are the same in the standing balance state (that is, the mobile robot is on the flat ground), the mobile robot is in the first single-wheel ground-contacting state within first duration.

The length of the first leg portion is less than the length of the second leg portion within the first duration; and the length of the first leg portion is the same as the length of the second leg portion at a termination node of the first duration.

The mobile robot is still in the first inclined state at a previous time node of an initial node of the first duration. In this case, the length of the first leg portion may be much smaller than the length of the second leg portion. In addition, on the basis that the length of the first leg portion retracts to the shortest and the length of the second leg portion extends to the longest, the inclination angle of the base part in the first direction reaches the maximum.

Then, at the initial node of the first duration, the first leg portion is controlled to extend and the second leg portion is controlled to retract. In this case, the length of the first leg portion is still less than the length of the second leg portion. As time goes by, based on continuous extension of the first leg portion and continuous retraction of the second leg portion, a length difference between the first leg portion and the second leg portion gradually decreases; and the length of the first leg portion is the same as the length of the second leg portion at a termination node of the first duration.

Step 1043: Control the mobile robot to change from the standing balance state to a second inclined state.

For example, the second inclined state is a state in which the base part is inclined toward the second direction.

In some embodiments, the mobile robot is an under-actuated system robot.

Figure 23:
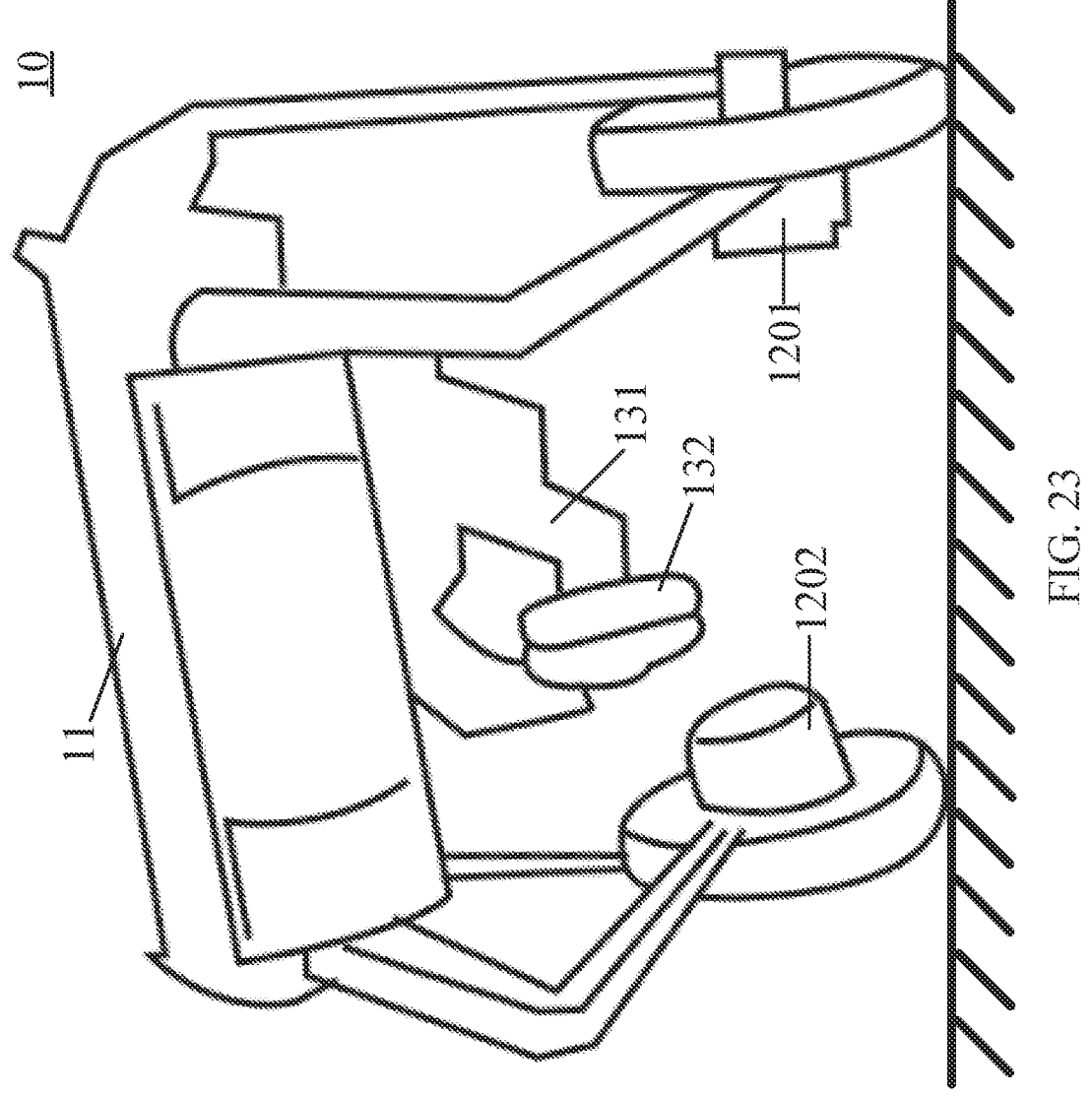
FIG. 23 is a schematic diagram of a second inclined state according to an exemplary embodiment of this application.

For example, the under-actuated system robot is a wheel-legged robot. FIG. 23 shows a schematic diagram of a second inclined state according to an exemplary embodiment of this application. The wheel-legged robot 10 includes a base part 11, a first wheel part 1201, and a second wheel part 1202. A forward direction of the wheel-legged robot 10 is a direction in which the balancing weight leg 131 points to the driven wheel 132.

Refer to FIG. 23. The wheel-legged robot 10 is on the ground. In the second inclined state, both the first wheel part 1201 and the second wheel part 1202 are in contact with the ground, and the base part 11 is inclined toward the second direction. The inclination of the base part 11 toward the second direction may cause inclination of the body of the wheel-legged robot 10.

In one embodiment, step 1043 may be implemented as follows:

The first leg portion of the first wheel part is controlled to extend and the second leg portion of the second wheel part is controlled to retract, to enable the under-actuated system machine to be in the second inclined state.

During extension and retraction of the first leg portion and the second leg portion, the base part is gradually inclined toward the second direction from the horizontal state parallel to the horizontal reference plane, and both the first wheel and the second wheel are in contact with the ground.

In an implementation, the mobile robot is located on the flat ground, and heights of the first leg portion and the second leg portion are the same after the standing balance state is restored. Then, the first leg portion is controlled to extend and the second leg portion is controlled to retract, so that the height of the first leg portion increases and the height of the second leg portion decreases.

In another implementation, the mobile robot is located on the slope, and heights of the first leg portion and the second leg portion are different after the standing balance state is restored. For example, the first leg portion is higher than the second leg portion. In a process of controlling the first leg portion to extend and the second leg portion to retract, the height of the first leg portion is still higher than the height of the second leg portion within a third time period, where the third time period is a time period after the second time period. For descriptions of the second time period, refer to the foregoing descriptions. If the first leg portion is continuously controlled to extend and the second leg portion is continuously controlled to retract, the heights of the first leg portion and the second leg portion may become equal at a moment after the third time period. Then, if the first leg portion is continuously controlled to extend and the second leg portion is continuously controlled to retract, the height of the first leg portion is lower than the height of the second leg portion within a fourth time period, where the fourth time period is a time period after the third time period.

Step 1044: Control the mobile robot to restore from the second inclined state to the standing balance state.

For example, in the process in which the mobile robot restores from the second inclined state to the standing balance state, the second wheel is in contact with the ground, and the first wheel is in suspension.

With reference to the foregoing descriptions, in the process in which the mobile robot stores from the second inclined state to the standing balance state, the second wheel remains the ground-contacting state, and the first wheel may sequentially undergo changes of being contact with the ground, being in suspension, and restoring to being contact with the ground. In a case that the first wheel is in suspension and the second wheel is in contact with the ground, a state of the mobile robot may be considered as the second single-wheel ground-contacting state.

In one embodiment, step 1044 may be implemented as follows:

The first leg portion of the first wheel part is controlled to retract and the second leg portion of the second wheel part is controlled to extend, to enable the mobile robot to be in a second single-wheel ground-contacting state, the second single-wheel ground-contacting state being a state in which the first wheel is in suspension and the second wheel is in contact with the ground; and the first leg portion is controlled to keep retracting and the second leg portion is controlled to keep extending, to enable the under-actuated system machine to restore from the second single-wheel ground-contacting state to the standing balance state.

During extension and retraction of the first leg portion and the second leg portion, the base part is gradually inclined toward the first direction until restoring to the horizontal state parallel to the horizontal reference plane, and the first wheel changes from being in contact with the ground to being in suspension and then restores to being in contact with the ground again.

In some embodiments, the mobile robot is an under-actuated system robot.

In the foregoing embodiments, the lengths of the first leg portion and the second leg portion are controlled, which can control the degree of inclination of the mobile robot more smoothly and accurately.

Figure 24:
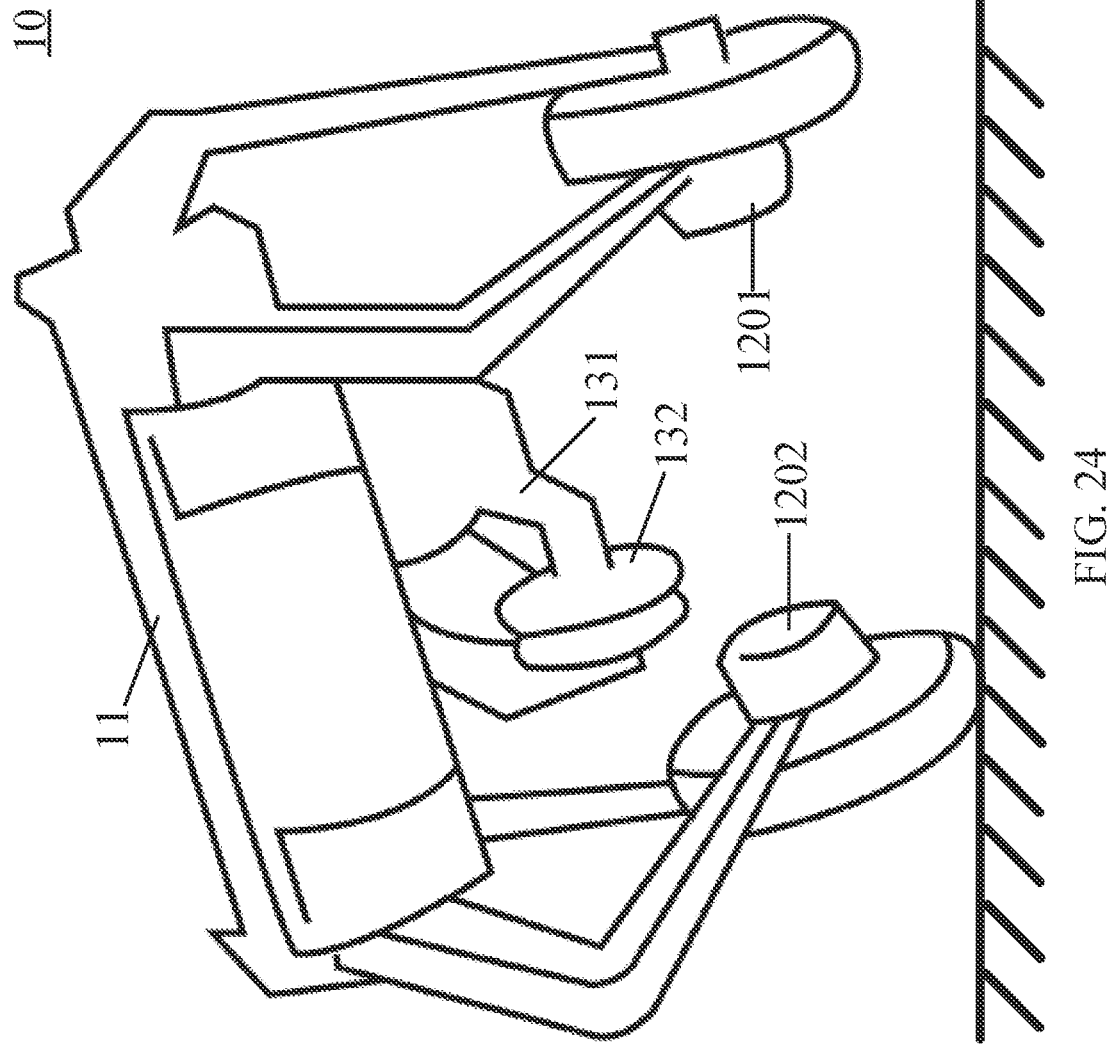
FIG. 24 is a schematic diagram of a second single-wheel ground-contacting state according to an exemplary embodiment of this application.

That the under-actuated system robot is a wheel-legged robot is still used as an example. FIG. 24 shows a schematic diagram of a second single-wheel ground-contacting state according to an exemplary embodiment of this application. The wheel-legged robot 10 includes a base part 11, a first wheel part 1201, and a second wheel part 1202. A forward direction of the wheel-legged robot 10 is a direction in which the balancing weight leg 131 points to the driven wheel 132.

Refer to FIG. 24. In the second single-wheel ground-contacting state, the first wheel part 1201 is in suspension, the second wheel part 1202 is in contact with the ground, and the base part 11 is inclined toward the second direction. The inclination of the base part 11 toward the second direction may cause inclination of the body of the wheel-legged robot 10.

In an implementation, the mobile robot is located on the ground, and the length of the first leg portion is the same as the height of the second leg portion in the standing balance state. In this case, in the process in which the mobile robot restores from the second inclined state to the standing balance state, the heights of the first leg portion and the second leg portion may change, and the change may be measured by using the lengths of the first leg portion and the second leg portion.

In one embodiment, when the lengths of the first leg portion and the second leg portion are the same in the standing balance state (that is, the mobile robot is on the flat ground), the mobile robot is in the second single-wheel ground-contacting state within second duration.

The length of the first leg portion is greater than the length of the second leg portion within the second duration; and the length of the first leg portion is the same as the length of the second leg portion at a termination node of the second duration.

The mobile robot is still in the second inclined state at a previous time node of an initial node of the second duration. In this case, the length of the first leg portion may be much greater than the length of the second leg portion. In addition, on the basis that the length of the first leg portion extends to the longest and the length of the second leg portion retracts to the shortest, the inclination angle of the base part in the second direction reaches the maximum.

Then, at the initial node of the second duration, the first leg portion is controlled to retract and the second leg portion is controlled to extend. In this case, the length of the first leg portion is still longer than the length of the second leg portion. As time goes by, based on continuous retraction of the first leg portion and continuous extension of the second leg portion, a length difference between the first leg portion and the second leg portion gradually decreases; and the length of the first leg portion is the same as the length of the second leg portion at a termination node of the second duration.

Figure 25:
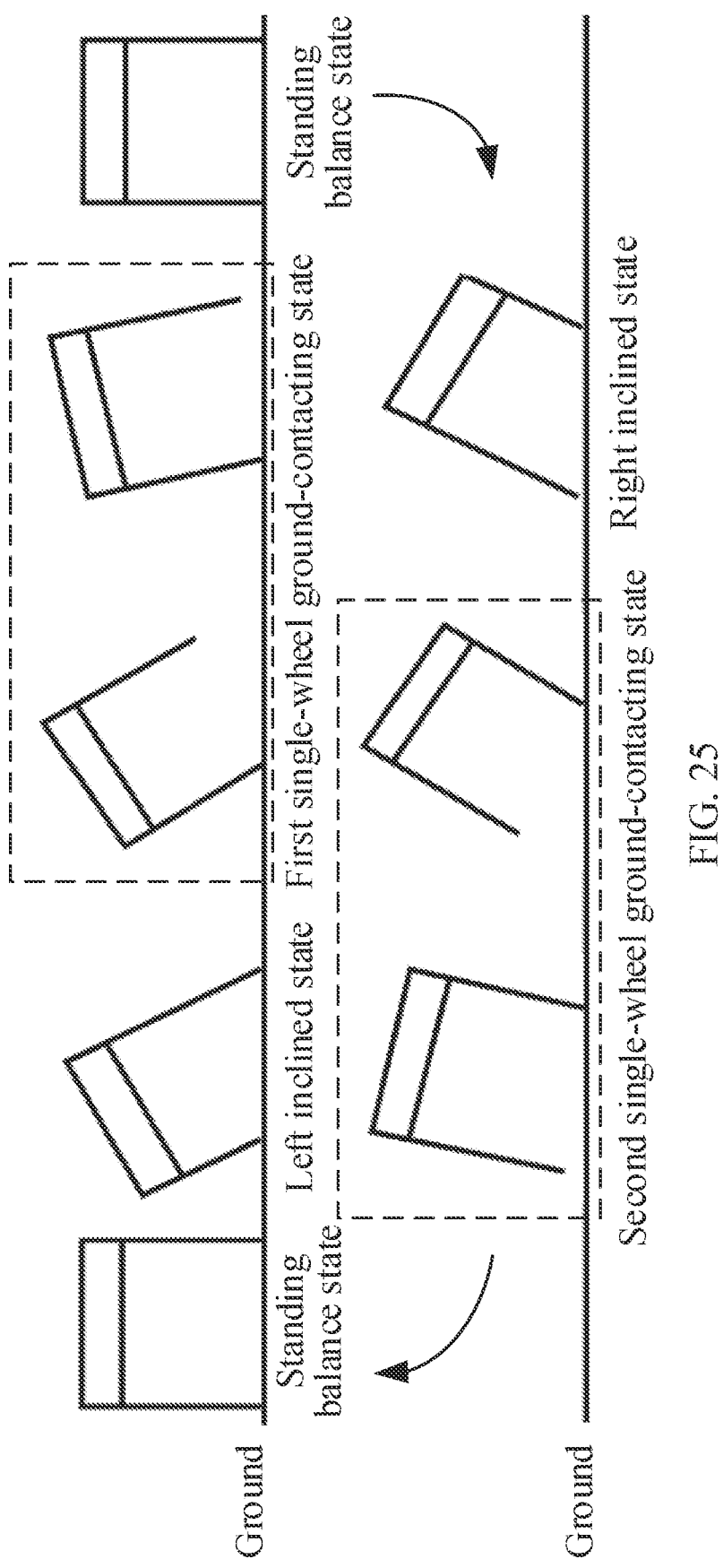
FIG. 25 is an exploded view of actions of bipedal-like motion according to an exemplary embodiment of this application.

For example, the first inclined state is a left inclined state, and the second inclined state is a right inclined state. FIG. 25 is an exploded view of actions of bipedal-like motion according to an exemplary embodiment of this application. A left vertical line in the figure is configured for identifying a left wheel part, a right vertical line is configured for identifying a right wheel part, and an area enclosed by two vertical lines and two horizontal lines is configured for identifying the base part.

Referring to FIG. 25, for example, the mobile robot is located on the flat ground. The bipedal-like motion may be implemented as follows:

The left wheel part and the right wheel part are controlled to be at an equal-height state, so that the base part remains parallel to the ground.

A leg portion of the left wheel part is controlled to retract, and a leg portion of the right wheel part is controlled to extend, so that the base part is inclined leftward as the wheel parts on both sides expand and contract. In addition, wheels of the wheel parts on both sides are controlled to maintain the ground-contacting state, so that the mobile robot gradually changes from the equal height state of the wheel parts on both sides to the left inclined state. In one embodiment, when the inclination angle of the mobile robot reaches a first limit value, extension and retraction control on the wheel parts on both sides is stopped to prevent the mobile robot from rolling over. The first limit value of the inclination angle of the mobile robot may be set according to actual needs, for example, determined according to a mass of the mobile robot and a length change of leg portions of the wheel parts on both sides.

In a case that the inclination angle of the mobile robot reaches the first limit value, the leg portion of the left wheel part is controlled to extend and the leg portion of the right wheel part is controlled to retract. In this case, a wheel on the right wheel part may be in suspension off the ground, and the mobile robot enters the first single-wheel ground-contacting state. As the leg portion of the left wheel part extends and the leg portion of the right wheel part retracts, leg lengths of the wheel parts on both sides may be the same point at an end moment of the first single-wheel ground-contacting state, and the mobile robot may also restore from the first single-wheel ground-contacting state to the standing balance state. In this case, due to the extension and retraction of the wheel parts on both sides, the base part also restores to being parallel to the ground from being inclined leftward.

Similar to the left inclined state, after the mobile robot restores to the standing balance state, the leg portion of the left wheel part is controlled extend, and the leg portion of the right wheel part is controlled to retract, so that the base part is inclined rightward as the wheel parts on both sides expand and contract. In addition, wheels of the wheel parts on both sides are controlled to maintain the ground-contacting state, so that the mobile robot gradually changes from the equal height state of the wheel parts on both sides to the right inclined state. In one embodiment, when the inclination angle of the mobile robot reaches a second limit value, extension and retraction control on the wheel parts on both sides is stopped to prevent the mobile robot from rolling over. The second limit value of the inclination angle of the mobile robot may be set according to actual needs, for example, determined according to a mass of the mobile robot and a length change of leg portions of the wheel parts on both sides.

In a case that the inclination angle of the mobile robot reaches the second limit value, the leg portion of the left wheel part is controlled to retract and the leg portion of the right wheel part is controlled to extend. In this case, a wheel on the left wheel part may be in suspension off the ground, and the mobile robot enters the second single-wheel ground-contacting state. As the leg portion of the left wheel part retracts and the leg portion of the right wheel part extends, leg lengths of the wheel parts on both sides may be the same point at an end moment of the second single-wheel ground-contacting state, and the mobile robot may also restore from the second single-wheel ground-contacting state to the standing balance state. In this case, due to the extension and retraction of the wheel parts on both sides, the base part also restores to being parallel to the ground from being inclined rightward.

In conclusion, a specific process of one motion cycle of the bipedal-like motion is provided in the mobile robot motion control method provided in this embodiment of this application. Extension and retraction control is performed on the first wheel part having the telescopic leg portion and the second wheel part having the telescopic leg portion, which can implement the bipedal-like motion on the mobile robot, thereby improving flexibility of the mobile robot.
State Switching Condition During the Bipedal-Like Motion:

As described above, to achieve motion control on the bipedal-like motion of the mobile robot, state switching may be performed on the mobile robot when different conditions are met.

In one embodiment, state switching on the mobile robot is performed when the inclination angle of the mobile robot reaches a specified limit value. The inclination angle of the mobile robot is configured for indicating the angle between the plane of the base part and the plane parallel to the horizontal reference plane. Referring to FIG. 25, for example, the mobile robot is located on the flat ground. The inclination angle of the mobile robot may be understood as an angle between a first plane and a second plane. The first plane is a plane where the base part is located, and the second plane is a plane parallel to the ground. The inclination angle of the mobile robot is controlled not to exceed the limit value, to prevent the mobile robot from rolling over due to excessive inclination, thereby ensuring stability of a motion control process.

In one embodiment, the inclination angle of the mobile robot is used as the state switching condition, which may specifically include the following four cases:
1. The Inclination Angle of the Mobile Robot Reaches a First Limit Value.

In one embodiment, step 1041 may be implemented as follows: In a case that the inclination angle of the mobile robot reaches a first limit value, the mobile robot is controlled to change from the standing balance state to the first inclined state.

Figure 26:
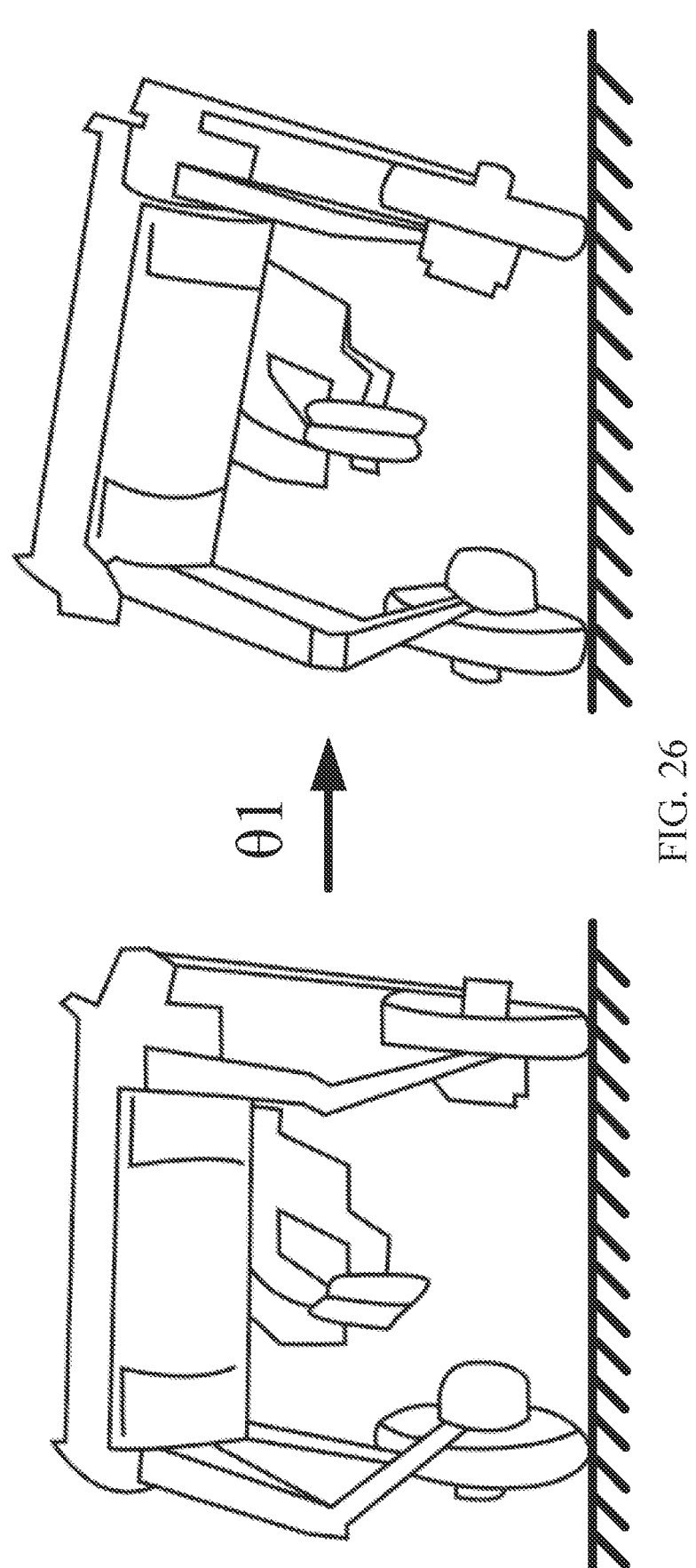
FIG. 26 is a schematic diagram of changing a standing balance state to a first inclined state according to an exemplary embodiment of this application.

For example, the mobile robot is located on the flat ground. FIG. 26 shows a schematic diagram of changing a standing balance state to a first inclined state according to an exemplary embodiment of this application. In the standing balance state of the mobile robot, the heights of the first wheel part and the second wheel part are equal. Then, the first wheel part is controlled to retract and the second wheel part is controlled to extend. In this process, an attitude of the mobile robot changes, and the base part is inclined toward the first direction in which the first wheel part is located.

For example, control of retraction of the first wheel part and extension of the second wheel part needs to meet the following conditions: The inclination angle of the mobile robot reaches a first limit value $\theta 1$. Refer to FIG. 26. A value of $\theta 1$ may be 0, that is, the base part is parallel to the ground. In another implementation, the mobile robot is located on a slope, the value of $\theta 1$ may still be 0. In this case, the base part is no longer parallel to the ground.
2. The Inclination Angle of the Mobile Robot Reaches a Second Limit Value.

In one embodiment, step 1042 may be implemented as follows: In a case that the inclination angle of the mobile robot reaches a second limit value, the mobile robot is controlled to change from the first inclined state to the standing balance state.

Figure 27:
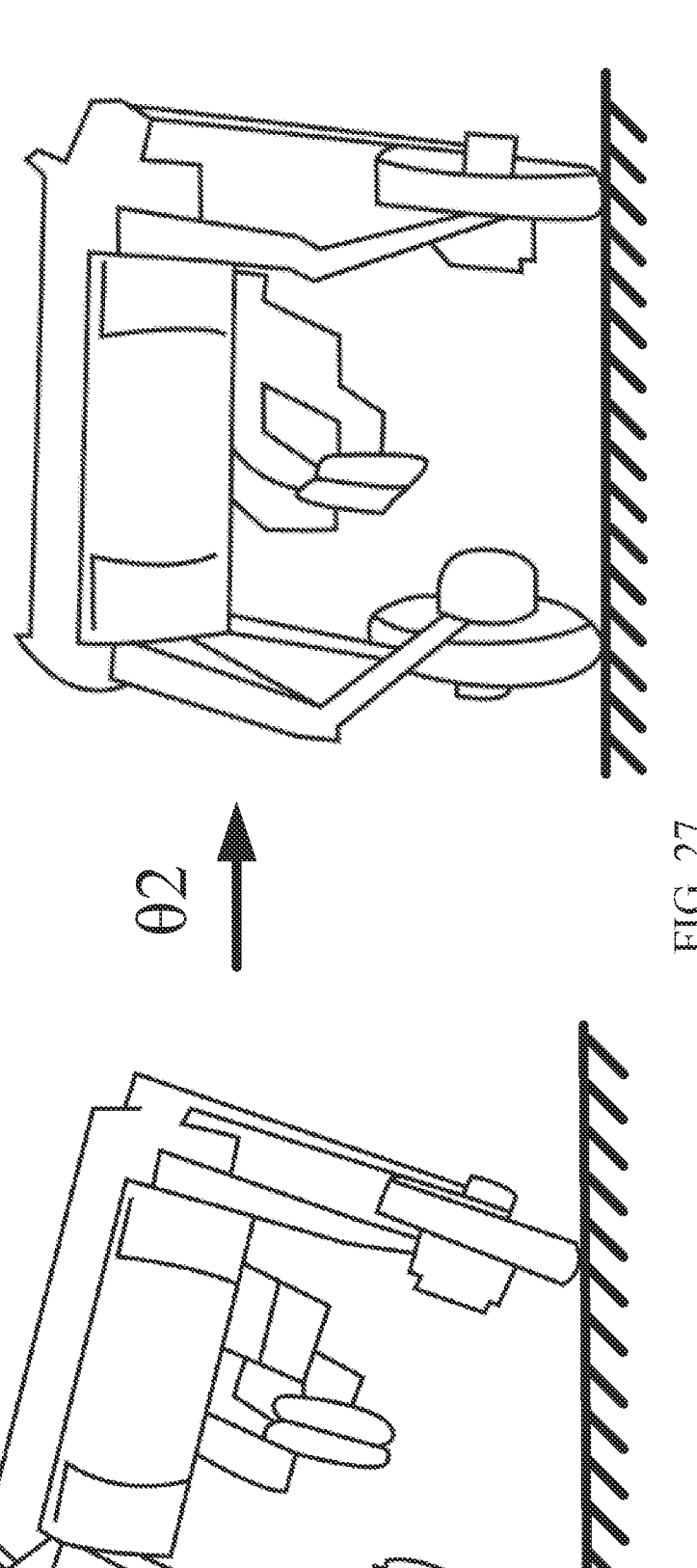
FIG. 27 is a schematic diagram of restoring a first inclined state to a standing balance state according to an exemplary embodiment of this application.

For example, the mobile robot is located on the flat ground. FIG. 27 is a schematic diagram of restoring a first inclined state to a standing balance state according to an exemplary embodiment of this application. Refer to FIG. 26, in the first inclined state, the first wheel part and the second wheel part are in contact with the ground, and then the first wheel part is controlled to extend and the second wheel part is controlled to retract, so that the mobile robot changes from the first inclined state to the first single-wheel ground-contacting state. A left side of FIG. 27 shows the first single-wheel ground-contacting state after the first inclined state changes. In this case, the first wheel part is in contact with the ground, and the second wheel part is in suspension. Then, the first wheel part is continued to be controlled to extend and the second wheel part is controlled to retract. In this process, an attitude of the mobile robot changes, and the base part is inclined toward the second direction in which the second wheel part is located until restoring to the state parallel to the ground.

For example, control of extension of the first wheel part and retraction of the second wheel part needs to meet the following conditions: The inclination angle of the mobile robot reaches a second limit value $\theta 2$. Refer to FIG. 26 and FIG. 27. When the inclination angle of the mobile robot reaches $\theta 1$, the mobile robot is controlled to change from the standing balance state to the first inclined state. When the inclination angle of the mobile robot reaches θ2, the mobile robot is controlled to change from the first inclined state to the first single-wheel ground-contacting state until restoring to the standing balance state.

It is to be understood that, a value of θ2 may be set according to actual needs.

For example, with reference to a mechanical structure and mass distribution of the mobile robot, a deflection range of a projection of a center of the mobile robot onto the ground during the bipedal-like motion is calculated according to a length change and a change speed of the leg portions of the first wheel part and the second wheel part. The deflection range affects the attitude change of the mobile robot, and the value of 02 may be determined according to the calculated deflection range. For example, the value of 02 is one of 10 degrees, 15 degrees, 20 degrees, 25 degrees, 30 degrees, 35 degrees, 40 degrees, and 45 degrees.

3. The Inclination Angle of the Mobile Robot Reaches a Third Limit Value.

In one embodiment, step 1043 may be implemented as follows: In a case that the inclination angle of the mobile robot reaches a third limit value, the mobile robot is controlled to change from the standing balance state to the second inclined state.

Figure 28:
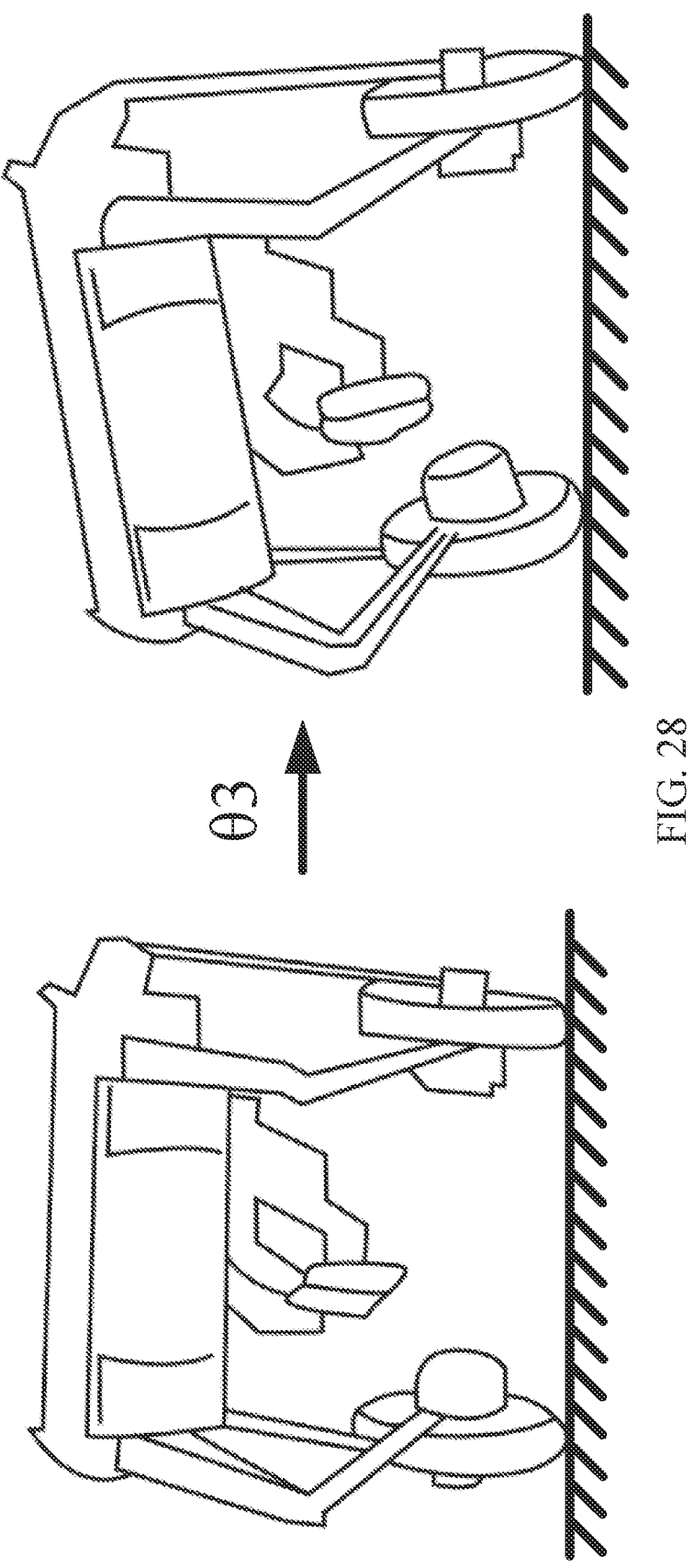
FIG. 28 is a schematic diagram of changing a standing balance state to a second inclined state according to an exemplary embodiment of this application.

For example, the mobile robot is located on the flat ground. FIG. 28 shows a schematic diagram of changing a standing balance state to a second inclined state according to an exemplary embodiment of this application. After the standing balance state is restored, the heights of the first wheel part and the second wheel part are restored to be equal. Then, the first wheel part is controlled to extend and the second wheel part is controlled to retract. In this process, an attitude of the mobile robot changes, and the base part is inclined toward the second direction in which the second wheel part is located.

For example, control of extension of the first wheel part and retraction of the second wheel part needs to meet the following conditions: The inclination angle of the mobile robot reaches a third limit value θ3. Refer to FIG. 28. Similar to the first limit value, a value of θ3 may be 0, that is, the base part is parallel to the ground. In another implementation, the mobile robot is located on a slope, the value of θ3 may still be 0. In this case, the base part is no longer parallel to the ground.

4. The Inclination Angle of the Mobile Robot Reaches a Fourth Limit Value.

In one embodiment, step 1044 may be implemented as follows: In a case that the inclination angle of the mobile robot reaches a fourth limit value, the mobile robot is controlled to change from the second inclined state to the standing balance state.

Figure 29:
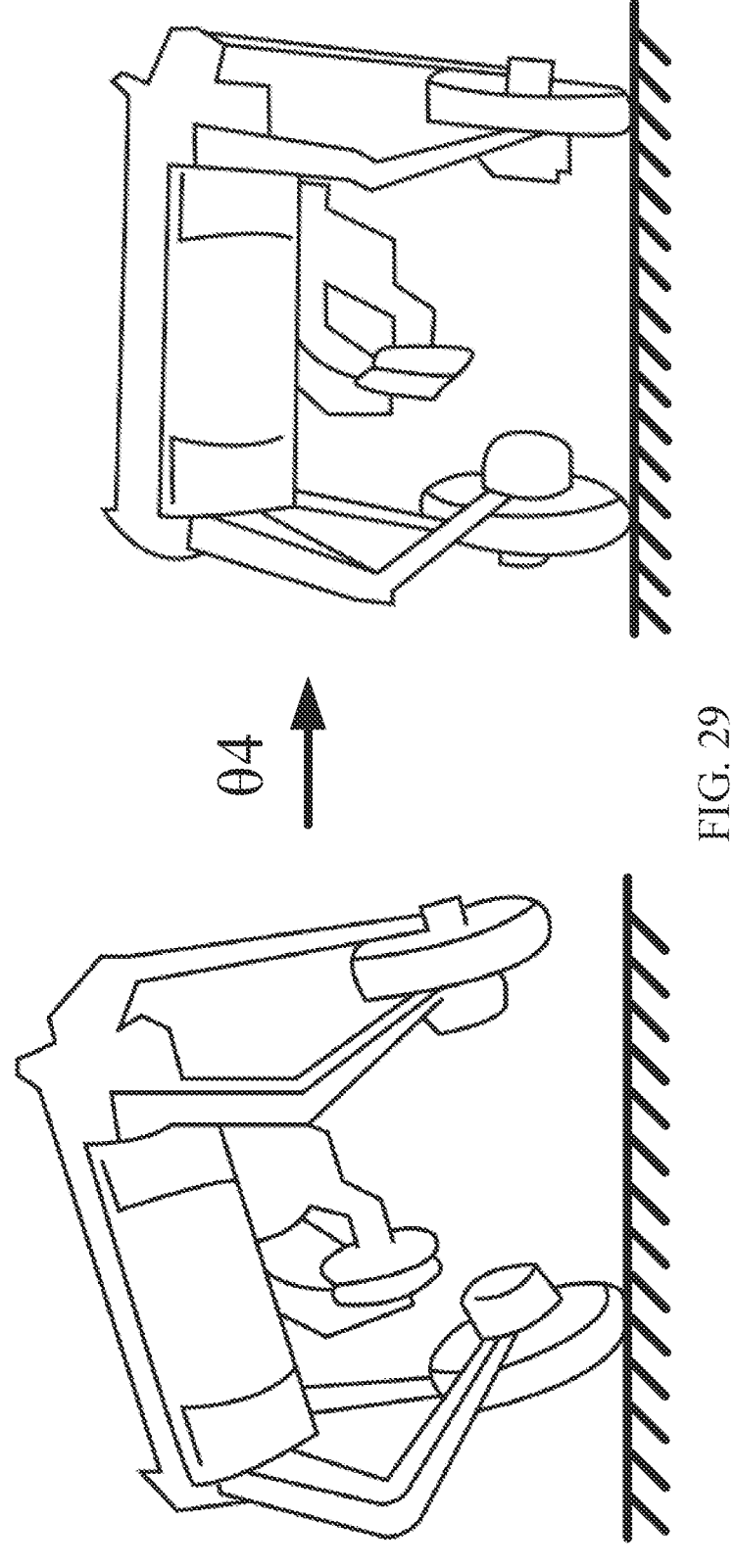
FIG. 29 is a schematic diagram of restoring a second inclined state to a standing balance state according to an exemplary embodiment of this application.

For example, the mobile robot is located on the flat ground. FIG. 29 is a schematic diagram of restoring a second inclined state to a standing balance state according to an exemplary embodiment of this application. Refer to FIG. 28, in the second inclined state, the first wheel part and the second wheel part are in contact with the ground, and then the first wheel part is controlled to retract and the second wheel part is controlled to extend, so that the mobile robot changes from the second inclined state to the second single-wheel ground-contacting state. A left side of FIG. 29 shows the second single-wheel ground-contacting state after the second inclined state changes. In this case, the first wheel part is in suspension, and the second wheel part is in contact with the ground. Then, the first wheel part is continued to be controlled to retract and the second wheel part is controlled to extend. In this process, an attitude of the mobile robot changes, and the base part is inclined toward the first direction in which the first wheel part is located until restoring to the state parallel to the ground.

For example, control of retraction of the first wheel part and extension of the second wheel part needs to meet the following conditions: The inclination angle of the mobile robot reaches a fourth limit value 04. Refer to FIG. 26 and FIG. 27. Similar to the second limit value, when the inclination angle of the mobile robot reaches θ3, the mobile robot is controlled to change from the standing balance state to the second inclined state; and When the inclination angle of the mobile robot reaches θ4, the mobile robot is controlled to change from the second inclined state to the second single-wheel ground-contacting state until restoring to the standing balance state.

It is to be understood that, a value of θ4 may be set according to actual needs.

For example, with reference to a mechanical structure and mass distribution of the mobile robot, a deflection range of a projection of a center of the mobile robot onto the ground during the bipedal-like motion is calculated according to a length change and a change speed of the leg portions of the first wheel part and the second wheel part. The deflection range affects the attitude change of the mobile robot, and the value of θ4 may be determined according to the calculated deflection range. For example, the value of θ4 is one of 10 degrees, 15 degrees, 20 degrees, 25 degrees, 30 degrees, 35 degrees, 40 degrees, and 45 degrees.

Classification of the Bipedal-Like Motion:

As described above, the bipedal-like motion is gait motion that imitates humans to perform alternate motion of left and right legs. The gait motion may be specifically implemented in a plurality of manners such as alternate walking, in-situ stepping, and the like. In one embodiment, the bipedal-like motion includes at least one of the following:

in-situ stepping motion;

linear motion;

curved motion;

in-situ circle turning and stepping motion; and obstacle-crossing motion.

The in-situ stepping motion may further be understood as motion in which the mobile robot does not move. When the mobile robot performs in-situ stepping motion, ground-touching positions of a first wheel part and a second wheel part of the mobile robot are kept unchanged. The linear motion, the curved motion, and the obstacle-crossing motion may also be understood as motion in which the mobile robot moves. When the mobile robot performs linear motion, curved motion, in-situ circle turning and stepping motion, and obstacle-crossing motion in an alternating walking gait, the first wheel part and the second wheel part of the mobile robot moves according to different types of motion.

In one embodiment, the bipedal-like motion includes the in-situ stepping motion; and during the in-situ stepping motion, ground-touching positions of the first wheel part and the second wheel part after suspension are the same as an initial ground-touching position, or a distance difference between ground-touching positions of the first wheel part and the second wheel part after suspension and an initial ground-touching position is less than a first tolerance value. In other words, a distance between the ground-touching position of the first wheel part after suspension (that is, a ground-touching position of the first wheel after suspension) and the initial ground-touching position is less than the first tolerance value; and/or a distance between the ground-touching position of the second wheel part after suspension (that is, a ground-touching position of the second wheel after suspension) and the initial ground-touching position is less than the first tolerance value. In this embodiment, the distance between the ground-touching positions of the wheel parts and the initial ground-touching position is controlled to be less than the first tolerance value, which ensures that the mobile robot maintains the in-situ stepping motion.

When the mobile robot imitates humans and alternately lifts left and right feet to achieve the in-situ stepping motion, the mobile robot does not move, so that the first wheel part and the second wheel part are in suspension and touch the ground at an initial ground-touching position.

For example, the first tolerance value may be understood as an error value of the distance difference, and the first tolerance value may be set according to actual needs. It is to be understood that, the ground-touching positions of the first wheel part and the second wheel part after suspension need to be at the same position as the initial ground-touching position. To ensure body balance of the mobile robot, a relatively small tolerance range may be set for the distance difference between the two positions. The first tolerance value is a value in the tolerance range, such as a maximum value of the tolerance range.

In one embodiment, the bipedal-like motion includes at least one of the linear motion, the curved motion, the in-situ circle turning and stepping motion, and the obstacle-crossing motion. During the linear motion or the curved motion or the in-situ circle turning and stepping motion or the obstacle-crossing motion, the ground-touching position of the first wheel part or the second wheel part after suspension is different from a ground-touching position before suspension, and a distance difference is not less than a second tolerance value; and the base part obliquely swings toward a third direction and a fourth direction alternately, an angle between the third direction or the fourth direction and a forward direction of the mobile robot being an acute angle. In other words, during the linear motion or the curved motion or the in-situ circle turning and stepping motion or the obstacle-crossing motion, a distance between the ground-touching position of the first wheel part after suspension (that is, a ground-touching position of the first wheel after suspension) and the initial ground-touching position is greater than or equal to the second tolerance value; and/or a distance between the ground-touching position of the second wheel part after suspension (that is, a ground-touching position of the second wheel after suspension) and the initial ground-touching position is greater than or equal to the second tolerance value. In this embodiment, the distance between the ground-touching positions of the wheel parts and the initial ground-touching position is controlled to be greater than or equal to the second tolerance value, so that a movement distance and a movement speed of each time of movement of the mobile robot are ensured, that is, movement efficiency is ensured.

The linear motion may be understood as the mobile robot imitating humans to walk forward or backward with left and right feet alternately. The curved motion may be understood as the mobile robot imitating humans to perform non-linear walking in S-line, figure-8, pile-winding and other curves with alternate left and right feet. The obstacle-crossing motion may be understood as the mobile robot imitating human to walk in a straight line or curve with alternate left and right feet over obstacles such as small mounds.

For example, the second tolerance value may be set according to actual needs. It is to be understood that, based on the need for movement and/or attitude adjustment during the linear motion, the curved motion, the in-situ circle turning and stepping motion, and the obstacle-crossing motion, the ground-touching positions of the first wheel part and the second wheel part after suspension need to be at different positions than the initial ground-touching position. To implement movement and/or attitude adjustment of the mobile robot, a preset tolerance range may be set for the distance difference between the two positions. The second tolerance value is a value in the tolerance range, such as a minimum value of the tolerance range.

The mobile robot moves in the three types of motion, so that the ground-touching positions of the first wheel part and the second wheel part after suspension are different from the ground-touching position before suspension. In addition, the need for movement by the mobile robot may also cause a position of a center of mass of the mobile robot to change with the forward direction of the mobile robot.

The curved motion is used as an example. When the mobile robot changes from the standing balance state to the first inclined state, the first wheel part and the second wheel part maintain the ground-contacting state. The mobile robot is controlled to change from the first inclined state to the first single-wheel ground-contacting state. In this case, the first wheel part of the mobile robot is controlled to turn, for example, the first wheel part is controlled to turn to the right front of an initial forward direction (which may be understood as the third direction). Then, the mobile robot is controlled to restore from the first single-wheel ground-contacting state to the standing balance state, and the forward direction of the mobile robot changes. The mobile robot may face the left front, and the center of mass of the mobile robot may also move toward the right front of the initial forward direction.

The mobile robot is controlled to change from the standing balance state to the second inclined state, and the first wheel part and the second wheel part maintain the ground-contacting state. Then, the mobile robot is controlled to change from the second inclined state to the second single-wheel ground-contacting state. In this case, the second wheel part of the mobile robot is controlled to turn, for example, the second wheel part is controlled to turn to the left front of an initial forward direction (which may be understood as the fourth direction). Then, the mobile robot is controlled to restore from the second single-wheel ground-contacting state to the standing balance state, and the forward direction of the mobile robot changes. The mobile robot may face the right front, and the center of mass of the mobile robot may also move toward the left front of the initial forward direction.

In the foregoing process, angles between the left front and right front and the forward direction of the mobile robot are acute angles. It may be understood that, the mobile robot can move in any sub-direction of an original forward direction during the curved motion.

According to the foregoing content, in the bipedal-like motion, when the mobile robot changes from the first single-wheel ground-contacting state to the second single-wheel ground-contacting state, transition through the standing balance state is required, so that the mobile robot can maintain body balance.

In some embodiments, the mobile robot further includes a tail part that is in transmission connection with the base part. The tail part includes a third wheel. The tail part retracts in the standing balance state, and the third wheel does not touch the ground. Referring to the wheel-legged robot 10 shown in FIG. 1, the third wheel is the driven wheel 132 arranged on the tail part 13. Refer to FIG. 6. In a case that the tail part 13 is in a retracting state, the driven wheel 132 does not touch the ground and may be fixed at the bottom of the base part 11 to avoid affecting motion of the wheel part 12.

In one embodiment, step 104 may be implemented as follows:

The mobile robot is controlled to change from the standing balance state to the first single-wheel ground-contacting state, where the first single-wheel ground-contacting state is a state in which the first wheel is in contact with the ground and the second wheel is in suspension.

The tail part is controlled to extend until the third wheel is in contact with the ground.

The first leg portion of the first wheel part is controlled to retract and the second leg portion of the second wheel part is controlled to extend, to enable the mobile robot to change from the first single-wheel ground-contacting state to the second single-wheel ground-contacting state, the second single-wheel ground-contacting state being a state in which the first wheel is in suspension and the second wheel is in contact with the ground; and the mobile robot is controlled to restore from the second single-wheel ground-contacting state to the standing balance state.

For a detailed description of the mobile robot changing from the standing balance state to the first single-wheel ground-contacting state, refer to the foregoing content. It may be understood that, when the mobile robot is in the second single-wheel ground-contacting state, a wheel touching the ground may also be adjusted through the tail part. For details, refer to the following content, which will not be described herein again.

In the first single-wheel ground-contacting state, the tail part may be controlled to extend until the third wheel touches the ground, to enable the mobile robot to maintain body balance when the first wheel and the second wheel are in contact with the ground, thereby improving stability of the mobile robot.

Then, the first leg portion of the first wheel to retract and the second leg portion of the second wheel part to extend. It may be understood that the first leg portion of the mobile robot is lifted and the second leg portion is put down until the second wheel touches the ground. During this process, only the third wheel arranged on the tail part of the mobile robot touches the ground. After the second wheel touches the ground, the first wheel no longer retracts and remains in suspension, so that the mobile robot changes from the first single-wheel ground-contacting state to the second single-wheel ground-contacting state.

Then, the mobile robot may be controlled to restore from the second single-wheel ground-contacting state to the standing balance state. For details of the process, refer to the foregoing content, and the details are not described herein again.

According to the foregoing content, in the bipedal-like motion, when the mobile robot changes from the first single-wheel ground-contacting state to the second single-wheel ground-contacting state, transition through the standing balance state does not required, assistance may be provided through the tail part, to change the wheel in contact with the ground.

The schematic manner of changing from the first single-wheel ground-contacting state to the second single-wheel ground-contacting state provided in the above content may be applied to the bipedal-like motion of the mobile robot. Details are not described herein again.

There are many implementations for the bipedal-like motion. The plurality of examples provide various specific implementations for the in-situ stepping motion, the linear motion, the curved motion, the in-situ circle turning and stepping motion, and the obstacle-crossing motion. It may be understood that other manners of imitating bipedal motion are within the protection scope of this application, which will not be described herein again.

For example, other motion manners are added between the first wheel part and the second wheel part. In one embodiment, the mobile robot motion control method provided in this embodiment of this application further includes:

during the bipedal-like motion, controlling the first wheel part and/or the second wheel part to perform motion.

For example, step 104 may be implemented as follows:

The mobile robot is controlled to change from the standing balance state to the first single-wheel ground-contacting state, where the first single-wheel ground-contacting state is a state in which the first wheel is in contact with the ground and the second wheel is in suspension.

The first wheel is controlled to be in suspension off the ground to cause the mobile robot to perform at least one jumping motion.

The mobile robot is controlled to change from the first single-wheel ground-contacting state to the second single-wheel ground-contacting state, the second single-wheel ground-contacting state being a state in which the first wheel is in suspension and the second wheel is in contact with the ground.

The second wheel is controlled to be in suspension off the ground to cause the mobile robot to perform at least one jumping motion.

The mobile robot is controlled to restore from the second single-wheel ground-contacting state to the standing balance state.

For the content that the mobile robot changes from the standing balance state to the first single-wheel ground-contacting state, changes from the first single-wheel ground-contacting state to the second single-wheel ground-contacting state, and restores from the second single-wheel ground-contacting state to the standing balance state, all refer to the foregoing content. Details are not described herein again.

In the single-wheel ground-contacting state, a wheel in contact with the ground may be controlled to be in suspension off the ground, so that the mobile robot performs at least one jumping action, thereby simulating a human-like one-legged jumping action. It may be understood that a number of one-legged jumping actions of the mobile robot may be set according to actual needs. For example, in the first single-wheel ground-contacting state, the first wheel is controlled to leave the ground twice, so that the mobile robot performs jumping motion twice. Then, the state is changed to the second single-wheel ground-contacting state, and the second wheel is controlled to leave the ground twice.

Wheel Status During the Bipedal-Like Motion:

During the bipedal-like motion of the mobile robot, the mobile robot is in a state of imitating humans to perform motion with alternate left and right legs. As described above, both the first wheel part and the second wheel part include wheels. Compared with the bipedal motion performed by humans, the mobile robot can also slide by controlling the wheels.

In one embodiment, during the bipedal-like motion performed by the mobile robot, the first wheel of the first wheel part and/or the second wheel of the second wheel part are also locked or unlocked, to enable the bipedal-like motion to be more flexible.

In one embodiment, during the bipedal-like motion, the first wheel and the second wheel are in a locked state.

In one embodiment, during the bipedal-like motion, the first wheel and/or the second wheel are in an unlocked state.

In an implementation, the first wheel and the second wheel are in the locked state, and the first wheel and the second wheel are locked, so that wheel slipping no longer occurs during the bipedal-like motion of the mobile robot.

The locked state may be understood as determining a position-invariant reference signal for the first wheel and/or the second wheel. Based on this reference signal, the first wheel and/or the second wheel can perform slight motion near a reference point. In other words, there is a motion error in the first wheel and/or the second wheel at the reference point in the locked state, and this error is configured for achieving body balance of the mobile robot. It may be understood that the movement error of the first wheel and/or the second wheel at the reference point is small and can be ignored.

In another implementation, at least one of the first wheel and the second wheel is in the unlocked state to achieve steering and/or sliding of the wheel in the unlocked state.

In one embodiment, the mobile robot motion control method provided in this embodiment of this application further includes:

during the bipedal-like motion, controlling the first wheel part and/or the second wheel part in the unlocked state to perform motion. In this way, a variety of motion can be achieved through the unlocked wheels, thereby improving diversity of the robot's motion methods.

In one embodiment, motion performed by the first wheel part and/or the second wheel part in bipedal-like motion may be one of sliding motion, jumping motion, and rotation motion.

It may be understood that the movement of the first wheel part and/or the second wheel part in a bipedal-like motion may be performed in one of the following states: the standing balance state, the first inclined state, the first single-wheel ground-contacting state, the second inclined state, and the second single-wheel ground-contacting state.

The following uses sliding motion as an example to give two different examples:

For example, the first wheel part and the second wheel part are controlled to be in the standing balance state, and then the mobile robot is controlled to change from the standing balance state to the first inclined state. When the mobile robot is in the first inclined state, the first wheel and the second wheel are controlled to be unlocked, and then a driving force is provided to the first wheel and the second wheel, so that the first wheel and the second wheel drive the mobile robot to slide in a body-inclined state.

In another example, the first wheel part and the second wheel part are controlled to be in the standing balance state, and then the mobile robot is controlled to gradually change from the standing balance state to the first single-wheel ground-contacting state. When the mobile robot is in the first single-wheel ground-contacting state, the first wheel is controlled to be unlocked, and then the first wheel is controlled to slide, so that the mobile robot imitates a single-leg skating action.

For example, the locking and unlocking of the first wheel and/or the second wheel can be performed for a plurality of times in the bipedal-like motion, so that the mobile robot can achieve a mixture of sliding and alternating landing of the left and right wheel parts, further improving the flexibility of the mobile robot. For example, during bipedal-like motion, the first wheel and/or the second wheel are locked and unlocked multiple times to control the mobile robot to perform anthropomorphic skating.

In one embodiment, during the bipedal-like motion, controlling the first wheel part and/or the second wheel part in the unlocked state to perform motion, which may be implemented as one of the following:

(1) The Mobile Robot Performs Single-Wheel Sliding Motion.

The mobile robot is controlled to change from the standing balance state to the first single-wheel ground-contacting state, where the first single-wheel ground-contacting state is a state in which the first wheel is in contact with the ground and the second wheel is in suspension.

In a case that the first wheel is in the unlocked state, the first wheel is controlled to slide by a first distance.

For a detailed description of the mobile robot changing from the standing balance state to the first single-wheel ground-contacting state, refer to the foregoing content. It may be understood that, when the mobile robot is in the second single-wheel ground-contacting state, the single-wheel sliding motion can also be performed. For details, refer to the following content, which will not be described herein again.

In one embodiment, in the single-wheel ground-contacting state, a wheel in contact with the ground may be unlocked to be in an unlocked state, and a in suspension wheel may be unlocked or not. Then, the wheel in contact with the ground is controlled to slide to enable the mobile robot to move. For example, the first wheel is unlocked and is in the unlocked state, and the second wheel is in the locked state. The first wheel is controlled to slide.

The first distance may be set according to actual needs, and this is not limited in this application.

In some embodiments, the mobile robot can cyclically perform single-wheel sliding motion in the first single-wheel ground-contacting state or the second single-wheel ground-contacting state. For example, the mobile robot changes from the standing balance state to the first single-wheel ground-contacting state, and then performs single-wheel sliding motion. After sliding duration 1, the mobile robot is controlled to change from the first single-wheel ground-contacting state to the second single-wheel ground-contacting state, and then perform single-wheel sliding motion.

(2) The Mobile Robot Performs Single-Wheel Rotation Motion.

The mobile robot is controlled to change from the standing balance state to the first single-wheel ground-contacting state, where the first single-wheel ground-contacting state is a state in which the first wheel is in contact with the ground and the second wheel is in suspension.

In a case that the first wheel is in the unlocked state, the first wheel is controlled to rotate.

For a detailed description of the mobile robot changing from the standing balance state to the first single-wheel ground-contacting state, refer to the foregoing content. It may be understood that, when the mobile robot is in the second single-wheel ground-contacting state, the single-wheel sliding motion can also be performed. For details, refer to the following content, which will not be described herein again.

In one embodiment, in the single-wheel ground-contacting state, a wheel in contact with the ground may be unlocked to be in an unlocked state, and a in suspension wheel may be unlocked or not. Then, the wheel in contact with the ground is controlled to rotate to change the forward direction of the mobile robot. For example, the first wheel is unlocked and is in the unlocked state, and the second wheel is in the locked state. The first wheel is controlled to rotate.

The rotation angle of the first wheel can be set according to actual needs, and this is not limited in this application. For example, the rotation angle of the first wheel is 360 degrees, so that the mobile robot can imitate motion of rotating one circle in place. Alternatively, the rotation angle of the first wheel can be determined based on environmental information of the mobile robot. The environmental information includes at least road condition information, peripheral obstacle information, and the like of the mobile robot. For example, if there are cylindrical obstacles around the mobile robot, the first wheel may be controlled to rotate 90 degrees to change the forward direction of the mobile robot and avoid obstacles.

In some embodiments, the mobile robot can cyclically perform single-wheel rotation in the first single-wheel ground-contacting state or the second single-wheel ground-contacting state. For example, the mobile robot changes from the standing balance state to the first single-wheel ground-contacting state, and then controls the first wheel to rotate 90 degrees. After the sliding duration is 2, control the mobile robot to change from the first single-wheel ground-contacting state to the second single-wheel ground-contacting state, and then control the second wheel to perform a single wheel rotation of 180 degrees. After the sliding duration is 3, the mobile robot is controlled to change from the second single-wheel ground-contacting state to the first single-wheel ground-contacting state, and then the second wheel is controlled to perform a single wheel rotation of 270 degrees.

(3) The Mobile Robot Performs Single-Wheel Skating Motion.

The mobile robot is controlled to change from the standing balance state to the first single-wheel ground-contacting state, where the first single-wheel ground-contacting state is a state in which the first wheel is in contact with the ground and the second wheel is in suspension.

In a case that the first wheel is in the unlocked state, the first wheel is controlled to slide by a second distance.

In a case that the second wheel is in the locked state, the second leg portion of the second wheel part is controlled to extend until the second wheel touches the ground, and the second leg portion is controlled to retract until the second leg portion restores to the length in the locked state.

For a detailed description of the mobile robot changing from the standing balance state to the first single-wheel ground-contacting state, refer to the foregoing content. It may be understood that, when the mobile robot is in the second single-wheel ground-contacting state, the single-wheel skating motion can also be performed. For details, refer to the following content, which will not be described herein again.

In one embodiment, in the single-wheel ground-contacting state, a wheel in contact with the ground may be unlocked to be in an unlocked state, and a in suspension wheel may not be unlocked to be in the locked state. Then, the wheel in contact with the ground is controlled to slide to enable the mobile robot to move. After sliding by a distance, the in suspension wheel is controlled to touch the ground once and then lift it up, and continue to control the wheel in contact with the ground to slide. For example, the first wheel is unlocked and is in the unlocked state, and the second wheel is not unlocked to be in the locked state. After the first wheel is controlled to slide a second distance, the second leg portion of the second wheel part is controlled to extend and then retract, so that the second wheel performs an action similar to single point ground-touching and then retracting. Then, the first wheel is continued to be controlled to slide.

The second distance may be set according to actual needs. This is not limited in this application.

It may be understood that the unlocked or locked state of the first wheel and the second wheel can be controlled when the mobile robot is in the standing balance state, or can be controlled when the mobile robot is in the single-wheel ground-contacting state. This is not limited in this application.

It may be understood that the above content is only an illustrative example, and other motion manners of the wheel part and alternate ground-touching of the left and right wheel parts are within the protection scope of this application and will not be described again.

Implementations of the bipedal-like motion are provided in the plurality of embodiments. In each implementation, the first wheel and the second wheel can perform various types of actions such as sliding, rotating, jumping, and the like. It may be understood that implementations of the various types of bipedal-like motion and the various types of actions of the first wheel and the second wheel all can be implemented in combination.

For example, the mobile robot is controlled to change to a first one-legged ground-contacting state. Then, the first wheel is unlocked and the first wheel is controlled to rotate, so that the mobile robot rotates one circle in place. Then, the mobile robot is controlled to change to the second inclined state, the first wheel and the second wheel are unlocked, and the first wheel and the second wheel are controlled to slide, so that the mobile robot performs a sideways sliding action. Then, the mobile robot is controlled to change to a second one-legged ground-contacting state, the second wheel is unlocked, and the second wheel is controlled to slide, so that the mobile robot performs single-wheel sliding motion.

Based on this, the mobile robot can be controlled to achieve more complex and richer bipedal-like motion. For example, a mobile robot is controlled to imitate humans to perform a set of figure skating-like bipedal-like motion.

According to the foregoing content, during the bipedal-like motion, the first wheel part and the second wheel part alternately touches the ground, and the lengths of the leg portions of the first wheel part and the second wheel part no longer remain the same, and the heights of the two wheels may change.

In some embodiments, the mobile robot is an under-actuated system robot.

For example, the under-actuated system robot is a wheel-legged robot. With reference to FIG. 13 and FIG. 14, in a three-dimensional right-hand Cartesian coordinate system established for the wheel-legged robot 10, for balance control in the pitch direction, motor torques corresponding to the wheel parts may vary according to different grounding-touching situations of the first wheel and the second wheel.

In one embodiment, when both the first wheel part and the second wheel part are in contact with the ground, a sum of a motor torque of a first drive motor corresponding to the first wheel part and a motor torque of a second drive motor corresponding to the second wheel part is a first torque;

when the first wheel part is in contact with the ground and the second wheel part is in suspension, the motor torque of the first drive motor is the first torque; and when the second wheel part is in contact with the ground and the first wheel part is in suspension, the motor torque of the second drive motor is the first torque.

In one embodiment, in the standing balance state, the first inclined state, and the second inclined state, the first wheel and the second wheel are in contact with the ground, that is, contact points between the under-actuated system robot and the ground are two wheels. In this case, it can be obtained through the PID controller that the motor torques of the first driving motor corresponding to the first wheel part and the second driving motor corresponding to the second wheel part are both t.

In one embodiment, in the first single-wheel ground-contacting state, the first wheel part is in contact with the ground and the second wheel part is in suspension. In the second single-wheel ground-contacting state, the second wheel part is in contact with the ground and the first wheel part is in suspension. In other words, in the first single-wheel ground-contacting state or the second single-wheel ground-contacting state, the contact point between the under-actu-ated system robot and the ground is a single wheel. In this case, it can be obtained through the PID controller that a motor torque of a drive motor corresponding to a wheel part that can touch the ground is $2\tau$, so that a contact torque between a single wheel and the ground can be used to achieve balance control on the robot in the pitch direction during the bipedal-like motion.

According to the foregoing content, the mobile robot can be controlled to achieve bipedal-like motion by planning the length change and change speed of the leg portions of the first wheel part and the second wheel part of the mobile robot. By analyzing motion and structural characteristics of the mobile robot, the bipedal-like motion can be divided into a plurality of states mentioned above. The mobile robot is controlled to perform planned actions in a state change process. In addition, with reference to the mechanical structure and the mass distribution of the mobile robot, a deflection range of the robot's center of gravity projected onto the ground during the motion can be calculated, to determine state switching conditions of different states. For details, refer to the foregoing content, which are not described herein again.

In one embodiment, during the bipedal-like motion, control information of each joint of the mobile robot may be determined in the following manner: After the bipedal-like motion is determined, the bipedal-like motion may be divided into a plurality of states, each state corresponds to one set of control parameters, where the set of control parameters can be used to determine a position, an angle, a torque, and other information of each joint. Then, one set of control parameters and a whole body dynamics model of the mobile robot are used as input and processed by a controller of the mobile robot to obtain the control information of the set of control parameters. The control information includes at least a joint torque of each joint, a joint angular velocity, base part inclination, and other information. The robot is controlled based on the control information.

It may be understood that the above process is only an illustrative example and can be specifically adjusted according to actual needs, which is not limited in this application.

In one embodiment, during the bipedal-like motion, motion of the first wheel part, the second wheel part, and the base part is controlled according to at least one of the following information:

a length change of the first leg portion of the first wheel part;

an angle and a variation of at least one joint motor of the first leg portion;

a length change of the second leg portion of the second wheel part;

an angle and a variation of at least one joint motor of the second leg portion;

a contact force between the first wheel of the first wheel part and the ground;

a contact force between the second wheel of the second wheel part and the ground;

pitch angle information and a pitch angular velocity of the mobile robot;

roll angle information and a roll angular velocity of the mobile robot; and yaw angle information and a yaw angular velocity of the mobile robot.

In some embodiments, the mobile robot is an under-actuated system robot.

Figure 30:
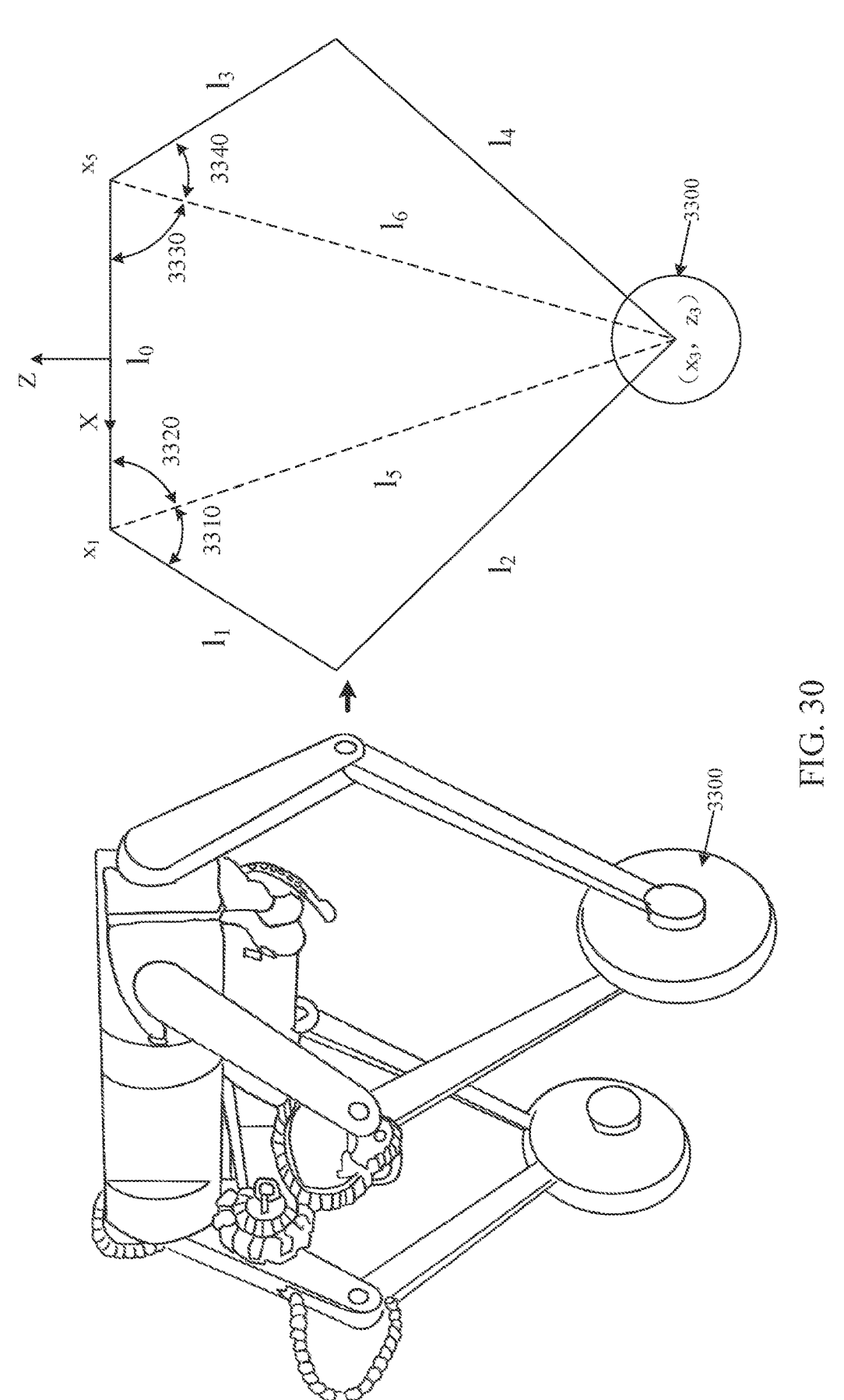
FIG. 30 is a schematic diagram of simulating and deducing joint angle information by using a cross section of a wheel-legged robot according to an exemplary embodiment of this application.

For example, the under-actuated system robot is a wheel-legged robot. Refer to the right-hand Cartesian coordinate system of the wheel-legged robot 10 shown in FIG. 13. FIG. 30 shows a schematic diagram of simulating and deducing joint angle information by using a cross section of a wheel-legged robot 10 according to an exemplary embodiment of this application.

Refer to FIG. 13. FIG. 30 shows an XZ coordinate system constructed corresponding to the cross section of the wheel-legged robot 10, and a wheel 3300 may be one of the first wheel and the second wheel. An origin is located at a midpoint of a point $x_1$ and a point $x_5$. For example, a distance between $x_1$ and $x_5$ is $l_0$, coordinates of $x_1$ are $(0.5l_0, 0)$ and coordinates of $x_5$ are $(-0.5l_0, 0)$. It is known that coordinates of the wheel 3300 are $(x_3, z_3)$, and an objective is to calculate joint angle information, including a joint angle 3310, a joint angle 3320, a joint angle 3330, and a joint angle 3340.

The coordinates of the wheel 3300 are known, and $x_1$ and $x_5$ are known. Therefore, lengths of a line segment ls and a line segment 16 may be calculated based on the coordinates. For example, calculation formulas are expressed as Formula 1 and Formula 2:

$$l_5 = \sqrt{(x_3 - 0.5l_0)^2 + z_3^2} \qquad \text{Formula 1}$$

$$l_6 = \sqrt{(x_3 + 0.5l_0)^2 + z_3^2} \qquad \text{Formula 2}$$

Since lengths 11 and 12 of wheel legs are known, the joint angle 3310 may be obtained according to the cosine theorem and is represented by $\theta_{11}$, and a calculation formula is expressed as Formula 3:

$$\theta_{11} = \arccos\left(\sqrt{\frac{l_1^2 + l_5^2 - l_2^2}{2l_2l_5}}\right) \qquad \text{Formula 3}$$

Similarly, the joint angle 3320, the joint angle 3330, and the joint angle 3340 can be obtained.

Based on the calculated joint angle, the joint angle is inputted into a drive motor corresponding to the wheel 3300, and then the controller can output a motor torque to control a leg configuration corresponding to the wheel 3300 to rotate to a corresponding joint angle, thereby controlling the wheel 3300 to reach a specified position $(x_3, z_3)$.

Figure 31:
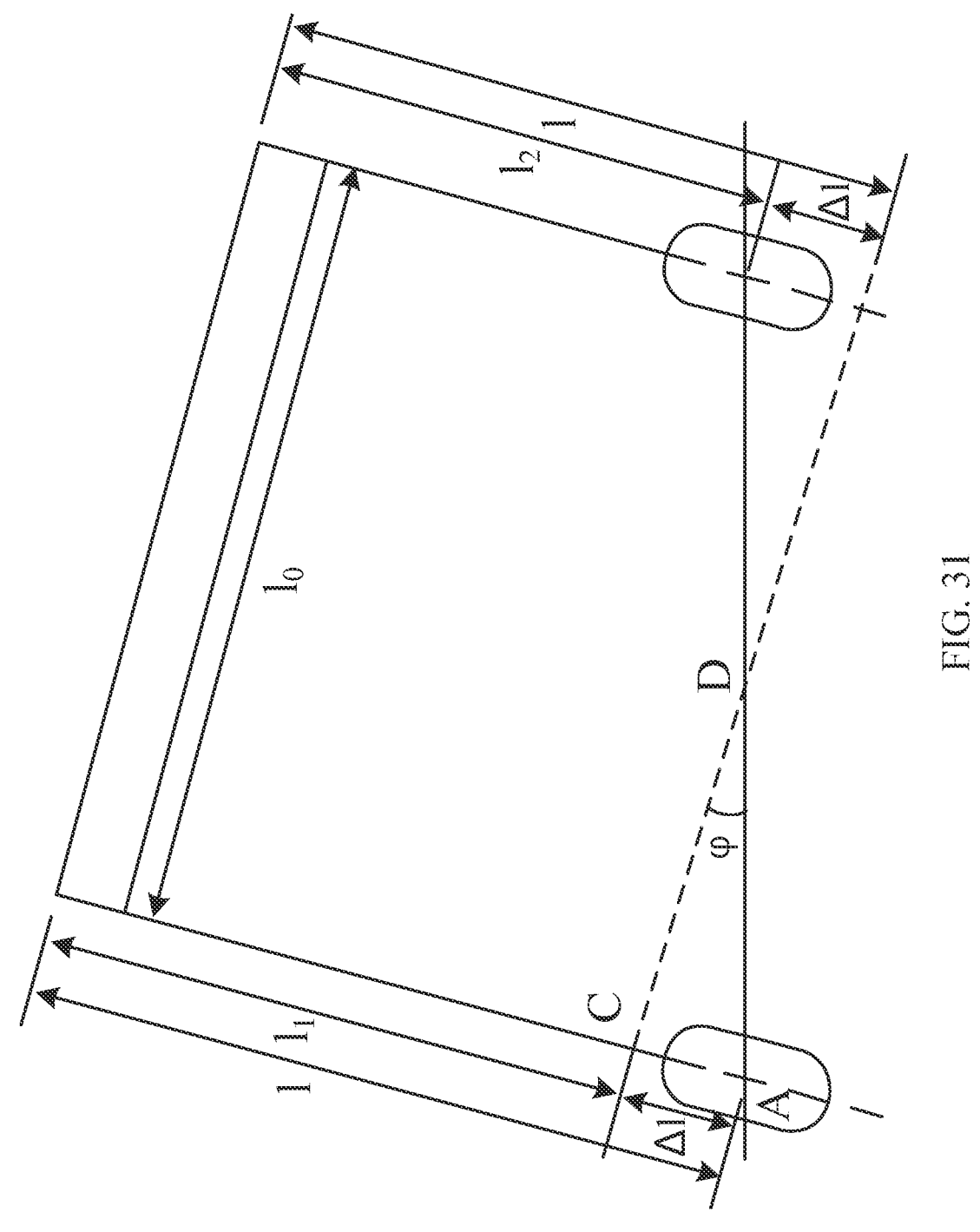
FIG. 31 is a schematic diagram of determining a variation of a leg portion when a mobile robot is in a first inclined state or a second inclined state according to an exemplary embodiment of this application.

FIG. 31 shows a schematic diagram of determining a variation of a leg portion when a mobile robot is in a first inclined state or a second inclined state according to an exemplary embodiment of this application. The mobile robot is an under-actuated system robot. In a triangle ACD, a length of DC is $0.5l_0$, and a calculation formula for a wheel leg change length AC is expressed as Formula 4:

$$\Delta l = \frac{l_0}{2}\tan\varphi_{ref} \qquad \text{Formula 4}$$

$\Delta l$ represents the wheel leg change length, and $\varphi_{ref}$ represents a reference roll angle of the under-actuated system robot.

In some embodiments, when the first wheel and/or the second wheel of the under-actuated system robot turn, the body is inclined at a roll angle, and the robot may generate a centrifugal force. A value of the centrifugal force is related to a horizontal speed v. In order to maintain balance, the body needs to be inclined to allow gravity to generate a part of components to balance the centrifugal force, and a relationship between a roll angle 4 corresponding to the inclined vehicle body and the horizontal speed v is expressed as Formula 5:

$$m\frac{v^2}{R} = mg\sin\varphi \qquad \text{Formula 5}$$

m represents a weight of the under-actuated system robot, and R represents a turning radius.

For example, a variation in the wheel legs of the under-actuated system robot are divided into the following two cases:

First, the roll angle generated by the under-actuated system robot is small.

For example, the roll angle generated by the under-actuated system robot is less than (or equal to) a preset angle threshold. When the roll angle is small, $\varphi$— sin $\varphi$— tan $\varphi$, and a wheel leg variation is calculated as Formula 6:

$$\Delta l = \frac{l_0}{2}\frac{v^2}{Rg} \qquad \text{Formula 6}$$

Second, the roll angle generated by the under-actuated system robot is large.

For example, the roll angle generated by the under-actuated system robot is greater than (or equal to) the preset angle threshold. When the roll angle is large, the wheel leg variation is calculated as Formula 7 and Formula 8:

$$\tan\varphi = \frac{\frac{v^2}{Rg}}{\sqrt{1-\left(\frac{v^2}{Rg}\right)^2}} \qquad \text{Formula 7}$$

$$\Delta l = \frac{l_0}{2}\frac{\frac{v^2}{Rg}}{\sqrt{1-\left(\frac{v^2}{Rg}\right)^2}} \qquad \text{Formula 8}$$

According to the foregoing content, for example, the mobile robot is an under-actuated system robot. During the bipedal-like motion, the control on the first wheel part and the second wheel part of the under-actuated system robot can be achieved through the following steps:

1. Obtain Trajectory Planning Information, where the Trajectory Planning Information is Configured for Representing a Target Motion Trajectory of the Under-Actuated System Robot.

The trajectory planning information may be preset information, or the trajectory planning information is generated by the under-actuated system robot by collecting road information in real time.

When the trajectory planning information is the preset information, a trajectory of the under-actuated system robot may be set according to the road information, and the trajectory is inputted into the memory of the under-actuated system robot to generate the trajectory planning information. The under-actuated system robot performs motion in the set trajectory according to the trajectory planning information. When the trajectory planning information is generated by the under-actuated system robot by collecting the road information in real time, the under-actuated system robot includes a road scanning device. In one embodiment, the under-actuated system robot includes a camera for collecting images of the road and planning the road based on the collected images.

2. Adjust the Leg Configuration of the Under-Actuated System Robot Based on the Trajectory Planning Information, and Determine Reference Motion State Data and/or Robot Attitude Data Based on the Trajectory Planning Information.

The reference motion state data is configured for representing a motion state of the under-actuated system robot when performing motion along the target motion trajectory, and the robot attitude data is configured for representing a structural state of the under-actuated system robot when performing motion along the target motion trajectory.

In some embodiments, the reference motion state data is configured for representing requirements that the motion state of the under-actuated system robot needs to meet when performing motion in a manner consistent with the target motion trajectory. In other words, after the reference motion state data is determined, the under-actuated system robot needs to adjust a current motion state by using the reference motion state data as a target. In some embodiments, the reference motion state data includes reference speed information, reference yaw angle information, reference motion curvature radius information, and the like. In some embodiments, the reference motion state data is calculated based on the trajectory planning information, or the reference motion state data is pre-stored based on the trajectory planning information, that is, when the motion trajectory of the under-actuated system robot is set, motion state data at a specified position on the motion trajectory is preset to obtain reference motion state data corresponding to the specified position, and the reference motion state data and the trajectory planning information are correspondingly stored. Therefore, when the under-actuated system robot moves to the specified position, the reference motion state data may be obtained from the stored data.

For example, a method of obtaining the reference motion state data includes at least one of the following manners:

First, a control operation by a remote controller is received, and the reference motion state data is determined based on the control operation by the remote controller. The remote controller may control a motion speed, a motion direction, a motion mode, and the like of the under-actuated system robot. According to the control operation by the remote controller, a motion state change of the under-actuated system robot are determined, thereby determining the reference movement state data.

Second, the data file is read, and the reference motion state data of the current under-actuated system robot is obtained from the data file. In other words, the reference motion state data of the under-actuated system robot at different positions is preset and stored in the data file, and the corresponding reference motion state data is determined according to the current position of the under-actuated system robot.

Third, visual information of the under-actuated system robot is acquired, and the reference motion state data is generated based on the visual information. That is to say, the under-actuated system robot is equipped with a camera, and the road information of the under-actuated system robot on the planned trajectory is collected through the camera, and the reference motion state data of the next movement is calculated based on the road information.

The foregoing method of obtaining the reference motion state data is only an illustrative example, and this embodiment of this application does not limit the method of obtaining the reference motion state data.

Similarly, a control signal for the bipedal-like motion of the under-actuated system robot can be given by the remote controller, or a control signal for the bipedal-like motion can be obtained through analysis of visual information and/or tactile information. In one embodiment, the under-actuated system robot is equipped with a camera and/or a tactile sensor to collect road information and force conditions of the under-actuated system robot, and analyze the road information and force conditions to determine whether to control the under-actuated system robot to perform the bipedal-like motion.

In some embodiments, the reference motion state data includes reference speed information, and pitch angle information of the under-actuated system robot is obtained. The pitch angle information represents an angle of the under-actuated system robot in forward and backward directions, that is, an angle at which the under-actuated system robot is inclined in the forward direction or the backward direction under wheel control. A balance control torque for controlling the under-actuated system robot is determined based on the reference speed information and pitch angle information. The balance control torque is a torque configured for keeping the under-actuated system robot in a balanced state, so that a torque for controlling the under-actuated system robot is determined based on the balance control torque. The balanced state is a state in which the under-actuated system robot maintains balance in the pitch direction. In other words, in the balanced state, the under-actuated system robot has no tendency to be inclined forward or backward. When the under-actuated system robot remains stationary, the balanced state is a state in which the under-actuated system robot remains stable and has no tendency to be inclined forward or backward. When the under-actuated system robot performs motion, the balanced state is a state in which the under-actuated system robot follows the wheel rotation and moves in a balanced manner. A main part of the under-actuated system robot is supported by the wheel leg part to maintain an upright state, and there is no tendency to be inclined forward or backward.

In some embodiments, when the under-actuated system robot is controlled to move in a straight line, the balance control torque is directly inputted to the wheel control motor to control wheels to rotate, thereby controlling motion of the under-actuated system robot. In another embodiment, when the under-actuated system robot is controlled to move along a curved trajectory, torques applied to motors corresponding to the two wheels of the under-actuated system robot are different, so that one wheel moves at a fast speed and the other wheel moves at a slow speed, thereby realizing curved movement of the under-actuated system robot. After the reference yaw angle information is determined according to the curved trajectory, incremental torques applied to the motors corresponding to different wheels are determined based on the reference yaw angle information.

In some embodiments, a bending degree of two wheel legs of the under-actuated system robot is adjusted according to the trajectory planning information. The bending degree of the wheel legs of the under-actuated system robot is related to a wheel leg length. In one embodiment, a larger bending degree of the wheel legs of the under-actuated system robot indicates a shorter wheel leg length.

In some embodiments, the robot attitude data includes wheel leg adjustment data of the first wheel part and the second wheel part, that is, the wheel leg adjustment data is determined based on the trajectory planning information. In some embodiments, a roll angle that the under-actuated system robot needs to generate is first determined according to the trajectory planning information, that is, the wheel leg adjustment data of the under-actuated system robot is determined based on the given roll angle.

In one embodiment, the roll angle determined based on the trajectory planning information is a value within a preset roll angle range, to avoid imbalance problems caused by excessive control caused by the roll angle exceeding the preset roll angle range.

3. Based on the Adjusted Leg Configuration and the Reference Motion State Data and/or the Robot Attitude Data, Control the Under-Actuated System Robot to Perform Bipedal-Like Motion Along the Target Motion Trajectory.

According to the foregoing content, the under-actuated system robot includes a first wheel and a second wheel, where the first wheel and the second wheel are respectively arranged on both sides of the under-actuated system robot. The first wheel is driven and controlled by a first drive motor, and the second wheel is driven and controlled by a second drive motor. The wheels are driven and controlled by the second drive motor. When a motor torque for controlling the under-driven system robot is determined, a first torque for driving the first drive motor and a second torque for driving the second drive motor are determined.

The first torque is inputted to the first drive motor, and the first drive motor drives the first wheel to rotate. The second torque is inputted to the second drive motor, and the second drive motor drives the second wheel to rotate. In this way, the under-actuated system robot is driven to perform bipedal-like motion along the target motion trajectory according to rotation of the first wheel and rotation of the second wheel.

In some embodiments, when the under-actuated system robot is controlled to perform bipedal-like motion based on the reference motion state data, it is also necessary to collect the pitch angle information and/or yaw angle information of the under-actuated system robot through an inertial sensor (IMU). The pitch angle information represents the angular information of the under-actuated system robot in the forward and backward direction, and the yaw angle information represents the angular information of the under-actuated system robot in the direction around the vertical rotation axis.

Then, the balance control torque and the incremental torque of the under-actuated system robot are determined based on the pitch angle information and/or the yaw angle information. For the balance control torque, refer to the relevant description in FIG. 13. The incremental torque is a torque configured for controlling rotation of the under-actuated system robot. Then, the control on the under-actuated system robot is achieved through the combination of balance control torque and the incremental torque.

In some embodiments, when the under-actuated system robot is controlled to perform bipedal-like motion based on the robot attitude data, the robot attitude data includes wheel leg adjustment data, that is, the wheel leg variation. For example, the wheel leg variation is Δl, one wheel leg extends and the other wheel leg retracts by using the wheel leg variation.

In some embodiments, adjusted position coordinates of the wheel are determined based on the wheel leg variation, a joint angle of the wheel leg is calculated based on the adjusted position coordinates, and the joint angle is inputted to a motor that controls the wheel leg to adjust the wheel leg.

For example, an embodiment of this application further provides a mobile robot.

For example, the mobile robot includes a first wheel part having a telescopic leg portion, a second wheel part having a telescopic leg portion, and a base part connected to the first wheel part and the second wheel part. A controller being disposed in the mobile robot, and the controller being configured to control the mobile robot to implement the mobile robot motion control method as described above.

It is to be understood that, the mobile robot in this embodiment of this application may be an under-actuated system robot. Furthermore, the mobile robot in this embodiment of this application is a mobile robot that can achieve two-wheel balance, for example, a wheel-legged robot that achieves two-wheel balance.

This type of robot lacks a degree of freedom in the roll direction between the motion plane of the leg portion and the base part. For example, the wheel-legged robot includes a first wheel part, a second wheel part, and a base part connected to the first wheel part and the second wheel part. Motion planes of leg portions of the first wheel part and the second wheel part are kept perpendicular to the base part.

The settings of the controller can be set according to actual needs. This is not limited in this application. Any mobile robot that can achieve the goal of keeping the load object on the base part without falling through the motion control of the controller shall fall within the protection scope of this application. The mobile robot motion control method is described in detail above, which may be used as reference. Details are not described herein again.

Figures 32, 33:
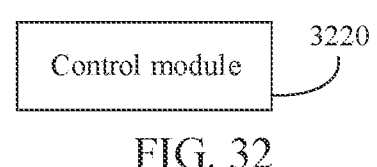
FIG. 32 is a schematic diagram of a mobile robot motion control apparatus according to an exemplary embodiment of this application.
FIG. 33 is a block diagram of an electronic device according to an exemplary embodiment of this application.

FIG. 32 shows a schematic diagram of a mobile robot motion control apparatus according to an exemplary embodiment of this application. The apparatus includes:

a control module 3220, configured to control a first wheel part having a telescopic leg portion and a second wheel part having a telescopic leg portion that are included in a mobile robot to be in a standing balance state; and the control module 3220, further configured to control the mobile robot to perform bipedal-like motion based on the standing balance state, the base part of the mobile robot being parallel to a horizontal reference plane in the standing balance state, and during the bipedal-like motion, the first wheel part and the second wheel part alternately touching ground, and the base part obliquely swinging.

In one embodiment, the first wheel part is located in a first direction of the base part, and the second wheel part is located in a second direction of the base part; and the control module 3220 is configured to: control the mobile robot to change from the standing balance state to a first inclined state, the first inclined state being a state in which the base part is inclined toward the first direction; control the mobile robot to restore from the first inclined state to the standing balance state; control the mobile robot to change from the standing balance state to a second inclined state, the second inclined state being a state in which the base part is inclined toward the second direction; and control the mobile robot to restore from the second inclined state to the standing balance state, where in the process in which the mobile robot restores from the first inclined state to the standing balance state, a first wheel of the first wheel part is in contact with the ground, and a second wheel of the second wheel part is in suspension; and in the process in which the mobile robot restores from the second inclined state to the standing balance state, the second wheel is in contact with the ground, and the first wheel is in suspension.

In one embodiment, the control module 3220 is configured to control a first leg portion of the first wheel part to retract and a second leg portion of the second wheel part to extend, to enable an under-actuated system machine to be in the first inclined state, where during extension and retraction of the first leg portion and the second leg portion, the base part is gradually inclined toward the first direction from a horizontal state parallel to the horizontal reference plane, and both the first wheel and the second wheel are in contact with the ground.

In one embodiment, the control module 3220 is configured to: control the first leg portion of the first wheel part to extend and the second leg portion of the second wheel part to retract, to enable the mobile robot to be in a first single-wheel ground-contacting state, the first single-wheel ground-contacting state being a state in which the first wheel is in contact with the ground and the second wheel is in suspension; and control the first leg portion to keep extending and the second leg portion to keep retracting, to enable the under-actuated system machine to restore from the first single-wheel ground-contacting state to the standing balance state, where during extension and retraction of the first leg portion and the second leg portion, the base part is gradually inclined toward the second direction until restoring to the horizontal state parallel to the horizontal reference plane, and the second wheel changes from being in contact with the ground to being in suspension and then restores to being in contact with the ground again.

In one embodiment, a length of the first leg portion is the same as a length of the second leg portion in the standing balance state, and the mobile robot is in the first single-wheel ground-contacting state within first duration, where the length of the first leg portion is less than the length of the second leg portion within the first duration; and the length of the first leg portion is the same as the length of the second leg portion at a termination node of the first duration.

In one embodiment, the control module 3220 is configured to control the first leg portion of the first wheel part to extend and the second leg portion of the second wheel part to retract, to enable the under-actuated system machine to be in the second inclined state, where during extension and retraction of the first leg portion and the second leg portion, the base part is gradually inclined toward the second direction from the horizontal state parallel to the horizontal reference plane, and both the first wheel and the second wheel are in contact with the ground.

In one embodiment, the control module 3220 is configured to: control the first leg portion of the first wheel part to retract and the second leg portion of the second wheel part to extend, to enable the mobile robot to be in a second single-wheel ground-contacting state, the second single-wheel ground-contacting state being a state in which the first wheel is in suspension and the second wheel is in contact with the ground; and control the first leg portion to keep retracting and the second leg portion to keep extending, to enable the under-actuated system machine to restore from the second single-wheel ground-contacting state to the standing balance state, where during extension and retraction of the first leg portion and the second leg portion, the base part is gradually inclined toward the first direction until restoring to the horizontal state parallel to the horizontal reference plane, and the first wheel changes from being in contact with the ground to being in suspension and then restores to being in contact with the ground again.

In one embodiment, the length of the first leg portion is the same as the length of the second leg portion in the standing balance state, and the mobile robot is in the second single-wheel ground-contacting state within second duration, where the length of the first leg portion is greater than the length of the second leg portion within the second duration; and the length of the first leg portion is the same as the length of the second leg portion at a termination node of the second duration.

In one embodiment, the control module 3220 is configured to control, when an inclination angle of the mobile robot reaches a first limit value, the mobile robot to change from the standing balance state to the first inclined state, where the inclination angle of the mobile robot is configured for indicating the angle between the plane of the base part and the plane parallel to the horizontal reference plane.

In one embodiment, the control module 3220 is configured to control, when the inclination angle of the mobile robot reaches a second limit value, the mobile robot to restore from the first inclined state to the standing balance state, where the inclination angle of the mobile robot is configured for indicating the angle between the plane of the base part and the plane parallel to the horizontal reference plane.

In one embodiment, the control module 3220 is configured to control, when the inclination angle of the mobile robot reaches a third limit value, the mobile robot to change from the standing balance state to the second inclined state, where the inclination angle of the mobile robot is configured for indicating the angle between the plane of the base part and the plane parallel to the horizontal reference plane.

In one embodiment, the control module 3220 is configured to control, when the inclination angle of the mobile robot reaches a fourth limit value, the mobile robot to restore from the second inclined state to the standing balance state, where the inclination angle of the mobile robot is configured for indicating the angle between the plane of the base part and the plane parallel to the horizontal reference plane.

In one embodiment, the bipedal-like motion includes at least one of the following: in-situ stepping motion; linear motion; curved motion; in-situ circle turning and stepping motion; and obstacle-crossing motion.

In one embodiment, the bipedal-like motion includes the in-situ stepping motion; and during the in-situ stepping motion, ground-touching positions of the first wheel part and the second wheel part after suspension are the same as an initial ground-touching position, or a distance difference between ground-touching positions of the first wheel part and the second wheel part after suspension and an initial ground-touching position is less than a first tolerance value.

In one embodiment, the bipedal-like motion includes at least one of the linear motion, the curved motion, the in-situ circle turning and stepping motion, and the obstacle-crossing motion. During the linear motion or the curved motion or the in-situ circle turning and stepping motion or the obstacle-crossing motion, the ground-touching position of the first wheel part or the second wheel part after suspension is different from a ground-touching position before suspension, and a distance difference between the ground-touching position of the first wheel part or the second wheel part after suspension and the ground-touching position before suspension is not less than a second tolerance value; and the base part obliquely swings toward a third direction and a fourth direction alternately, an angle between the third direction or the fourth direction and a forward direction of the mobile robot being an acute angle.

In one embodiment, during the bipedal-like motion, the first wheel of the first wheel part and the second wheel of the second wheel part are in a locked state.

In one embodiment, during the bipedal-like motion, the first wheel of the first wheel part and/or the second wheel of the second wheel part are in an unlocked state.

In one embodiment, the control module 3220 is configured to: during the bipedal-like motion, control the first wheel part and/or the second wheel part in the unlocked state to perform sliding motion.

In one embodiment, during the bipedal-like motion, motion of the first wheel part, the second wheel part, and the base part is controlled according to at least one of the following information: a length change of the first leg portion of the first wheel part; an angle and a variation of at least one joint motor of the first leg portion; a length change of the second leg portion of the second wheel part; an angle and a variation of at least one joint motor of the second leg portion; a contact force between the first wheel of the first wheel part and the ground; a contact force between the second wheel of the second wheel part and the ground; pitch angle information and a pitch angular velocity of the mobile robot; roll angle information and a roll angular velocity of the mobile robot; and yaw angle information and a yaw angular velocity of the mobile robot.

In one embodiment, when both the first wheel part and the second wheel part are in contact with the ground, a sum of a motor torque of a first drive motor corresponding to the first wheel part and a motor torque of a second drive motor corresponding to the second wheel part is a first torque; when the first wheel part is in contact with the ground and the second wheel part is in suspension, the motor torque of the first drive motor is the first torque; and when the second wheel part is in contact with the ground and the first wheel part is in suspension, the motor torque of the second drive motor is the first torque.

FIG. 33 shows a structural block diagram of an electronic device 3300 according to an exemplary embodiment of this application.

The electronic device 3300 may be a portable mobile terminal, for example, an electronic device configured to implement control on the mobile robot, a smartphone, a tablet computer, a Moving Picture Experts Group Audio Layer III (MP3) player, a Moving Picture Experts Group Audio Layer IV (MP4) player, a notebook computer, or a desktop computer. The electronic device 3300 may also be referred to as another name such as user equipment, a portable terminal, a laptop terminal, or a desktop terminal. In this embodiment of this application, the electronic device 3300 may be implemented as a control device part of the robot.

Generally, the electronic device 3300 includes a processor 3301 and a memory 3302.

The processor 3301 may include one or more processing cores, and may be, for example, a 4-core processor or an 8-core processor. The processor 3301 may be implemented in at least one hardware form of a digital signal processor (DSP), a field-programmable gate array (FPGA), and a programmable logic array (PLA). The processor 3301 may alternatively include a main processor and a coprocessor. The main processor is configured to process data in an awake state, also referred to as a central processing unit (CPU). The coprocessor is a low-power processor configured to process data in a standby state. In some embodiments, the processor 3301 may be integrated with a graphics processing unit (GPU). The GPU is configured to render and draw content that needs to be displayed on a display. In some embodiments, the processor 3301 may further include an artificial intelligence (AI) processor. The AI processor is configured to process computing operations related to machine learning.

The memory 3302 may include one or more non-transitory computer-readable storage media. The computer-readable storage medium may be non-transient. The memory 3302 may further include a high-speed random access memory and a non-volatile memory, for example, one or more disk storage devices or flash storage devices. In some embodiments, a non-transitory computer-readable storage medium in the memory 3302 is configured to store at least one instruction, the at least one instruction being configured to be executed by the processor 3301 to implement the mobile robot motion control method provided in the method embodiments of this application.

In some embodiments, the electronic device 3300 may optionally include: a peripheral interface 3303 and at least one peripheral. The processor 3301, the memory 3302, and the peripheral device interface 3303 may be connected through a bus or a signal cable. Each peripheral device may be connected to the peripheral device interface 3303 through a bus, a signal cable, or a circuit board. Specifically, the peripheral includes: at least one of a radio frequency (RF) circuit 3304, a display screen 3305, a camera component 3306, an audio circuit 3307, a positioning component 3308, and a power supply 3309.

The peripheral interface 3303 may be configured to connect at least one peripheral device related to I/O to the processor 3301 and the memory 3302. In some embodiments, the processor 3301, the memory 3302, and the peripheral interface 3303 are integrated on the same chip or the same circuit board. In some other embodiments, any or both of the processor 3301, the memory 3302, and the peripheral interface 3303 may be implemented on an independent chip or circuit board. This is not limited in this embodiment.

The RF circuit 3304 is configured to receive and transmit an RF signal, which is also referred to as an electromagnetic signal. The RF circuit 3304 communicates with a communication network and other communication devices through the electromagnetic signal. The RF circuit 3304 converts an electrical signal into an electromagnetic signal for transmission, or converts a received electromagnetic signal into an electrical signal. In one embodiment, the radio frequency circuit 3304 includes: an antenna system, an RF transceiver, one or more amplifiers, a tuner, an oscillator, a digital signal processor, a codec chip set, a subscriber identity module card, and the like. The radio frequency circuit 3304 may communicate with another terminal through at least one wireless communication protocol. The wireless communication protocol includes, but is not limited to, a world wide web, a metropolitan area network, an intranet, generations of mobile communication networks (2G, 3G, 4G, and 5G), a wireless local area network and/or a wireless fidelity (Wi-Fi) network. In some embodiments, the radio frequency circuit

3304 may further include a circuit related to NFC, which is not limited in this application.

The display screen 3305 is configured to display a user interface (UI). The UI may include a graphic, text, an icon, a video, and any combination thereof. When the display screen 3305 is a touch display screen, the display screen 3305 also has a capability to collect a touch signal on or above a surface of the display screen 3305. The touch signal may be inputted, as a control signal, to the processor 3301 for processing. In this case, the display screen 3305 may be further configured to provide a virtual button and/or a virtual keyboard that are/is also referred to as a soft button and/or a soft keyboard. In some embodiments, there may be one display screen 3305, disposed on a front panel of the electronic device 3300. In some other embodiments, there are at least two display screens 3305, disposed on different surfaces of the device 3300 respectively or in a folded design. In some other embodiments, the display screen 3305 may be a flexible display screen, disposed on a curved surface or a folded surface of the electronic device 3300. The display screen 3305 may further be set to have a non-rectangular irregular graph, that is, a special-shaped screen. The display screen 3305 may be prepared by using materials such as a liquid-crystal display (LCD), an organic light-emitting diode (OLED), or the like.

The camera component 3306 is configured to collect images or videos. In one embodiment, the camera component 3306 includes a front-facing camera and a rear-facing camera. Generally, the front-facing camera is disposed on a front panel of the terminal, and the rear-facing camera is disposed on a back surface of the terminal. In some embodiments, there are at least two rear cameras, which are respectively any of a main camera, a depth-of-field camera, a wide-angle camera, and a telephoto camera, to implement background blur through fusion of the main camera and the depth-of-field camera, panoramic photographing and virtual reality (VR) photographing through fusion of the main camera and the wide-angle camera, or other fusion photographing functions. In some embodiments, the camera assembly 3306 may further include a flash. The flash may be a single color temperature flash or a double color temperature flash. The double color temperature flash refers to a combination of a warm light flash and a cold light flash, and may be used for light compensation under different color temperatures.

The audio circuit 3307 may include a microphone and a speaker. The microphone is configured to collect sound waves of a user and an environment, and convert the sound waves into an electrical signal to input to the processor 3301 for processing, or input to the radio frequency circuit 3304 for implementing voice communication. For the purpose of stereo sound collection or noise reduction, there may be a plurality of microphones, respectively disposed at different parts of the electronic device 3300. The microphone may be further an array microphone or an omnidirectional collection microphone. The speaker is configured to convert electric signals from the processor 3301 or the RF circuit 3304 into sound waves. The speaker may be a conventional thin-film speaker or a piezoelectric ceramic speaker. When the speaker is the piezoelectric ceramic speaker, electric signals not only may be converted into sound waves that can be heard by human, but also may be converted into sound waves that cannot be heard by human for ranging and the like. In some embodiments, the audio circuit 3307 may also include an earphone jack.

The positioning component 3308 is configured to position a current geographic location of the electronic device 3300, to implement a navigation or a location based service (LBS). The positioning component 3308 may be a positioning assembly based on the Global Positioning System (GPS), the Beidou Navigation Satellite System (BDS), or the Galileo system.

The power supply 3309 is configured to supply power to components in the electronic device 3300. The power supply 3309 may be an alternating current, a direct current, a primary battery, or a rechargeable battery. In a case that the power supply 3309 includes the rechargeable battery, the rechargeable battery may be a wired charging battery or a wireless charging battery. The wired rechargeable battery is a battery charged through a wired circuit, and the wireless rechargeable battery is a battery charged through a wireless coil. The rechargeable battery may be further configured to support a fast charging technology.

In some embodiments, the electronic device 3300 may also include one or more sensors 3310. The one or more sensors 3310 include, but are not limited to, an acceleration sensor 3311, a gyroscope sensor 3312, a pressure sensor 3313, an optical sensor 3314, and a proximity sensor 3315.

The acceleration sensor 3311 may detect acceleration on three coordinate axes of a coordinate system established by the electronic device 3300. For example, the acceleration sensor 3311 may be configured to detect components of gravity acceleration on the three coordinate axes. The processor 3301 may control, according to a gravity acceleration signal collected by the acceleration sensor 3311, the display screen 3305 to display the user interface in a frame view or a portrait view. The acceleration sensor 3311 may be further configured to collect data of a game or a user movement.

The gyroscope sensor 3312 may detect a body direction and a rotation angle of the electronic device 3300. The gyroscope sensor 3312 may cooperate with the acceleration sensor 3311 to collect a 3D action by the user on the electronic device 3300. The processor 3301 may implement the following functions according to data collected by the gyroscope sensor 3312: motion sensing (for example, the UI is changed according to a tilt operation of a user), image stabilization during shooting, game control, and inertial navigation.

The pressure sensor 3313 may be disposed on a side frame of the electronic device 3300 and/or a lower layer of the display screen 3305. In a case that the pressure sensor 3313 is disposed at the side frame of the electronic device 3300, a holding signal of the user on the electronic device 3300 may be detected, and left/right hand identification or a quick action may be performed by the processor 3301 according to the holding signal collected by the pressure sensor 3313. When the pressure sensor 3313 is disposed on the low layer of the display screen 3305, the processor 3301 controls, according to a pressure operation of the user on the display screen 3305, an operable control on the UI. The operable control includes at least one of a button control, a scroll-bar control, an icon control, and a menu control.

The optical sensor 3314 is configured to collect ambient light intensity. In an embodiment, the processor 3301 may control display luminance of the display screen 3305 according to the ambient light intensity collected by the optical sensor 3314. Specifically, when the ambient light intensity is relatively high, the display luminance of the display screen 3305 is increased, and when the ambient light intensity is relatively low, the display luminance of the touch display screen 3305 is reduced. In another embodiment, the processor 3301 may further dynamically adjust a photographing parameter of the camera component 3306 according to the ambient light intensity collected by the optical sensor 3314.

The proximity sensor 3315, also referred to as a distance sensor, is usually disposed on the front panel of the electronic device 3300. The proximity sensor 3315 is configured to collect a distance between the user and a front face of the electronic device 3300. In an embodiment, when the proximity sensor 3315 detects that the distance between the user and the front of the electronic device 3300 is gradually smaller, the processor 3301 controls the display screen 3305 to be switched from a screen-on state to a screen-off state. In a case that the proximity sensor 3315 detects that the distance between the user and the front of the electronic device 3300 is gradually larger, the processor 3301 controls the display screen 3305 to be switched from the screen-off state to the screen-on state.

A person skilled in the art may understand that a structure shown in FIG. 33 constitutes no limitation on the electronic device 3300, and the electronic device may include more or fewer components than those shown in the figure, or some components may be combined, or a different component deployment may be used.

An embodiment of this application further provides a computer device. The computer device includes a memory and a processor, the memory storing a computer program, the computer program being loaded and executed by the processor to implement the mobile robot motion control method as described above. In some embodiments, the computer device may be the electronic device. In some embodiments, the computer device may be the mobile robot, or may be the electronic device communicatively connected to the mobile robot.

An embodiment of this application further provides a non-transitory computer-readable storage medium is provided, storing a computer program, the computer program being executed by a processor to implement the mobile robot motion control method as described above.

An embodiment of this application further provides a chip, including a programmable logic circuit and/or a computer program, the chip, when running, configured to implement the mobile robot motion control method as described above.

An embodiment of this application further provides a computer program product or a computer program, including computer instructions, the computer instructions being stored in a computer-readable storage medium, and a processor reading the computer-readable storage medium and executing the computer instructions, to implement the mobile robot motion control method as described above.

In this application, the term "module" or "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules or units. Moreover, each module or unit can be part of an overall module or unit that includes the functionalities of the module or unit. In the description of this application, it may be understood that, terms such as "first" and "second" are used only for a purpose of description, and shall not be construed as indicating or implying relative importance or implying a quantity of indicated technical features.

All of the above-mentioned optional technical solutions may be combined randomly to form optional embodiments of this application, and details are not described herein again.

The foregoing descriptions are merely optional embodiments of this application, but are not intended to limit this application. Any modification, equivalent replacement, or improvement made within the spirit and principle of this application shall fall within the protection scope of this application.

What is claimed is:

1. A method for controlling motion of a mobile robot performed by a computer device, the mobile robot comprising a first wheel part, a second wheel part, and a base part connected to the first wheel part and the second wheel part, the first wheel part is located in a first direction of the base part, and the second wheel part is located in a second direction of the base part, and the method comprising:

controlling the first wheel part and the second wheel part to be in a standing balance state, wherein the base part is parallel to a horizontal reference plane in the standing balance state; and controlling the mobile robot to perform bipedal-like motion based on the standing balance state, wherein, during the bipedal-like motion, the first wheel part and the second wheel part alternately touch the ground while the base part obliquely swinging, further comprising:

controlling the mobile robot to change from the standing balance state to a first inclined state in which the base part is inclined toward the first direction;

controlling the mobile robot to restore from the first inclined state to the standing balance state while the first wheel part is in contact with the ground and the second wheel part is in suspension;

controlling the mobile robot to change from the standing balance state to a second inclined state in which the base part is inclined toward the second direction; and controlling the mobile robot to restore from the second inclined state to the standing balance state while the second wheel part is in contact with the ground and the first wheel is in suspension.

2. The method according to claim 1, wherein the controlling the mobile robot to change from the standing balance state to a first inclined state comprises:

controlling a first leg portion of the first wheel part to retract and a second leg portion of the second wheel part to extend, to enable an under-actuated system machine to be in the first inclined state, wherein during extension and retraction of the first leg portion and the second leg portion, the base part is gradually inclined toward the first direction from a horizontal state parallel to the horizontal reference plane, and both the first wheel and the second wheel are in contact with the ground.

3. The method according to claim 2, wherein during the bipedal-like motion, motion of the first wheel part, the second wheel part, and the base part is controlled according to at least one of the following information:

a length change of the first leg portion of the first wheel part;

an angle and a variation of at least one joint motor of the first leg portion;

a length change of the second leg portion of the second wheel part;

an angle and a variation of at least one joint motor of the second leg portion;

a contact force between a first wheel of the first wheel part and the ground;

a contact force between a second wheel of the second wheel part and the ground;

pitch angle information and a pitch angular velocity of the mobile robot;

roll angle information and a roll angular velocity of the mobile robot; and yaw angle information and a yaw angular velocity of the mobile robot.

4. The method according to claim 1, wherein the controlling the mobile robot to restore from the first inclined state to the standing balance state comprises:

controlling the first leg portion of the first wheel part to extend and the second leg portion of the second wheel part to retract, to enable the mobile robot to be in a first single-wheel ground-contacting state, the first single-wheel ground-contacting state being a state in which the first wheel is in contact with the ground and the second wheel is in suspension; and controlling the first leg portion to keep extending and the second leg portion to keep retracting, to enable the under-actuated system machine to restore from the first single-wheel ground-contacting state to the standing balance state, wherein during extension and retraction of the first leg portion and the second leg portion, the base part is gradually inclined toward the second direction until restoring to the horizontal state parallel to the horizontal reference plane, and the second wheel changes from being in contact with the ground to being in suspension and then restores to being in contact with the ground again.

5. The method according to claim 1, wherein the length of the first leg portion is the same as the length of the second leg portion in the standing balance state, and the mobile robot is in the second single-wheel ground-contacting state within second duration, wherein the length of the first leg portion is greater than the length of the second leg portion within the second duration; and the length of the first leg portion is the same as the length of the second leg portion at a termination node of the second duration.

6. The method according to claim 1, wherein the controlling the mobile robot to change from the standing balance state to a first inclined state comprises:

controlling, when an inclination angle of the mobile robot reaches a first limit value, the mobile robot to change from the standing balance state to the first inclined state, wherein the inclination angle of the mobile robot is configured for indicating an angle between a plane of the base part and a plane parallel to the horizontal reference plane.

7. The method according to claim 1, wherein the controlling the mobile robot to restore from the first inclined state to the standing balance state comprises:

controlling, when the inclination angle of the mobile robot reaches a second limit value, the mobile robot to restore from the first inclined state to the standing balance state, wherein the inclination angle of the mobile robot is configured for indicating the angle between the plane of the base part and the plane parallel to the horizontal reference plane.

8. The method according to claim 1, wherein the bipedal-like motion comprises at least one of the following:

in-situ stepping motion;

linear motion;

curved motion;

in-situ circle turning and stepping motion; and obstacle-crossing motion.

9. The method according to claim 1, wherein the bipedal-like motion comprises the in-situ stepping motion; and during the in-situ stepping motion, ground-touching positions of the first wheel part and the second wheel part after suspension are the same as an initial ground-touching position, or a distance difference between ground-touching positions of the first wheel part and the second wheel part after suspension and an initial ground-touching position is less than a first tolerance value.

10. The method according to claim 1, wherein during the linear motion or the curved motion or the in-situ circle turning and stepping motion or the obstacle-crossing motion, the ground-touching position of the first wheel part or the second wheel part after suspension is different from a ground-touching position before suspension, and a distance difference between the ground-touching position of the first wheel part or the second wheel part after suspension and the ground-touching position before suspension is not less than a second tolerance value; and the base part obliquely swings toward a third direction and a fourth direction alternately, an angle between the third direction or the fourth direction and a forward direction of the mobile robot being an acute angle.

11. The method according to claim 1, wherein during the bipedal-like motion, the first wheel of the first wheel part and the second wheel of the second wheel part are in a locked state.

12. The method according to claim 1, wherein during the bipedal-like motion, the first wheel of the first wheel part and/or the second wheel of the second wheel part are in an unlocked state.

13. The method according to claim 12, further comprising:

during the bipedal-like motion, controlling the first wheel part and/or the second wheel part in the unlocked state to perform motion.

14. The method according to claim 1, wherein when both the first wheel part and the second wheel part are in contact with the ground, a sum of a motor torque of a first drive motor corresponding to the first wheel part and a motor torque of a second drive motor corresponding to the second wheel part is a first torque;

when the first wheel part is in contact with the ground and the second wheel part is in suspension, the motor torque of the first drive motor is the first torque; and when the second wheel part is in contact with the ground and the first wheel part is in suspension, the motor torque of the second drive motor is the first torque.

15. A computer device, comprising a memory and a processor, the memory storing a computer program, the computer program being loaded and executed by the processor to implement the mobile robot motion control method according to claim 1.

16. A non-transitory computer-readable storage medium, storing a computer program, the computer program being executed by a processor to implement the mobile robot motion control method according to claim 1.

17. A chip, comprising a programmable logic circuit and/or a computer program, an electronic device on which the chip is installed, when running, configured to implement the mobile robot motion control method according to claim 1.

18. A mobile robot, comprising a first wheel part, a second wheel part, and a base part connected to the first wheel part and the second wheel part; and a controller being disposed in the mobile robot, and the controller being configured to control the mobile robot to implement the mobile robot motion control method according to claim 1.

* * * * *